(12) United States Patent
Iwase et al.

(10) Patent No.: US 11,336,799 B2
(45) Date of Patent: May 17, 2022

(54) IMAGING DEVICE INCLUDING PIXELS HAVING INDIVIDUALLY SETTABLE INCIDENT ANGLE DIRECTIVITY

(71) Applicant: SONY CORPORATION, Tokyo (JP)

(72) Inventors: Akira Iwase, Tokyo (JP); Masafumi Wakazono, Tokyo (JP); Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/754,617

(22) PCT Filed: Oct. 19, 2018

(86) PCT No.: PCT/JP2018/038945
§ 371 (c)(1),
(2) Date: Apr. 8, 2020

(87) PCT Pub. No.: WO2019/078337
PCT Pub. Date: Apr. 25, 2019

(65) Prior Publication Data
US 2020/0358926 A1    Nov. 12, 2020

(30) Foreign Application Priority Data
Oct. 19, 2017 (JP) .............................. JP2017-202890

(51) Int. Cl.
*H04N 1/44* (2006.01)
*H04N 5/369* (2011.01)
*H04N 5/378* (2011.01)

(52) U.S. Cl.
CPC ......... *H04N 1/4486* (2013.01); *H04N 5/3696* (2013.01); *H04N 5/378* (2013.01); *H04N 2201/0084* (2013.01)

(58) Field of Classification Search
CPC .... H04N 1/4486; H04N 5/3696; H04N 5/378; H04N 2201/0084; H04N 5/2254
See application file for complete search history.

(56) References Cited

U.S. PATENT DOCUMENTS

| 2009/0095912 A1 | 4/2009 | Slinger et al. |
| 2011/0174998 A1 | 7/2011 | Molnar et al. |

(Continued)

FOREIGN PATENT DOCUMENTS

| CN | 101228460 A | 7/2008 |
| JP | 2008-542863 A | 11/2008 |

(Continued)

OTHER PUBLICATIONS

International Search Report dated Dec. 18, 2018 in PCT/JP2018/038945 filed on Oct. 19, 2018, citing documents AA-AC and AQ-AS therein, 1 page.

(Continued)

*Primary Examiner* — Nicholas G Giles
(74) *Attorney, Agent, or Firm* — Oblon, McClelland, Maier & Neustadt, L.L.P.

(57) ABSTRACT

The present technology relates to an imaging device and method, and an image processing device and method that can more easily suppress unauthorized use and tampering of an image.
An object is imaged by an imaging element including a plurality of pixel output units that receives incident light entering without passing through either an imaging lens or a pinhole, and that each outputs one detection signal indicating an output pixel value modulated by an incident angle of the incident light, and a detection image obtained by the imaging and formed by a detection signal obtained in the pixel output units of the imaging element is output without associating with a restoration matrix including coefficients used when a restored image is restored from the detection (Continued)

image. The present disclosure can be applied to, for example, an imaging device, an image processing device, an information processing device, an electronic device, a computer, a program, a storage medium, a system, and the like.

18 Claims, 60 Drawing Sheets

(56) References Cited

U.S. PATENT DOCUMENTS

| | | |
|---|---|---|
| 2015/0170340 A1 | 6/2015 | Sato et al. |
| 2015/0382000 A1* | 12/2015 | Jiang .................... H04N 19/51 382/233 |
| 2016/0057368 A1 | 2/2016 | Shin |
| 2018/0027201 A1* | 1/2018 | Sankaranarayanan ....................... H04N 5/225 348/308 |

FOREIGN PATENT DOCUMENTS

| | | |
|---|---|---|
| JP | WO 2014/192243 A1 | 12/2014 |
| JP | 2016-510910 A | 4/2016 |
| JP | 2017-527157 A | 9/2017 |
| WO | WO 2016/123529 A1 | 8/2016 |
| WO | WO 2018/012492 A1 | 1/2018 |

OTHER PUBLICATIONS

Asif, M. S. et al., "FlatCam: Replacing Lenses with Masks and Computation," 2015 IEEE International Conference on Computer Vision Workshop (ICCVW), 2015, pp. 12-15.

Combined Chinese Office Action and Search Report dated Apr. 19, 2021 in Patent Application No. 201880066121.2 (submitting English language translation only), citing document AO therein, 10 pages.

* cited by examiner

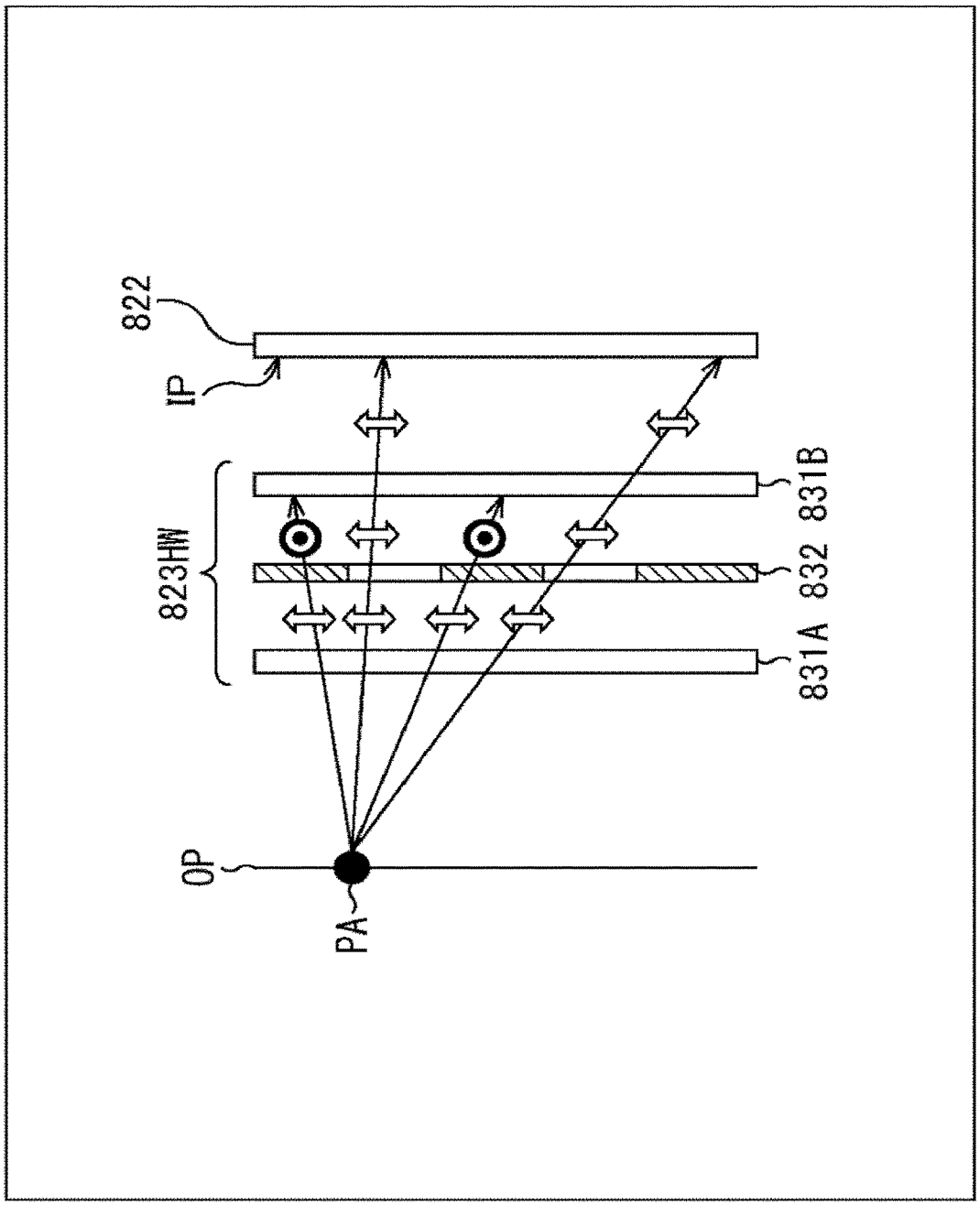

IMAGING DEVICE INCLUDING PIXELS HAVING INDIVIDUALLY SETTABLE INCIDENT ANGLE DIRECTIVITY

TECHNICAL FIELD

The present technology relates to an imaging device and method, and an image processing device and method, and in particular, an imaging device and method, and an image processing device and method that can more easily suppress unauthorized use and tampering of an image.

BACKGROUND ART

In recent years, size reduction of imaging elements is in progress by devising an imaging element without an imaging lens, or the like (see, for example, Patent Document 1, Patent Document 2, and Non-Patent Document 1), and imaging elements are mounted in a wider variety of devices. Further, a wider variety of devices have been connected to a network such as the Internet to perform communication. For this reason, images imaged by an imaging device are also transmitted via the Internet or the like and used for various services and the like more frequently.

CITATION LIST

Patent Document

Patent Document 1: International Publication No. 2016/123529
Patent Document 2: Japanese Translation of PCT International Application Publication No. 2016-510910

Non-Patent Document

Non-Patent Document 1: M. Salman Asif and four others, "Flatcam: Replacing lenses with masks and computation", "2015 IEEE International Conference on Computer Vision Workshop (ICCVW)", 2015, pp. 663-666

SUMMARY OF THE INVENTION

Problems to be Solved by the Invention

However, in such transmission of an image, there is a risk of leak to an unauthorized user, and there has been a risk of unauthorized use and tampering of the image. Accordingly, for example, it is conceivable to encrypt and then transmit image data in transmission, but there has been a risk that a load increases due to processes of encryption and the like, thereby increasing power consumption, processing time, cost, and the like.

The present disclosure has been made in view of such a situation, and makes it possible to suppress unauthorized use and tampering of an image more easily.

Solutions to Problems

An imaging device according to one aspect of the present technology is an imaging device including an imaging element that includes a plurality of pixel output units that receives incident light entering without passing through either an imaging lens or a pinhole, and that each outputs one detection signal indicating an output pixel value modulated by an incident angle of the incident light, and an output processing unit that outputs a detection image formed by a detection signal obtained in the pixel output units of the imaging element, without associating with a restoration matrix including coefficients used when a restored image is restored from the detection image.

The plurality of pixel output units can have a configuration in which an incident angle directivity indicating a directivity of the output pixel value with respect to an incident angle of incident light from an object is independently settable in each of the pixel output units.

The plurality of pixel output units can have a configuration in which an incident angle directivity indicating a directivity with respect to an incident angle of incident light from an object is independently settable in each of the pixel output units.

The plurality of pixel output units can have a configuration in which, by having different photodiodes (PD) from each other that contribute to output, an incident angle directivity indicating a directivity of the output pixel value with respect to an incident angle of incident light from an object is independently settable in each of the pixel output units.

A readout control unit that controls reading out of the detection signal from each of the pixel output units of the imaging element can be further included, in which the readout control unit regularly or irregularly switches the pixel output unit from which the detection signal is read out.

A restoration matrix setting unit that sets the restoration matrix in a case where a predetermined condition is satisfied can be further included, in which the output processing unit is configured to output the restoration matrix set by the restoration matrix setting unit.

An encryption unit that encrypts the restoration matrix set by the restoration matrix setting unit can be further included, in which the output processing unit is configured to output the restoration matrix encrypted by the encryption unit.

The detection image can be an image in which an object can be visually unrecognizable, and the restored image can be an image in which the object is visually recognizable.

A restoration unit that restores the restored image from the detection image using the restoration matrix can be further included, in which the output processing unit is configured to display the restored image restored by the restoration unit.

An imaging method according to one aspect of the present technology includes imaging an object by an imaging element including a plurality of pixel output units that receives incident light entering without passing through either an imaging lens or a pinhole, and that each outputs one detection signal indicating an output pixel value modulated by an incident angle of the incident light, and outputting a detection image obtained by the imaging and formed by a detection signal obtained in the pixel output units of the imaging element, without associating with a restoration matrix including coefficients used when a restored image is restored from the detection image.

An image processing device according to another aspect of the present technology is an image processing device including a restoration unit that restores a restored image from a detection image obtained by an external device using a restoration matrix including coefficients used when a restored image is restored from the detection image that is obtained by imaging an object by an imaging element including a plurality of pixel output units and is formed by a detection signal obtained in the pixel output units, the plurality of pixel output units receiving incident light entering without passing through either an imaging lens or a pinhole, and each outputting one detection signal indicating an output pixel value modulated by an incident angle of the incident light.

A restoration matrix setting unit that sets a restoration matrix used to restore the restored image by the restoration unit can be further included, in which the restoration unit is configured to restore the restored image from the detection image using the restoration matrix set by the restoration matrix setting unit.

The restoration matrix setting unit can regularly or irregularly switch the restoration matrix used to restore the restored image.

The restoration matrix setting unit can generate the restoration matrix used to restore the restored image.

A restoration matrix storage unit that stores candidate restoration matrices can be further included, in which the restoration matrix setting unit is configured to set the restoration matrix used to restore the restored image from the restoration matrices stored in the restoration matrix storage unit.

A restoration matrix communication unit that obtains a restoration matrix from the external device by communication can be further included, in which the restoration matrix storage unit is configured to store the restoration matrix obtained by the restoration matrix communication unit.

A decryption unit that decrypts an encrypted restoration matrix obtained by the restoration matrix communication unit can be further included, in which the restoration matrix storage unit is configured to store the restoration matrix decrypted by the decryption unit.

The restoration matrix communication unit can obtain an encrypted restoration matrix associated with the detection image.

An authentication unit that performs an authentication process of itself for the external device can be further included, in which the restoration matrix communication unit is configured to obtain a restoration matrix from the external device in a case where authentication by the authentication unit is successful.

An image processing method according to another aspect of the present technology includes restoring a restored image from a detection image obtained by an external device using a restoration matrix including coefficients used when a restored image is restored from the detection image that is obtained by imaging an object by an imaging element including a plurality of pixel output units and is formed by a detection signal obtained in the pixel output units, the plurality of pixel output units receiving incident light entering without passing through either an imaging lens or a pinhole, and each outputting one detection signal indicating an output pixel value modulated by an incident angle of the incident light.

In an imaging device and method according to one aspect of the present technology, an object is imaged by an imaging element including a plurality of pixel output units that receives incident light entering without passing through either an imaging lens or a pinhole, and that each outputs one detection signal indicating an output pixel value modulated by an incident angle of the incident light, and a detection image obtained by the imaging and formed by a detection signal obtained in the pixel output units of the imaging element is output without associating with a restoration matrix including coefficients used when a restored image is restored from the detection image.

In an image processing device and method according to another aspect of the present technology, a restored image is restored from a detection image and the restored image that has been restored is displayed, the detection image being obtained by an external device using a restoration matrix including coefficients used when a restored image is restored from the detection image that is obtained by imaging an object by an imaging element including a plurality of pixel output units and is formed by a detection signal obtained in the pixel output units, the plurality of pixel output units receiving incident light entering without passing through either an imaging lens or a pinhole, and each outputting one detection signal indicating an output pixel value modulated by an incident angle of the incident light.

Effects of the Invention

By the present technology, an object can be imaged or an image can be processed. Further, by the present technology, unauthorized use and tampering of an image can be suppressed more easily.

BRIEF DESCRIPTION OF DRAWINGS

FIG. 62 is a diagram illustrating a modification example of the imaging element.

MODE FOR CARRYING OUT THE INVENTION

Hereinafter, modes for carrying out the present disclosure (hereinafter referred to as embodiments) will be described. Note that the description will be made in the following order.

1. First embodiment (imaging display system: unique pattern)
2. Second embodiment (imaging display system: variable pattern)
3. Third embodiment (imaging display system: restoration matrix provision)
4. Fourth embodiment (imaging display system: association)
5. Fifth embodiment (imaging display system: transmission via server)
6. Sixth embodiment (imaging device: self-restoration)
7. Seventh embodiment (imaging display system: color image)
8. Eighth embodiment (imaging display system: use case)
9. Ninth embodiment (another configuration example of imaging element, imaging device, and image output device)
10. Others 1. First Embodiment <Transmission of Detection Image>

In recent years, for example, an imaging element that does not use an imaging lens as described in, for example, Patent Document 1 has been considered. Use of such an imaging element eliminates the need for an imaging lens (makes a device imaging lens-free), and thus an imaging device can be reduced in size and can be mounted on a wider variety of devices.

Further, in recent years, more various devices have been connected to a network such as the Internet for communication. For this reason, images imaged by an imaging device are also transmitted via the Internet or the like and used for various services and the like more frequently.

However, in such transmission of an image, there is a risk of leak to an unauthorized user, and there has been a risk of unauthorized use and tampering of the image. Accordingly, for example, it is conceivable to encrypt and then transmit image data in transmission, but there has been a risk that a load increases due to processes of encryption and the like, thereby increasing power consumption, processing time, cost, and the like. For example, in a case of a device driven by a battery, there has been a possibility that a continuous driving time is reduced due to an increase in power consumption. Further, for example, in a low-performance device or the like, there has been a concern that the load exceeds processing capacity of the device, and encryption cannot be implemented.

Accordingly, an object is imaged by an imaging element including a plurality of pixel output units that receives incident light entering without passing through either an imaging lens or a pinhole, and that each outputs one detection signal indicating an output pixel value modulated by an incident angle of the incident light, and a detection image obtained by the imaging and formed by a detection signal obtained in the pixel output units of the imaging element is transmitted. In particular, the detection image is transmitted without being associated with a restoration matrix including coefficients used when a restored image is restored from the detection image.

Figure 1:
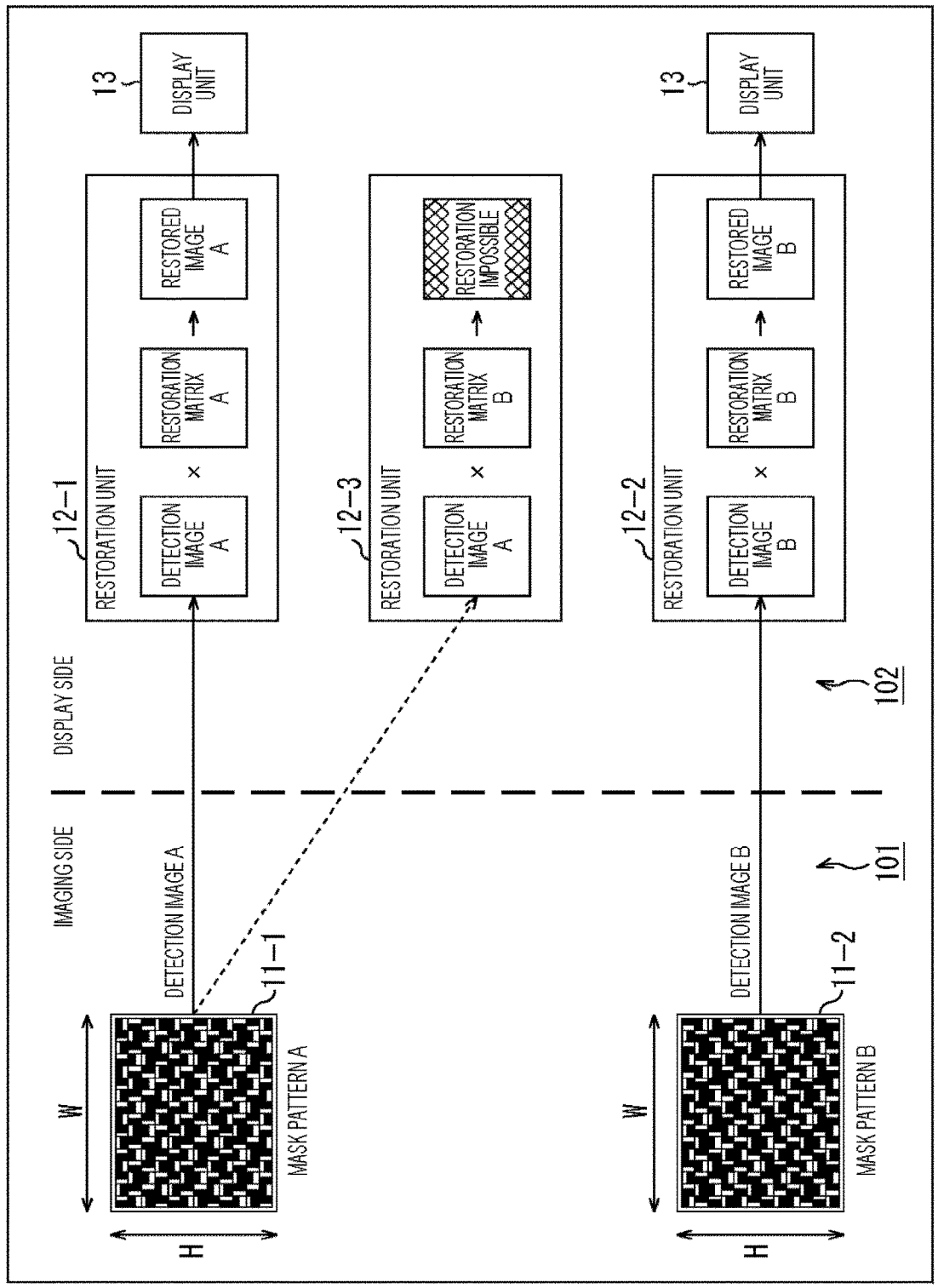
FIG. 1 is a diagram for describing an example of a state of detection image transmission.

FIG. 1 illustrates an overview thereof. Although details will be described later, a light-shielding film of a mask pattern A is formed on a pixel array of an imaging element 11-1 on an imaging side, and thus each pixel output unit has "a characteristic with respect to an incident angle of incident light from an object (also referred to as incident angle directivity)". Thus, the imaging element 11-1 can image an object without an imaging lens. However, a detection image obtained by the imaging is an image in which an object is visually unrecognizable. Then, this detection image in which an object is visually unrecognizable is transmitted.

This detection image can be converted into an imaged image (restored image) in which the object is visually recognizable by performing a predetermined calculation. More specifically, the restored image can be restored by multiplying the detection image by the restored image.

That is, in a restoration unit 12-1 on a receiving side, a transmitted detection image A is obtained and the detection image A is multiplied by a restoration matrix A, thereby obtaining a restored image A. The restored image is an image in which the object is visually recognizable, and thus the restored image A is displayed on a display unit 13. Thus, the imaged image imaged by the imaging element 11-1 can be transmitted from the imaging side to a display side and displayed on the display unit 13.

In the transmission, the detection image A in which the object is visually unrecognizable is transmitted, it is possible to suppress leak of the imaged image to an unauthorized user or the like during the transmission. That is, unauthorized use and tampering of an image can be suppressed.

In addition, since only the detection image obtained by imaging is transmitted as it is on the imaging side, processing such as encryption is unnecessary, and an increase in load can be suppressed. That is, unauthorized use and tampering of an image can be suppressed more easily.

Further, in addition, since the detection image A is an image generated under an influence of the mask pattern A, the detection image A cannot be converted into a restored image A in which the object is visually recognizable unless the restoration matrix A that is a coefficient matrix (corresponding to the mask pattern A) reflecting the influence of this mask pattern A is used. That is, unless a correct restoration matrix is used, the detection image cannot be converted into an image in which the object is visually recognizable. Therefore, even if an unauthorized user has a restoration matrix, the restored image cannot be restored correctly unless the restoration matrix correctly corresponds to the detection image (the mask pattern of the imaging element).

For example, it is assumed that a light-shielding film of a mask pattern B, which is a pattern different from the mask pattern A, is formed on an imaging element 11-2. In the imaging element 11-2, a detection image B is formed by imaging under an influence of the mask pattern B.

A restoration unit 12-2 on the receiving side has a restoration matrix B corresponding to the mask pattern B, and can obtain a restored image B by obtaining a transmitted detection image B and multiplying the detection image B by the restoration matrix B. Therefore, this restored image B is displayed on the display unit 13. Thus, similarly to the case of the restoration unit 12-1, the imaged image imaged by the imaging element 11-2 can be transmitted from the imaging side to the display side and displayed on the display unit 13.

However, even if a restoration unit 12-3 having the restoration matrix B similarly to the restoration unit 12-2 obtains the detection image A, the restoration unit 12-3 cannot perform correct restoration with this restoration matrix B, and an image in which the object is visually recognizable cannot be displayed on the display unit 13.

In this manner, unauthorized use and tampering of an image can be suppressed.

Note that the mask pattern of the imaging element may be different for each individual. That is, in manufacturing, the imaging element may be manufactured by changing the mask pattern for each individual. In this manner, possibility that a restoration matrix will leak can be reduced.

<Transmission Path>

Note that a transmission path for a detection image is arbitrary. For example, as illustrated in A of FIG. 2, the detection image may be transmitted via a network. Assuming that an imaging side device is an imaging device 101 and a display side device is an image output device 102, the imaging device 101 and the image output device 102 are each connected to the network 103 in a communicable manner, as illustrated in A of FIG. 2.

The network 103 is an arbitrary communication network and may be a wired communication network or a wireless communication network, or may be constituted of both of them. Further, the network 103 may be constituted of one communication network, or may be constituted of a plurality of communication networks. For example, the network 103 may include a communication network and a communication path of arbitrary communication standards such as the Internet, a public telephone line network, a wide area communication network for wireless mobile terminals such as what is called 3G network and 4G network, a wide area network (WAN), a local area network (LAN), a wireless communication network for performing communication conforming to Bluetooth (registered trademark) standards, a communication path of a short-range wireless communication such as a near field communication (NFC), a communication path of an infrared communication, a communication network of wired communication conforming to standards such as High-Definition Multimedia Interface (HDMI) (registered trademark) and universal serial bus (USB).

The imaging device 101 and the image output device 102 may communicate via such a network 103, and the detection image may be transmitted by the communication.

Figure 2:
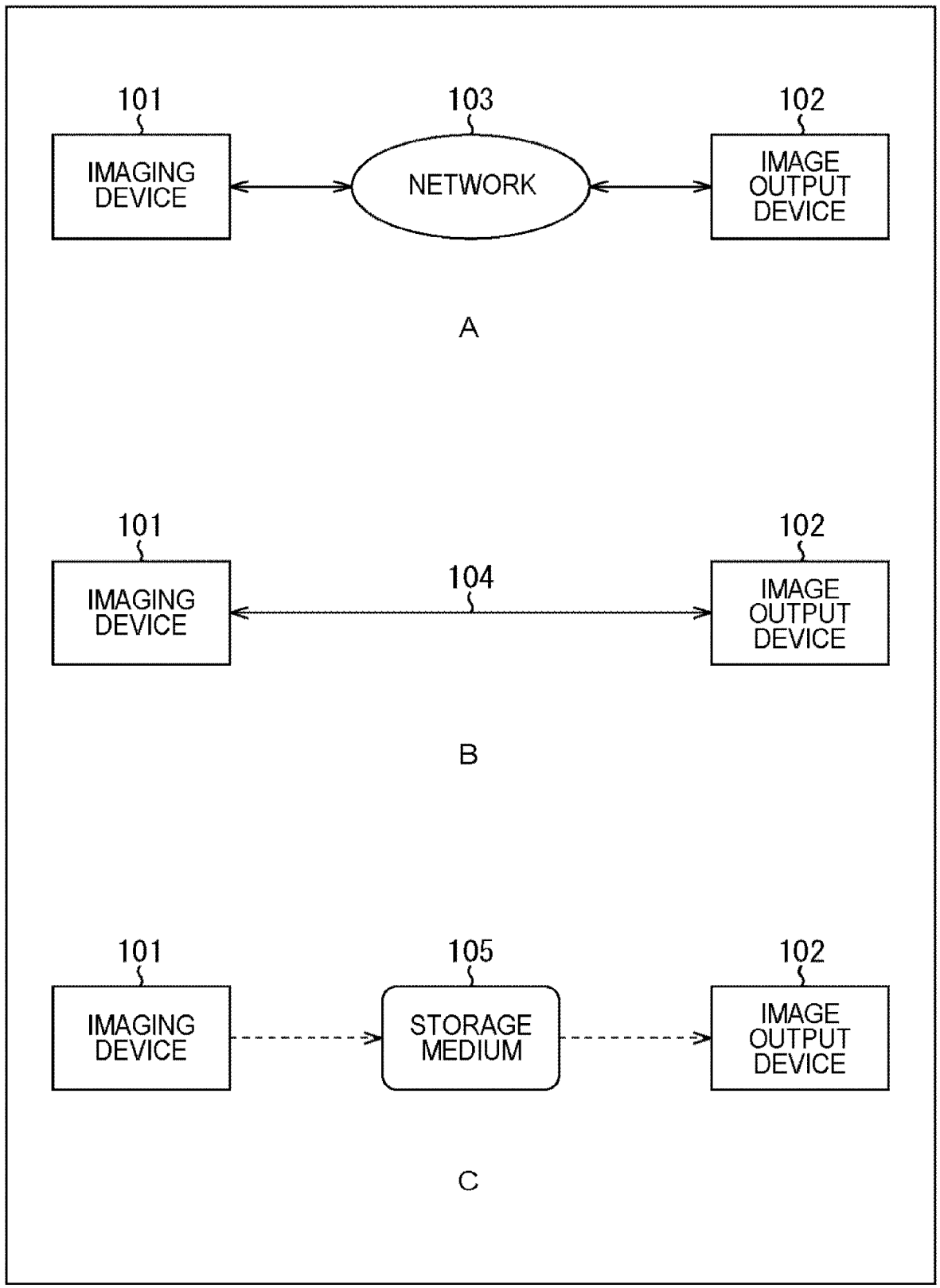
FIG. 2 is a diagram for describing an example of a transmission medium.

Further, for example, as illustrated in B of FIG. 2, the detection image may be transmitted via a predetermined cable. In a case of B of FIG. 2, the imaging device 101 and the image output device 102 are connected by, for example, a cable 104 with a predetermined standard such as HDMI (registered trademark) or USB. The imaging device 101 and the image output device 102 may transmit the detection image via such a cable 104.

Further, for example, as illustrated in C of FIG. 2, the detection image may be transmitted via a recording medium. That is, the imaging device 101 may record a detection image on a recording medium 105 attached to itself, the recording medium 105 may be attached to the image output device 102, and the image output device 102 may read out the detection image from the recording medium 105 attached to itself.

Figure 3:
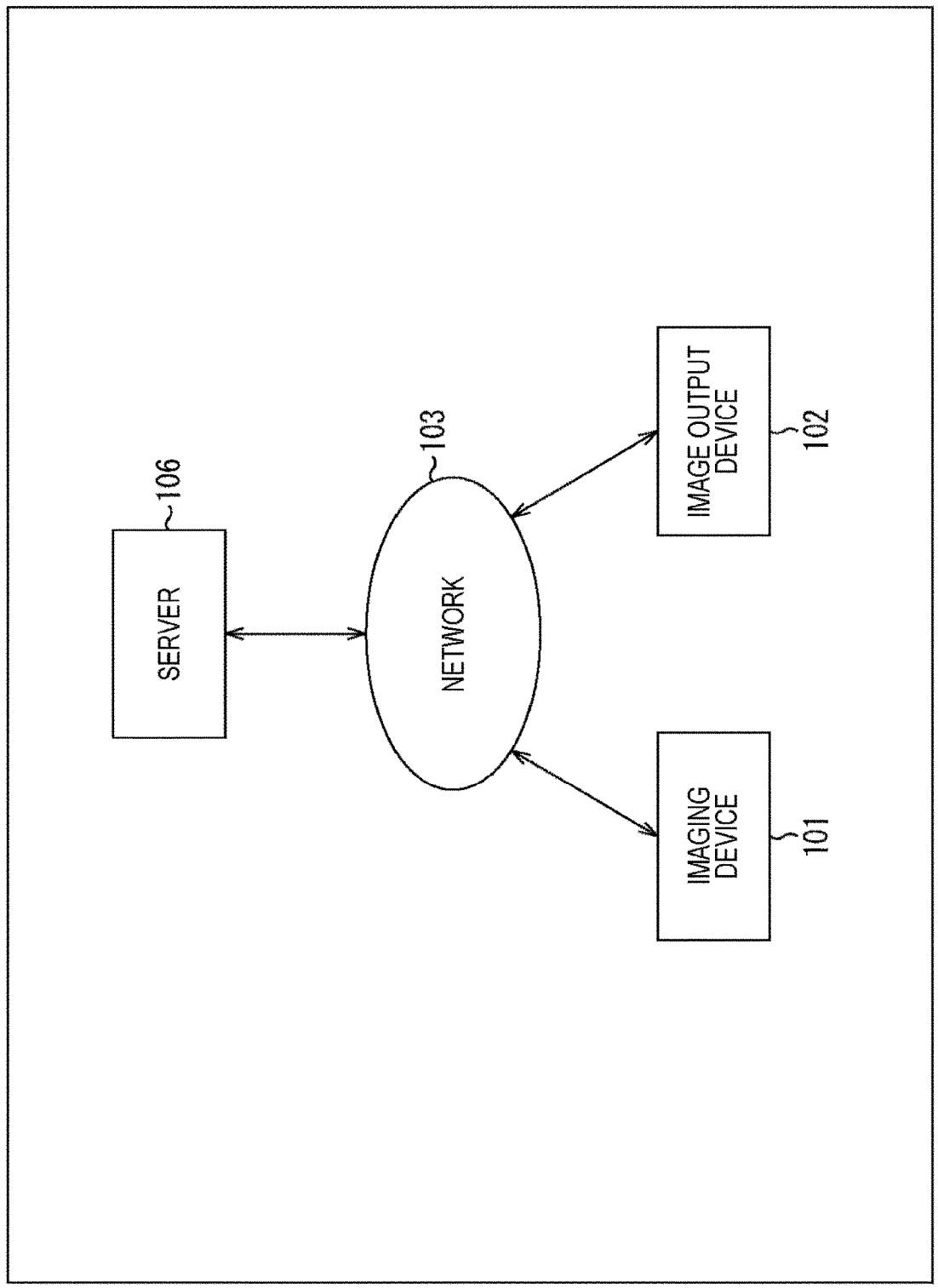
FIG. 3 is a diagram for describing an example of a transmission medium.

Further, for example, as illustrated in FIG. 3, a detection image may be transmitted via a server. In a case of an example in FIG. 3, a server 106 is connected to the network 103, and the imaging device 101 and the image output device 102 exchange detection images via the server 106. That is, the imaging device 101 uploads a detection image obtained by imaging to the server 106. The image output device 102 downloads the detection image from the server 106.

Of course, the transmission method (transmission path) for detection images is arbitrary and is not limited to the above example.

<Imaging Device>

Figure 4:
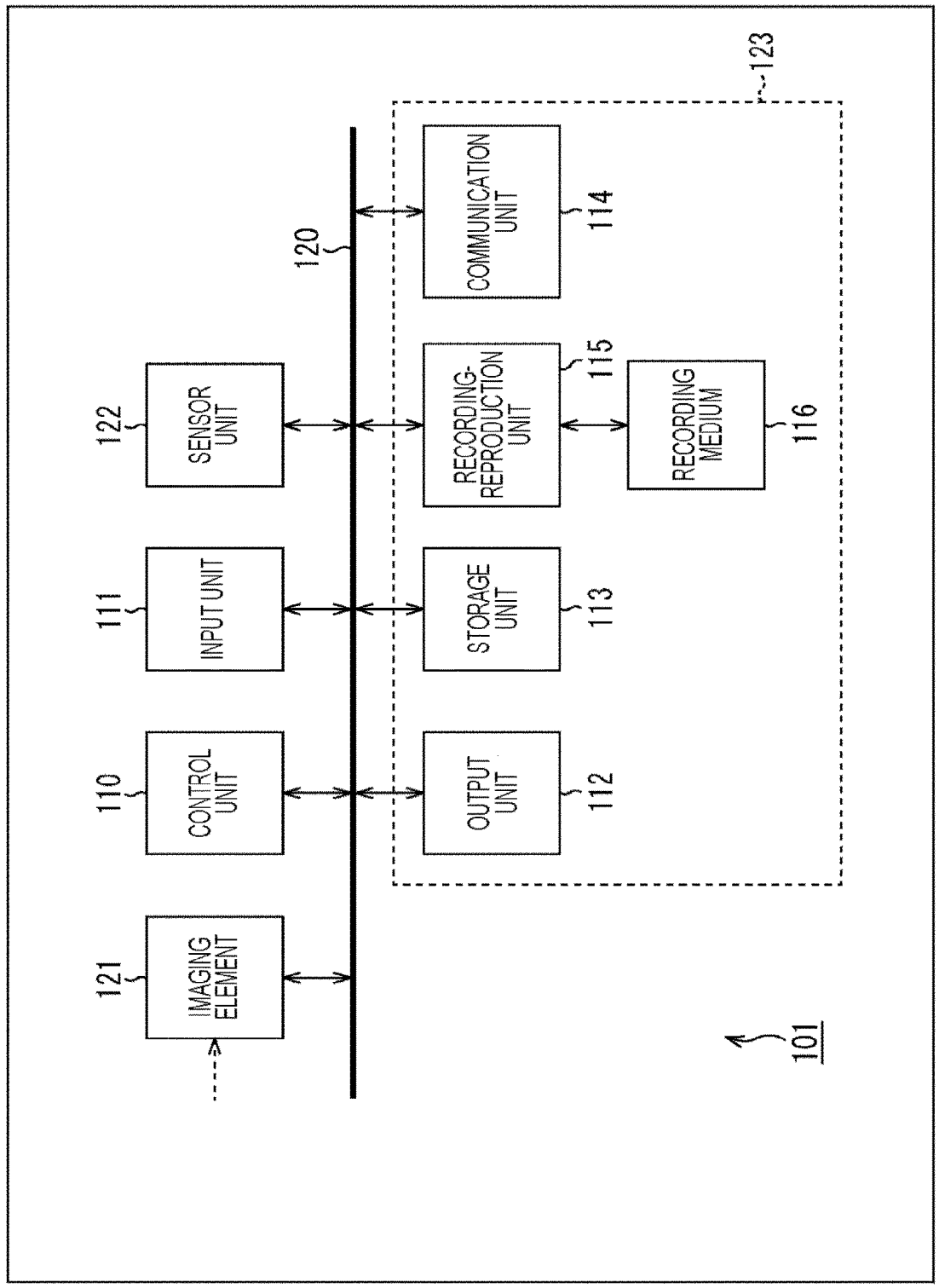
FIG. 4 is a block diagram illustrating a main configuration example of an imaging device.

Next, an imaging device that generates a detection image will be described. FIG. 4 is a diagram illustrating a main configuration example of an imaging device that is an embodiment of an imaging device to which the present technology is applied. An imaging device 101 illustrated in FIG. 4 is a device that images an object and obtains electronic data related to the imaged image.

As illustrated in FIG. 4, the imaging device 101 has a control unit 110, an input unit 111, an output unit 112, a storage unit 113, a communication unit 114, a recording-reproduction unit 115, an imaging element 121, a sensor unit 122, and the like. Each processing unit and the like are connected via a bus 120 and can exchange information, instructions, and the like with each other.

The control unit 110 is configured to perform processing related to control of each processing unit and the like in the imaging device 101. For example, the control unit 110 has a central processing unit (CPU), a read only memory (ROM), a random access memory (RAM), and the like, and performs the above-described processing by executing a program using the CPU and the like.

The input unit 111 is configured to perform processing related to input of information. For example, the input unit 111 has input devices such as an operating button, a dial, a switch, a touch panel, a remote controller, and a sensor, and an external input terminal. For example, the input unit 111 receives an instruction (information corresponding to an input operation) from the outside by a user or the like with these input devices. Further, for example, the input unit 111 obtains arbitrary information (program, command, data, and the like) supplied from an external device via the external input terminal. Further, for example, the input unit 111 supplies the received information (obtained information) to another processing unit or the like via the bus 120.

Note that the sensor included in the input unit 111 may be, for example, any sensor such as an acceleration sensor as long as it is capable of receiving an instruction from the outside by the user or the like. Further, the input device which the input unit 111 has is arbitrary, and the number thereof is also arbitrary. The input unit 111 may have a plurality of types of input devices. For example, the input unit 111 may have a part of the above-described examples, or may have all of them. Further, the input unit 111 may have an input device other than the examples described above. Moreover, for example, the input unit 111 may obtain control information of itself (input device or the like) supplied via the bus 120 and drive on the basis of the control information.

The output unit 112 is configured to perform processing related to output of information. For example, the output unit 112 has an image display device such as a monitor, an image projection device such as a projector, an audio output device such as a speaker, an external output terminal, and the like. For example, the output unit 112 outputs information supplied from another processing unit or the like via the bus 120 using these output devices or the like. For example, the output unit 112 displays an arbitrary image of a graphical user interface (GUI) or the like on a monitor for example, projects the arbitrary image of the GUI or the like from a projector for example, outputs audio (for example, audio corresponding to an input operation, a processing result, or the like), or outputs arbitrary information (program, command, data, or the like) to the outside (another device).

Note that the output device and the like which the output unit 112 has are arbitrary, and the number thereof is also arbitrary. The output unit 112 may have a plurality of types of output devices and the like. For example, the output unit 112 may have a part of the above-described examples, or may have all of them. Further, the output unit 112 may have an output device and the like other than the examples described above. Furthermore, for example, the output unit 112 may obtain control information of itself (output device or the like) supplied via the bus 120 and drive on the basis of the control information.

The storage unit 113 is configured to perform processing related to storage of information. For example, the storage unit 113 has an arbitrary storage medium such as a hard disk or a semiconductor memory. For example, the storage unit 113 stores information (program, command, data, or the like) supplied from other processing units and the like via the bus 120 in the storage medium. Further, the storage unit 113 may store arbitrary information (program, command, data, or the like) at a time of shipment. Furthermore, the storage unit 113 reads out information stored in the storage medium at an arbitrary timing or in response to a request from another processing unit or the like, and supplies the read-out information to another processing unit or the like via the bus 120.

Note that the storage medium included in the storage unit 113 is arbitrary, and the number thereof is also arbitrary. The storage unit 113 may have a plurality of types of storage media. For example, the storage unit 113 may have a part of the examples of the storage medium described above, or may have all of them. Further, the storage unit 113 may have a storage medium and the like other than the examples described above. Further, for example, the storage unit 113 may obtain control information of itself supplied via the bus 120 and drive on the basis of the control information.

The communication unit 114 is configured to perform processing related to communication with other devices. For example, the communication unit 114 has a communication device that performs communication for exchanging information such as programs and data with an external device via a predetermined communication medium (for example, an arbitrary network such as the Internet). For example, the communication unit 114 communicates with other devices, and supplies information (program, command, data, or the like) supplied from another processing unit or the like via the bus 120 to another device that is a communication partner thereof. Further, for example, the communication unit 114 communicates with other devices, obtains information supplied from another device that is a communication partner thereof, and supplies the information to another processing unit or the like via the bus 120.

The communication device which the communication unit 114 has may be any device. For example, the communication device may be a network interface. A communication method and a communication standard are arbitrary. For example, the communication unit 114 may be capable of performing wired communication, wireless communication, or both of them. Further, for example, the communication unit 114 may obtain control information of itself (communication device or the like) supplied via the bus 120 and drive on the basis of the control information.

The recording-reproduction unit 115 is configured to perform processing related to recording and reproduction of information using the recording medium 116 attached to itself. For example, the recording-reproduction unit 115 reads out information (program, command, data, or the like) recorded on the recording medium 116 attached to itself, and supplies the information to another processing unit or the like via the bus 120. Further, for example, the recording-reproduction unit 115 obtains information supplied from another processing unit or the like via the bus 120, and writes (records) the information in (on) the recording medium 116 attached to itself. Note that, for example, the recording-reproduction unit 115 may obtain control information of itself supplied via the bus 120 and drive on the basis of the control information.

Note that the recording medium 116 may be any type. For example, the recording medium 116 may be a magnetic disk, an optical disk, a magneto-optical disk, a semiconductor memory, or the like.

The imaging element 121 is configured to perform processing related to imaging of an object. For example, the imaging element 121 images an object and obtains data (electronic data) related to the imaged image. At that time, the imaging element 121 can image an object without using an imaging lens, an optical filter or the like such as a diffraction grating, a pinhole, or the like, and obtain data related to the imaged image. For example, the imaging element 121 images an object and obtains data (detection signal or the like) that allows obtaining of data of the imaged image by a predetermined calculation.

Note that the imaged image is an image that is formed by pixel values by which an image of an object is formed and is visually recognizable as an image by the user. On the other hand, an image (referred to as a detection image) formed by a detection signal that is a detection result of incident light in a pixel unit output of the imaging element 121 is an image that cannot be visually recognized as an image by the user because an image of an object is not formed (that is, the object is visually unrecognizable). That is, the detection image is an image different from the imaged image. However, as described above, by performing a predetermined calculation on data of the detection image, the imaged image, that is, an image in which the image of the object is formed and which is visually recognizable as an image by the user (that is, the object is visually recognizable) can be restored. This restored imaged image is referred to as a restored image. That is, the detection image is an image different from the restored image.

Note that an image that constitutes the restored image and that has not yet been subjected to a synchronization process, a color separation process, or the like (for example, a demosaic process or the like) is referred to as a raw image. Similarly to the imaged image, this raw image is also an image that is visually recognizable as an image by the user (that is, the object is visually recognizable). In other words, the detection image is an image according to an array of a color filter, but is an image different from the raw image.

However, in a case where the imaging element 121 has sensitivity only to, for example, invisible light such as infrared light and ultraviolet light, the restored image (raw image or imaged image) also becomes an image that is not visually recognizable as an image (the object is not visually recognizable) by the user. However, since this is due to a wavelength range of detected light, the restored image can be an image in which the object is visually recognizable by converting the wavelength range to a visible light range. On the other hand, since the image of the object is not formed, the detection image cannot become an image in which the object is visually recognizable by just converting the wavelength range. Therefore, even in a case where the imaging element 121 has sensitivity only to invisible light, an image obtained by performing a predetermined calculation on the detection image as described above is referred to as a restored image. Note that in the following, the present technology will be described basically using a case where the imaging element 121 receives visible light as an example unless otherwise specified.

That is, the imaging element 121 can image an object and obtain data related to the detection image. The imaging element 121 supplies data related to the detection image to other processing units (for example, the output unit 112, the storage unit 113, the communication unit 114, the recording-reproduction unit 115, and the like) or the like via the bus 120. Further, for example, the imaging element 121 may obtain control information of itself supplied via the bus 120 and drive on the basis of the control information.

The sensor unit 122 is configured to perform processing related to detection. For example, the sensor unit 122 has an arbitrary sensor and performs detection for a predetermined parameter. For example, the sensor unit 122 detects a parameter related to a state around the imaging device 101, a parameter related to a state of the imaging device 101, and the like. For example, the sensor unit 122 performs detection for a parameter related to a state of the imaging element 121. Further, for example, the sensor unit 122 supplies detected information to another processing unit or the like via the bus 120. Note that, for example, the sensor unit 122 may obtain control information of itself supplied via the bus 120 and drive on the basis of the control information.

Note that a part or all of the output unit 112, the storage unit 113, the communication unit 114, and the recording-reproduction unit 115 may be integrated into an output processing unit 123. The output processing unit 123 is configured to perform processing related to output of the detection image. The output processing unit 123 may be implemented by any physical component. For example, the output processing unit 123 may be implemented as a processor such as a system large scale integration (LSI). Further, the output processing unit 123 may be implemented as, for example, a module using a plurality of processors or the like, a unit using a plurality of modules or the like, or a set obtained by further adding other functions to a unit, or the like (that is, a part of the configuration of the device). Further, the output processing unit 123 may be implemented as a device.

<Regarding Imaging Element>

Next, the imaging element 121 will be described with reference to FIGS. 5 to 27.

<Pixel and Pixel Output Unit>

In the present description, the term "pixel" (or "pixel output unit") is used to describe the present technology. In the present description, a "pixel" (or "pixel output unit") refers to a division unit, including at least one physical component that can receive light independently from other pixels, of an area (also referred to as a pixel area) in which a physical component for receiving incident light of the imaging element 121 is formed. The physical component capable of receiving light is, for example, a photoelectric conversion element, or for example, a photodiode (PD). The number of physical components (for example, photodiodes) formed in one pixel is arbitrary, and may be singular or plural. The type, size, shape, and the like thereof are also arbitrary.

Further, the physical component of this "pixel" unit includes not only the above-described "physical component capable of receiving light", but also includes, for example, all physical components related to reception of incident light, such as an on-chip lens, a light-shielding film, a color filter, a planarization film, and an antireflection film. Furthermore, a component such as a readout circuit may also be included. That is, the physical component of this pixel unit may be any component.

Further, a detection signal read out from a "pixel" (that is, a physical component of a pixel unit) may also be referred to as a "detection signal of a pixel unit (or pixel output unit)" or the like. Moreover, the detection signal of this pixel unit (or pixel output unit) is also referred to as a "pixel unit detection signal (or pixel output unit detection signal)". Further, this pixel unit detection signal is also referred to as a "pixel output". Moreover, the value is also referred to as an "output pixel value".

The value of the detection signal (output pixel value) in pixel units of the imaging element 121 can have an incident angle directivity indicating a directivity with respect to the incident angle of incident light from the object independently from the others. That is, each pixel unit (pixel output unit) of the imaging element 121 has a configuration in which the incident angle directivity indicating a directivity of the output pixel value with respect to the incident angle of incident light from the object is independently settable. For example, in the imaging element 121, output pixel values of at least two pixel units can have different incident angle directivities indicating directivities with respect to the incident angle of incident light from the object.

Note that since the number of "physical components capable of receiving light" included in a "pixel (or pixel output unit)" is arbitrary as described above, the pixel unit detection signal may be a detection signal obtained by a single "physical component capable of receiving light" or may be detection signals obtained by a plurality of "physical components capable of receiving light".

Further, a plurality of pixel unit detection signals (output pixel values) can be combined into one at an arbitrary stage. For example, output pixel values of a plurality of pixels may be added in the state of an analog signal, or may be added after being converted into a digital signal.

Further, after this detection signal is read out from the imaging element 121, that is, in the detection image, a plurality of detection signals can be combined into a single detection signal or a single detection signal can be converted into a plurality of detection signals. That is, resolution (the number of pieces of data) of the detection image is variable.

Incidentally, for convenience of description below, unless otherwise specified, the imaging element 121 will be described as having a pixel area in which a plurality of pixels is disposed in a matrix (a pixel array is formed). Note that an arrangement pattern of pixels (or pixel output units) of the imaging element 121 is arbitrary, and is not limited to this example. For example, the pixels (or pixel output units) may be disposed in a honeycomb structure. Further, for example, the pixels (or pixel output units) may be disposed in one row (or one column). That is, the imaging element 121 may be a line sensor.

Note that a wavelength range in which the imaging element 121 (pixels thereof) has sensitivity is arbitrary. For example, the imaging element 121 (pixels thereof) may be sensitive to visible light, may be sensitive to invisible light such as infrared light and ultraviolet light, or may be sensitive to both visible light and invisible light. For example, in a case where the imaging element detects far-infrared light that is invisible light, a thermograph (an image representing a heat distribution) can be generated using an imaged image obtained in the imaging element. However, in a case of an imaging element with an imaging lens, since it is difficult for glass to transmit far-infrared light, an imaging lens including an expensive special material is necessary, which may increase manufacturing cost. Since the imaging element 121 can image an object without using an imaging lens or the like and obtain data related to the imaged image, by making the pixels thereof capable of detecting far-infrared light, an increase in manufacturing cost can be suppressed. That is, far-infrared light can be imaged at lower cost (a thermograph can be obtained at lower cost). Note that in a case where the imaging element 121 (pixels thereof) has sensitivity to invisible light, the restored image is not an image in which the user can visually recognize the object but is an image in which the user cannot visually recognize the object. In other words, the restored image may be an image of visible light or an image of invisible light (for example, (far) infrared light, ultraviolet light, and the like).

<Incident Angle Directivity>

The imaging element 121 has a plurality of pixel output units that receives incident light entering without passing through either an imaging lens or a pinhole, and that each outputs one detection signal indicating an output pixel value modulated by an incident angle of the incident light. For example, the imaging element 121 has a configuration such that incident angle directivities, indicating directivities with respect to the incident angle of incident light from an object, of output pixel values of at least two pixel output units out of the plurality of pixel output units are different characteristics from each other. That is, in this case, the imaging element 121 can obtain detection signals for a plurality of pixel output units (a plurality of pixel output unit detection signals), and the incident angle directivities, indicating directivities with respect to the incident angle of incident light from an object, of at least two pixel output unit detection signals thereof are different from each other.

Here, the "incident angle directivity" refers to a light receiving sensitivity characteristic corresponding to an incident angle of incident light, that is, detection sensitivity with respect to the incident angle of the incident light. For example, even if incident light has the same light intensity, the detection sensitivity may change depending on the incident angle thereof. Such a deviation in detection sensitivity (including a case where there is no deviation) will be referred to as an "incident angle directivity".

For example, in a case where incident light having the same light intensities as each other are incident on physical components of two pixel output units thereof at the same incident angles as each other, signal levels (detection signal levels) of detection signals of the pixel output units can have different values from each other. The imaging element 121 (each pixel output unit) has physical components having such characteristics.

This incident angle directivity may be achieved by any method. For example, the incident angle directivity may be achieved by providing a light-shielding film, or the like in front (light incident side) of a photoelectric conversion element (photodiode or the like) of an imaging element having a basic structure similar to that including a common imaging element such as a complementary metal oxide semiconductor (CMOS) image sensor for example.

If imaging is performed only with a general imaging element including pixels having the same incident angle directivities, light with substantially the same light intensity is incident on all pixels of the imaging element, and an image of an image-formed object cannot be obtained. Accordingly, in general, an imaging lens or a pinhole is provided in front of the imaging element (on the light incident side). For example, by providing an imaging lens, light from an object plane can be image-formed on the imaging surface of the imaging element. Therefore, the imaging element can obtain a detection signal with a level corresponding to the image of the image-formed object at each pixel (that is, an imaged image of the imaged object can be obtained). However, in this case, the size is physically increased, and it may be difficult to reduce the size of the device. Further, in a case where a pinhole is provided, although the size can be reduced as compared with a case where an imaging lens is provided, measures such as increasing an exposure time or increasing gain are necessary because the amount of light incident on the imaging element is reduced, and there has been a possibility that blurring is liable to occur in high-speed imaging of an object, or color expression is not natural.

Figure 5:
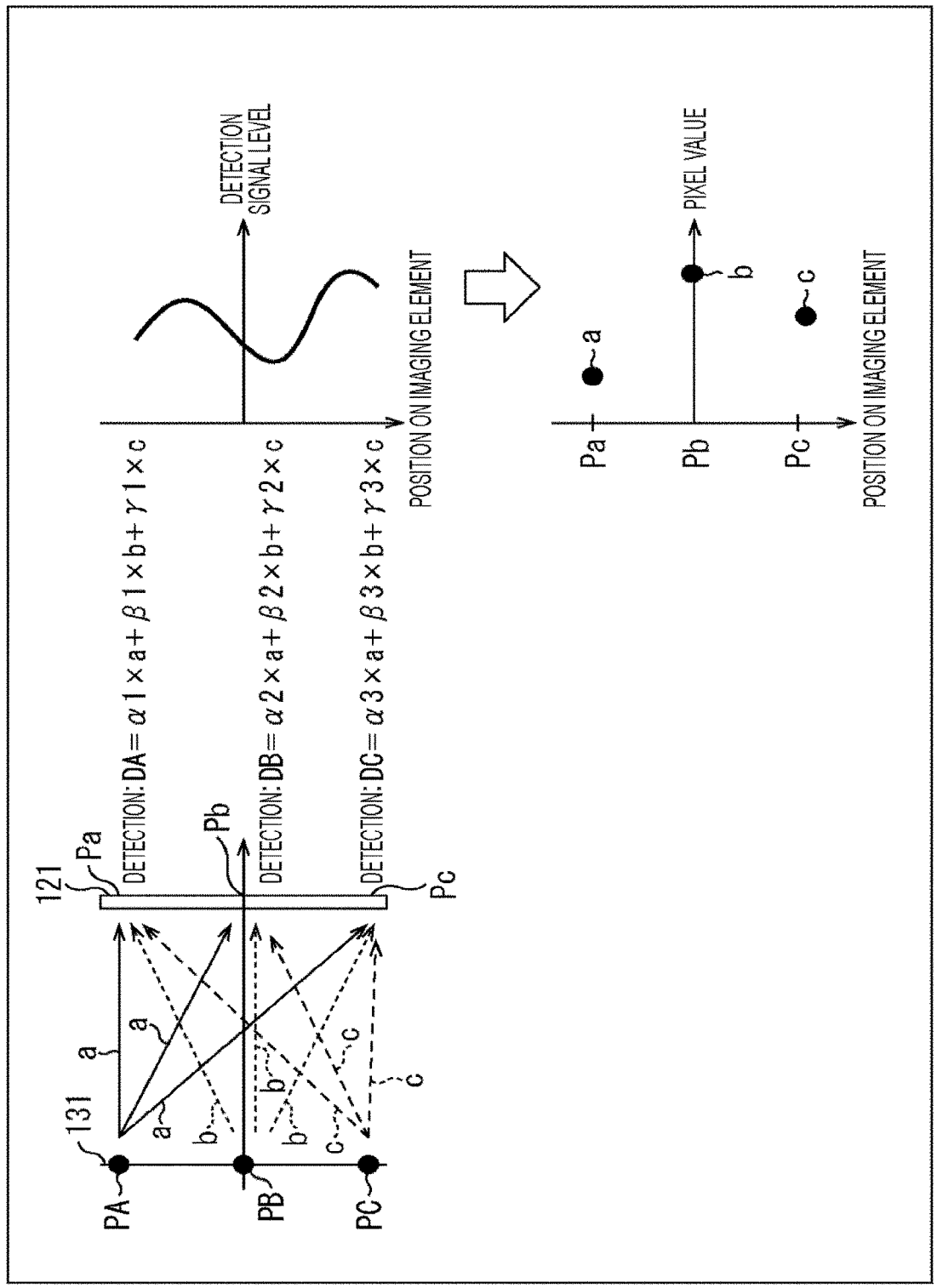
FIG. 5 is a diagram describing principles of imaging in the imaging device to which a technology of the present disclosure is applied.

On the other hand, the imaging element 121 has incident angle directivities in which the detection sensitivities of the pixels are different from each other, as illustrated in an upper left part of FIG. 5. That is, the light receiving sensitivity characteristic corresponding to an incident angle of incident light is different for each pixel. However, it is not necessary that the light receiving sensitivity characteristics of all the pixels are completely different, and part of pixels may include pixels having the same light receiving sensitivity characteristics and part of pixels may have different light receiving sensitivity characteristics.

In a case where it is assumed that a light source constituting an object plane 131 is a point light source, in the imaging element 121, a light beam with the same light intensity emitted from the same point light source is incident on all the pixels, but is incident at a different incident angle on every pixel. Then, since respective pixels of the imaging element 121 have different incident angle directivities from each other, the light beam with the same light intensity is detected by different sensitivity from each other. That is, a detection signal with a different signal level is detected for each pixel.

More specifically, the sensitivity characteristic according to the incident angle of the incident light received at each pixel of the imaging element 121, that is, the incident angle directivity according to the incident angle at each pixel is expressed by a coefficient representing light receiving sensitivity according to the incident angle, and the signal level of the detection signal according to the incident light in each pixel (also referred to as a detection signal level) can be obtained by multiplication by a coefficient that is set corresponding to the light receiving sensitivity according to the incident angle of the incident light.

More specifically, as illustrated in the upper left part of FIG. 5, detection signal levels DA, DB, DC at positions Pa, Pb, Pc are expressed by the following equations (1) to (3), respectively.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

Here, $\alpha 1$ is a coefficient that is set according to an incident angle of a light beam from a point light source PA on the object plane 131 to be restored at the position Pa on the imaging element 121. $\beta 1$ is a coefficient that is set according to an incident angle of a light beam from a point light source PB on the object plane 131 to be restored at the position Pa on the imaging element 121. $\gamma 1$ is a coefficient that is set according to an incident angle of a light beam from a point light source PC on the object plane 131 to be restored at the position Pa on the imaging element 121.

As described in equation (1), the detection signal level DA at the position Pa is expressed by a sum (composite value) of a product of a light intensity "a" of the light beam from the point light source PA at the position Pa and the coefficient $\alpha 1$, a product of a light intensity "b" of the light beam from the point light source PB at the position Pa and the coefficient $\beta 1$, and a product of a light intensity "c" of the light beam from the point light source PC at the position Pa and the coefficient $\gamma 1$. Hereinafter, coefficients $\alpha x$, $\beta x$, $\gamma x$ (x is a natural number) are collectively referred to as a coefficient set.

Similarly, a coefficient set $\alpha 2$, $\beta 2$, $\gamma 2$ of equation (2) is a coefficient set that is set according to the incident angles of the light beams from the point light sources PA, PB, PC on the object plane 131 to be restored at the position Pb on the imaging element 121. That is, as in the above equation (2), the detection signal level DB at the position Pb is expressed by a sum (composite value) of a product of a light intensity "a" of the light beam from the point light source PA at the position Pb and the coefficient $\alpha 2$, a product of a light intensity "b" of the light beam from the point light source PB at the position Pb and the coefficient $\beta 2$, and a product of a light intensity "c" of the light beam from the point light source PC at the position Pb and the coefficient $\gamma 2$. Further, a coefficient set $\alpha 3$, $\beta 3$, $\gamma 3$ of equation (3) is a coefficient set that is set according to the incident angles of the light beams from the point light sources PA, PB, PC on the object plane 131 to be restored at the position Pc on the imaging element 121. That is, as in the above equation (3), the detection signal level DC at the position Pc is expressed by a sum (composite value) of a product of a light intensity "a" of the light beam from the point light source PA at the position Pc and the coefficient $\alpha 3$, a product of a light intensity "b" of the light beam from the point light source PB at the position Pc and the coefficient $\beta 3$, and a product of a light intensity "c" of the light beam from the point light source PC at the position Pc and the coefficient $\gamma 3$.

As described above, these detection signal levels are different from those in which an image of an object is formed because light intensities of light beams emitted from each of the point light sources PA, PB, PC are mixed. That is, the detection signal level illustrated in an upper right part of FIG. 5 is not a detection signal level corresponding to an image (imaged image) on which an image of an object is formed, and hence is different from a pixel value illustrated in a lower right part of FIG. 5 (generally the both do not match).

However, by composing simultaneous equations using these coefficient set α1, β1, γ1, coefficient set α2, β2, γ2, and coefficient set α3, β3, γ3 and the detection signal levels DA, DB, DC, and by solving the simultaneous equations of the above-described equations (1) to (3) with a, b, c being variables, pixel values at the respective positions Pa, Pb, Pc as illustrated in the lower right part of FIG. 5 can be obtained. Thus, a restored image that is a set of pixel values (an image in which an image of an object is formed) is restored.

With such a configuration, the imaging element 121 has incident angle directivities different from each other in at least two pixel output units without a need for an imaging lens, an optical filter including a diffraction grating or the like, a pinhole, or the like. Consequently, an imaging lens, an optical filter including a diffraction grating or the like, a pinhole, or the like is not a necessary component, and thus it becomes possible to reduce the height of the imaging device, that is, the thickness in an incident direction of light in a configuration that achieves an imaging function.

<Formation of Incident Angle Directivity>

Figure 6:
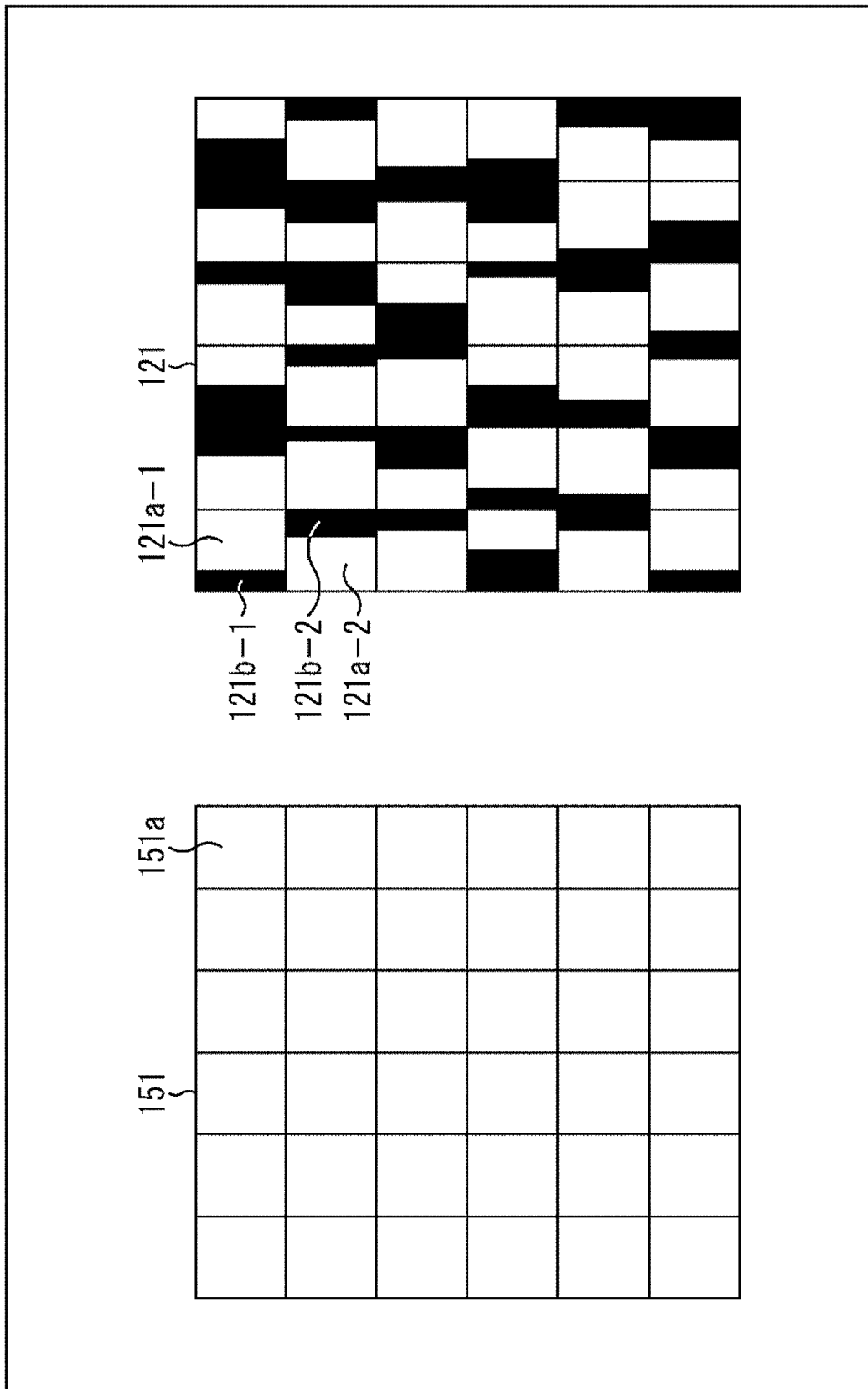
FIG. 6 is a diagram describing a difference in configuration between a conventional imaging element and an imaging element of the present disclosure.

A left part of FIG. 6 illustrates a front view of a part of a pixel array unit of a general imaging element, and a right part of FIG. 6 illustrates a front view of a part of the pixel array unit of the imaging element 121. Note that FIG. 6 illustrates an example of a case where setting of the numbers of pixels in horizontal direction×vertical direction of the pixel array unit is 6 pixels×6 pixels, respectively, but the setting of the numbers of pixels is not limited to this.

The incident angle directivity can be formed by a light-shielding film, for example. It is illustrated that in a general imaging element 151, as in an example of the left part of FIG. 6, pixels 151a having the same incident angle directivity are arranged in an array. On the other hand, the imaging element 121 in an example of the right part of FIG. 6 is provided with a light-shielding film 121b, which is one of modulation elements, so as to cover a part of a light receiving area of a photodiode thereof in each pixel 121a, and incident light incident on each pixel 121a is optically modulated according to an incident angle. Then, for example, by providing the light-shielding film 121b in a different range for each pixel 121a, light receiving sensitivity with respect to the incident angle of incident light differs for each pixel 121a, and each pixel 121a has a different incident angle directivity.

For example, in a pixel 121a-1 and a pixel 121a-2, ranges of shielding pixels from light by a light-shielding film 121b-1 and a light-shielding film 121b-2 provided are different (at least one of light-shielding region (position) and light-shielding area is different). That is, in the pixel 121a-1, the light-shielding film 121b-1 is provided so as to shield a left part in the light receiving area of the photodiode from light by a predetermined width, and in the pixel 121a-2, the light-shielding film 121b-2 is provided so as to shield a right part in the light receiving area from light by a width wider in a horizontal direction than the light-shielding film 121b-1. In the other pixel 121a, similarly, the light-shielding film 121b is provided so that a different range in the light receiving area is shielded from light in each pixel, and is randomly disposed in the pixel array.

Note that the range of the light-shielding film 121b is desirably set to an area that can secure a desired amount of light because the larger the ratio of covering the light receiving area of each pixel, the smaller the quantity of light that can be received. For example, a limitation such that the area of the light-shielding film 121b is up to approximately ¾ of the entire range capable of receiving light may be added. With such a configuration, it becomes possible to ensure an amount of light equal to or more than a desired amount. However, if each pixel is provided with a non-shielded range having a width corresponding to the wavelength of light to be received, it is possible to receive a minimum amount of light. That is, for example, in a case of a blue pixel (B pixel), the wavelength is about 500 nm, and it is possible to receive a minimum amount of light as long as light shielding thereof is not equal to or larger than a width corresponding to this wavelength.

<Configuration Example of Imaging Element>

Figure 7:
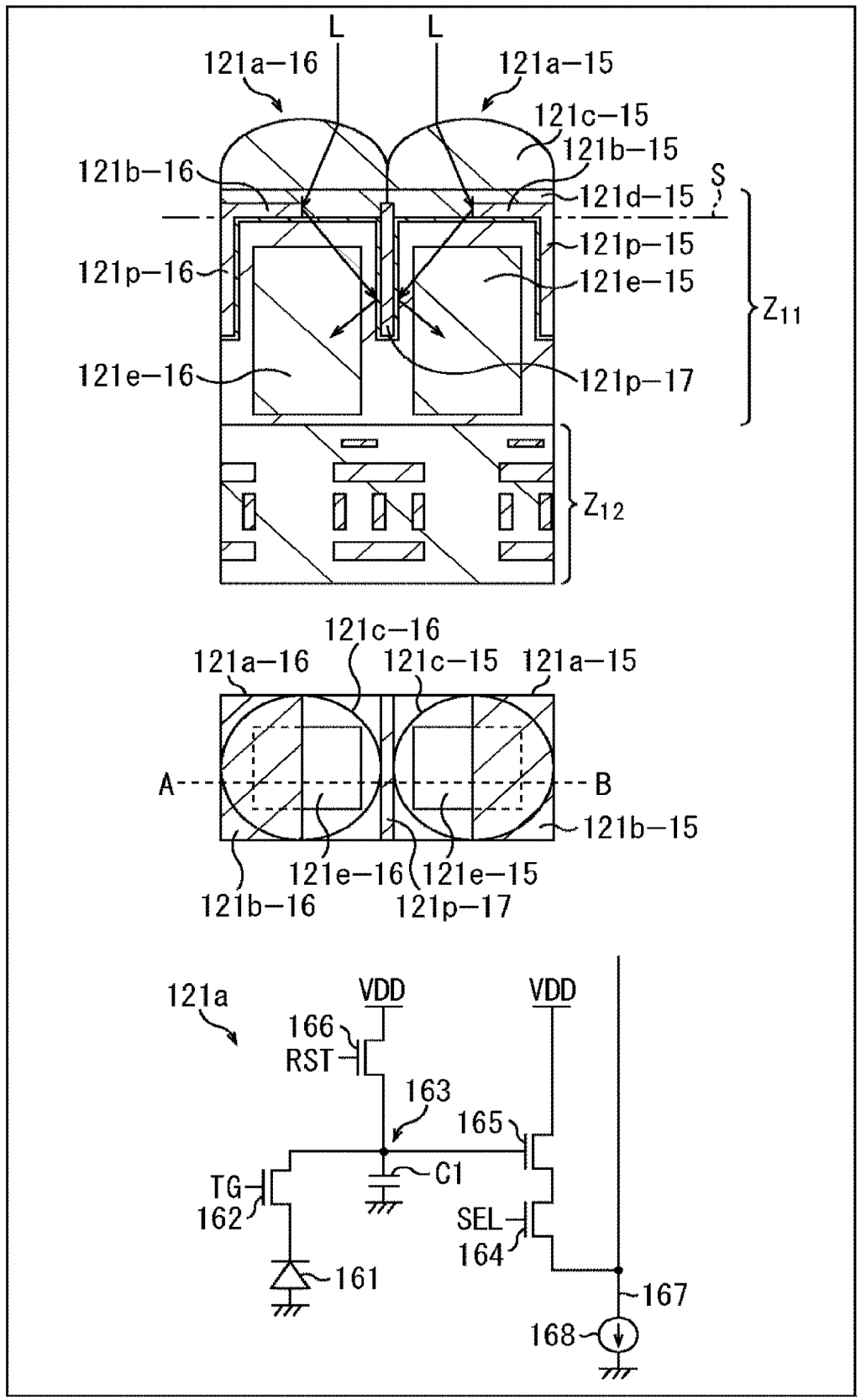
FIG. 7 is a view describing a first configuration example of the imaging element.

A configuration example of the imaging element 121 in this case will be described with reference to FIG. 7. An upper part of FIG. 7 is a cross-sectional side view of the imaging element 121, and a middle part of FIG. 7 is a top view of the imaging element 121. Further, the cross-sectional side view of the upper part of FIG. 7 is an AB cross section in a middle part of FIG. 7. Furthermore, a lower part of FIG. 7 is a circuit configuration example of the imaging element 121.

The imaging element 121 having the configuration illustrated in FIG. 7 includes a plurality of pixel output units that receives incident light entering without passing through either an imaging lens or a pinhole, and each outputs one detection signal indicating an output pixel value modulated by the incident angle of the incident light. For example, this imaging element 121 has a configuration such that incident angle directivities, indicating directivities with respect to the incident angle of incident light from an object, of output pixel values of at least two pixel output units out of the plurality of pixel output units are different characteristics from each other. Further, in the imaging element 121 in this case, a plurality of pixel output units thereof has a configuration in which an incident angle directivity indicating a directivity with respect to the incident angle of incident light from an object is independently settable in each of the pixel output units.

In the imaging element 121 in the upper part of FIG. 7, incident light enters from an upper side to a lower side in the drawing. Adjacent pixels 121a-15, 121a-16 are of what is called a back-illuminated type in which a wiring layer Z12 is provided in a lowermost layer in the drawing and a photoelectric conversion layer Z11 is provided thereon.

Note that in a case where it is not necessary to distinguish the pixels 121a-15, 121a-16, the pixels 121a-15, 121a-16 are simply referred to as a pixel 121a, and other components are also referred to similarly. Further, in FIG. 7, there are a side view and a top view for two pixels constituting a pixel array of the imaging element 121, but it goes without saying that a larger number of pixels 121a are arranged but omitted from illustration.

Moreover, the pixels 121a-15, 121a-16 include photodiodes 121e-15, 121e-16, respectively, in the photoelectric conversion layer Z11. Further, on the photodiodes 121e-15, 121e-16, on-chip lenses 121c-15, 121c-16 and color filters 121d-15, 121d-16 are respectively formed from above.

The on-chip lenses 121c-15, 121c-16 collect incident light on the photodiodes 121e-15, 121e-16.

The color filters 121d-15, 121d-16 are, for example, optical filters that transmit light with specific wavelengths such as red, green, blue, infrared, and white. Note that in a case of white, the color filters 121d-15, 121d-16 may or may not be transparent filters.

In the photoelectric conversion layer Z11 of the pixels 121a-15, 121a-16, light-shielding films 121p-15 to 121p-17 are respectively formed at a boundary between the pixels, so as to suppress crosstalk between the adjacent pixels.

Further, light-shielding films 121b-15, 121b-16, which are one of modulation elements, shield a part of a light receiving surface S from light as illustrated in the upper and middle parts of FIG. 7. Since the part of the light receiving surface S is shielded from light by the light-shielding film 121b, incident light incident on the pixel 121a is optically modulated according to an incident angle. Since the pixel 121a detects the optically modulated incident light, the pixel 121a has an incident angle directivity. On the light receiving surfaces S of the photodiodes 121e-15, 121e-16 in the pixels 121a-15, 121a-16, different ranges are shielded from light by the light-shielding films 121b-15, 121b-16, respectively, and thus a different incident angle directivity is set in every pixel. However, the light-shielded range is not limited to a case of being different in each of all the pixels 121a of the imaging element 121, and there may be pixels 121a in which the same range is shielded from light in part.

With the configuration illustrated in the upper part of FIG. 7, a right end portion of the light-shielding film 121p-15 and an upper end portion of the light-shielding film 121b-15 are connected, and a left end portion of the light-shielding film 121b-16 and an upper end portion of the light-shielding film 121p-16 are connected, forming an L-shape when viewed from the side.

Moreover, the light-shielding films 121b-15 to 121b-17 and the light-shielding films 121p-15 to 121p-17 include metal, and include, for example, tungsten (W), aluminum (Al), or an alloy of Al and copper (Cu). Further, the light-shielding films 121b-15 to 121b-17 and the light-shielding films 121p-15 to 121p-17 may be formed using the same metal as that of wiring by the same process of forming the wiring in a semiconductor process. Note that thicknesses of the light-shielding films 121b-15 to 121b-17 and the light-shielding films 121p-15 to 121p-17 do not have to be the same depending on the position.

Further, as illustrated in the lower part of FIG. 7, the pixel 121a includes a photodiode 161 (corresponding to the photodiode 121e), a transfer transistor 162, a floating diffusion (FD) unit 163, a selection transistor 164, an amplification transistor 165, and a reset transistor 166, and is connected to a current source 168 via a vertical signal line 167.

In the photodiodes 161, anode electrodes are respectively grounded, and cathode electrodes are respectively connected to gate electrodes of the amplification transistors 165 via the transfer transistors 162.

The transfer transistors 162 are each driven according to a transfer signal TG. For example, when the transfer signal TG supplied to a gate electrode of the transfer transistor 162 becomes a high level, the transfer transistor 162 is turned on. Thus, charges accumulated in the photodiode 161 are transferred to the FD unit 163 via the transfer transistor 162.

The amplification transistor 165 is as an input unit of a source follower that is a readout circuit that reads out a signal obtained by photoelectric conversion in the photodiode 161, and outputs a pixel signal of a level corresponding to charges accumulated in the FD unit 163 to the vertical signal line 23. In other words, the amplification transistor 165 has a drain terminal connected to a power supply voltage VDD and a source terminal connected to the vertical signal line 167 with the selection transistor 164 interposed therebetween, thereby forming a source follower with the current source 168 connected to one end of the vertical signal line 167.

The floating diffusion (FD) unit 163 is a floating diffusion region having a charge capacitance C1 provided between the transfer transistor 162 and the amplification transistor 165, and temporarily accumulate charges transferred from the photodiode 161 via the transfer transistor 162. The FD unit 163 is a charge detection unit that converts charge into voltage, and the charges accumulated in the FD unit 163 are converted into voltage in the amplification transistor 165.

The selection transistor 164 is driven according to a selection signal SEL, and is turned on when the selection signal SEL supplied to a gate electrode becomes a high level, and connects the amplification transistor 165 and the vertical signal line 167.

The reset transistor 166 is driven according to a reset signal RST. For example, the reset transistor 166 is turned on when the reset signal RST supplied to a gate electrode becomes a high level, discharges the charges accumulated in the FD unit 163 to the power supply voltage VDD, and resets the FD unit 163.

With the circuit configuration as described above, the pixel circuit illustrated in the lower part of FIG. 7 operates as follows.

That is, as a first operation, the reset transistor 166 and the transfer transistor 162 are turned on, the charges accumulated in the FD unit 163 are discharged to the power supply voltage VDD, and the FD unit 163 is reset.

As a second operation, the reset transistor 166 and the transfer transistor 162 are turned off, an exposure period is started, and charges corresponding to the amount of incident light are accumulated by the photodiode 161.

As a third operation, after the reset transistor 166 is turned on and the FD unit 163 is reset, the reset transistor 166 is turned off. By this operation, the FD unit 163 is reset and set to a reference potential.

As a fourth operation, a potential of the FD unit 163 in a reset state is output from the amplification transistor 165 as the reference potential.

As a fifth operation, the transfer transistor 162 is turned on, and the charges accumulated in the photodiode 161 are transferred to the FD unit 163.

As a sixth operation, the potential of the FD unit 163 to which the charges of the photodiode are transferred is output from the amplification transistor 165 as a signal potential.

Through the above processing, the reference potential is subtracted from the signal potential and is output as a detection signal by correlated double sampling (CDS). The value of this detection signal (output pixel value) is modulated according to an incident angle of incident light from an object, and differs in a characteristic (directivity) depending on the incident angle (has an incident angle directivity).

As described above, the pixels 121a in a case of FIG. 7 are each provided with one photodiode 121e, a different range is shielded from light by the light-shielding film 121b in each of the pixels 121a, and a detection signal for one pixel of a detection image having an incident angle directivity can be expressed by one pixel 121a by an optical modulation using the light-shielding film 121b.

<Another Configuration Example of Imaging Element>

Further, the incident angle directivity can be formed by, for example, a position, a size, a shape, and the like in a pixel of a light receiving element (for example, a photodiode). Pixels having different parameters from each other have different sensitivities to incident light having a same light intensity from a same direction. That is, by setting these parameters for each pixel, the incident angle directivity can be set for each pixel.

For example, a plurality of light receiving elements (for example, photodiodes) may be provided in a pixel and used selectively. In this manner, the incident angle directivity can be set for each pixel by selecting the light receiving elements.

Figure 8:
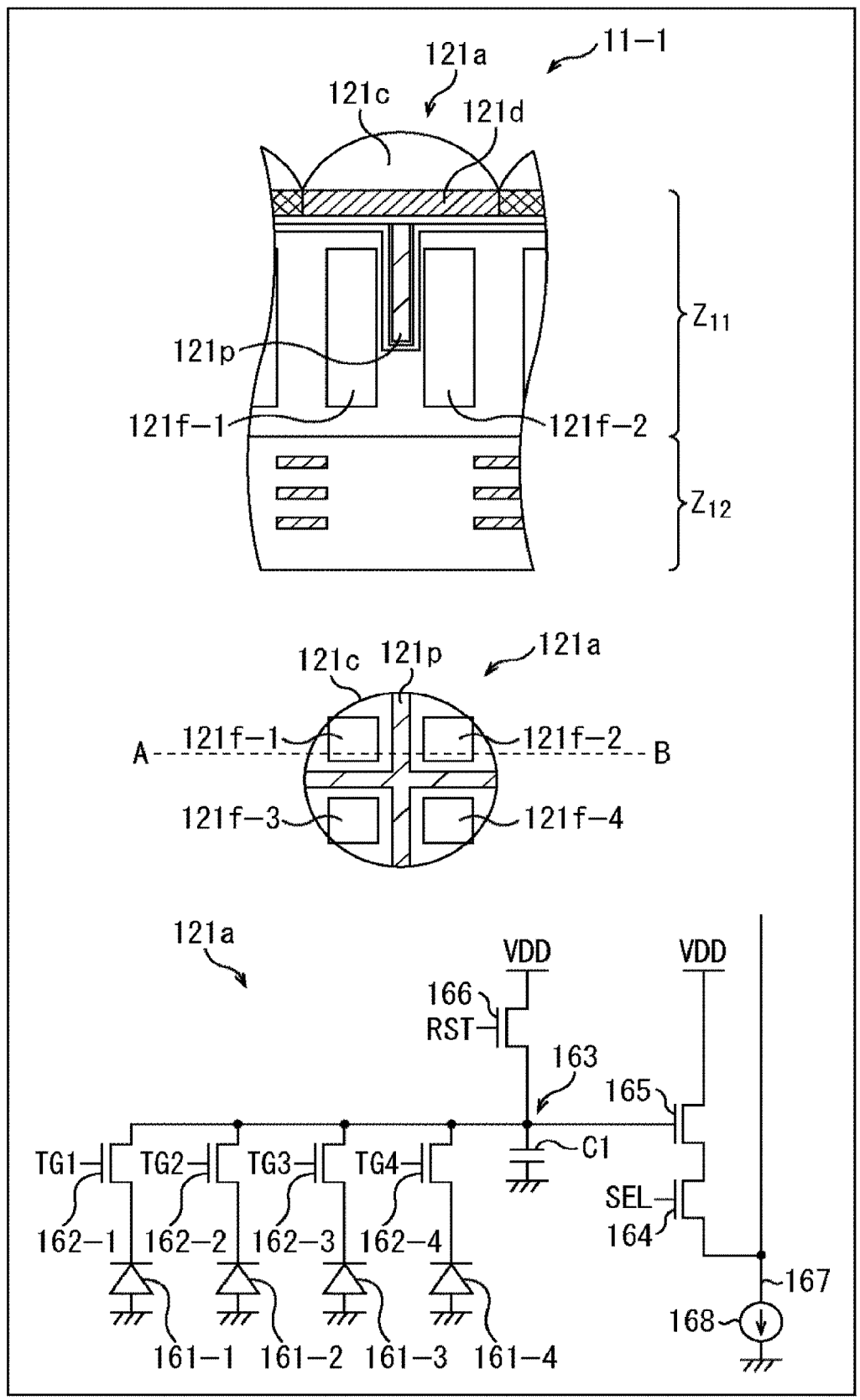
FIG. 8 is a view describing a first configuration example of the imaging element.

FIG. 8 is a diagram illustrating another configuration example of the imaging element 121. An upper part of FIG. 8 illustrates a cross-sectional side view of a pixel 121a of the imaging element 121, and a middle part of FIG. 8 illustrates a top view of the imaging element 121. Further, the cross-sectional side view of the upper part of FIG. 8 is an AB cross section in the middle part of FIG. 8. Furthermore, a lower part of FIG. 8 is a circuit configuration example of the imaging element 121.

The imaging element 121 having the configuration illustrated in FIG. 8 includes a plurality of pixel output units that receives incident light entering without passing through either an imaging lens or a pinhole, and each outputs one detection signal indicating an output pixel value modulated by the incident angle of the incident light. For example, this imaging element 121 has a configuration such that incident angle directivities, indicating directivities with respect to the incident angle of incident light from an object, of output pixel values of at least two pixel output units out of the plurality of pixel output units are different characteristics from each other. Further, in the imaging element 121 in this case, a plurality of pixel output units thereof has different photodiodes (PD) from each other that contribute to output, and thus the incident angle directivity indicating a directivity of the output pixel value with respect to the incident angle of incident light from an object is independently settable in each of the pixel output units.

As illustrated in FIG. 8, the imaging element 121 has a different configuration from the imaging element 121 of FIG. 8 in that four photodiodes 121*f*-1 to 121*f*-4 are formed in the pixel 121a, and a light-shielding film 121p is formed in a region separating the photodiodes 121*f*-1 to 121*f*-4 from each other. Specifically, in the imaging element 121 of FIG. 8, the light-shielding film 121p is formed in a "+" shape when viewed from above. Note that common components thereof are given the same reference signs and detailed description will be omitted.

In the imaging element 121 configured as illustrated in FIG. 8, electrical and optical crosstalk among the photodiodes 121*f*-1 to 121*f*-4 can be prevented by separation into the photodiodes 121*f*-1 to 121*f*-4 by the light-shielding film 121p. That is, the light-shielding film 121p in FIG. 5 is for preventing crosstalk and is not for providing an incident angle directivity, similarly to the light-shielding film 121p of the imaging element 121 in FIG. 4.

Although details will be described later, the photodiodes 121*f*-1 to 121*f*-4 have different incident angles from each other at which the light receiving sensitivity characteristics are high. That is, a desired incident angle directivity can be given to an output pixel value of the pixel 121a depending on from which of the photodiodes 121*f*-1 to 121*f*-4 charges are read out. That is, the incident angle directivity of the output pixel value of the pixel 121a can be controlled.

In the configuration example of the imaging element 121 in FIG. 8, one FD unit 163 is shared by four photodiodes 121*f*-1 to 121*f*-4. The lower part of FIG. 8 illustrates a circuit configuration example in which one FD unit 163 is shared by four photodiodes 121*f*-1 to 121*f*-4. Note that in the lower part of FIG. 8, description of the same configuration as the lower part of FIG. 7 will be omitted.

In the lower part of FIG. 8, differences from the circuit configuration of the lower part of FIG. 7 are that photodiodes 161-1 to 161-4 (corresponding to the photodiodes 121*f*-1 to 121*f*-4 in the upper part of FIG. 8) and transfer transistors 162-1 to 162-4 are provided instead of the photodiode 161 and the transfer transistor 162, and the FD unit 163 is shared.

In the circuit illustrated in the lower part of FIG. 8, in a case where it is not necessary to distinguish the photodiodes 161-1 to 161-4 from each other to describe them, they are referred to as photodiodes 161. Further, in a case where it is not necessary to distinguish the transfer transistors 162-1 to 162-4 from each other to describe them, they are referred to as transfer transistors 162.

In the circuit illustrated in the lower part of FIG. 8, if any one of the transfer transistors 162 is turned on, charges of the photodiode 161 corresponding to the transfer transistor 162 are read out and transferred to the common FD unit 163. Then, a signal corresponding to a level of charges held in the FD unit 163 is read out as a detection signal in a pixel output unit. That is, charges of each photodiode 161 can be read out independently of each other, and the photodiode 161 from which charges are read out can be controlled by which transfer transistor 162 is turned on. In other words, a degree of contribution of each photodiode 161 to the output pixel value can be controlled by which transfer transistor 162 is turned on. For example, the photodiodes 161 that contribute to the output pixel value can be made different from each other by making the photodiodes 161 from which charges are read out different from each other between at least two pixels. That is, by selecting the photodiode 161 that reads out charges, a desired incident angle directivity can be given to the output pixel value of the pixel 121a. That is, the detection signal output from each pixel 121a can be a value (output pixel value) modulated according to the incident angle of the incident light from the object.

For example, in FIG. 8, by transferring charges of the photodiode 121*f*-1 and the photodiode 121*f*-3 to the FD unit 163 and adding signals obtained respectively by reading out them, an incident angle directivity in a left-right direction in the diagram can be given to the output pixel value of the pixel 121a. Similarly, by transferring charges of the photodiode 121*f*-1 and the photodiode 121*f*-2 to the FD unit 163 and adding signals obtained respectively by reading out them, an incident angle directivity in an up-down direction in the diagram can be given to the output pixel value of the pixel 121a.

Note that a signal obtained on the basis of charges of each photodiode 121*f* of the pixel 121a in FIG. 8 may be added after being read out from the pixel, or may be added within the pixel (for example, the FD unit 163).

Further, the combination of the photodiodes 121*f* for adding charges (or signals corresponding to the charges) is arbitrary, and is not limited to the above example. For example, charges (or signals corresponding to the charges) of three or more photodiodes 121*f* may be added. Further, for example, charges of one photodiode 121*f* may be read out without performing addition.

Note that a desired incident angle directivity may be given to (a detection sensitivity of) the pixel 121a by resetting a detection value (charges) accumulated in the photodiode 161 (photodiode 121*f*) before reading out charges to the FD unit 163 by using an electronic shutter function, or the like.

For example, in a case where the electronic shutter function is used, if resetting is performed immediately before reading out charges of the photodiode 121*f* to the FD unit 163, the photodiode 121*f* can be in a state of making no contribution to the detection signal level of the pixel 121*a*, and if a time is given between the resetting and the reading out to the FD unit 163, a partial contribution can be made.

As described above, the pixel 121*a* in FIG. 8 is provided with four photodiodes 121*f* per pixel, and the light-shielding film 121*b* is not formed on the light-receiving surface. However, the light-shielding film 121*p* divides the pixel into a plurality of regions to form the four photodiodes 121*f*-1 to 121*f*-4, so as to express a detection signal for one pixel of a detection image having an incident angle directivity. In other words, for example, a range of the photodiodes 121*f*-1 to 121*f*-4 that does not contribute to output functions similarly to a light-shielded range, and expresses a detection signal of one pixel of a detection image having an incident angle directivity. Note that in a case where a detection signal for one pixel is expressed using the photodiodes 121*f*-1 to 121*f*-4, since the light-shielding film 121*b* is not used, the detection signal is not a signal obtained by optical modulation.

The example in which four photodiodes are arranged in a pixel has been described above, but the number of photodiodes arranged in the pixel is arbitrary and is not limited to the above-described example. That is, the number of partial areas in which photodiodes are arranged in a pixel is also arbitrary.

Further, although the photodiodes are described as being arranged in four partial areas obtained by equally dividing the inside of the pixel into four parts in the above description, it is not necessary that the partial areas are equally divided. That is, it is not necessary that sizes and shapes of respective partial areas are all unified (a partial area that is different in size and shape from others may be included). Alternatively, a position (position in the partial area), a size, a shape, and the like of the photodiode arranged in each partial area may be different for each photodiode (each partial area). At this time, the sizes and shapes of the respective partial areas may be all unified or may not be unified.

Moreover, these parameters do not have to be unified for all pixels of the imaging element 121. That is, in one or more pixels of the imaging element 121, one or more of these parameters may be different from those of other pixels.

For example, a pixel in which a dividing position for forming a partial area in which a photodiode is arranged in the pixel is different from that of other pixels may be included in the pixel group of the imaging element 121. That is, the imaging element 121 may include one or more pixels in which partial areas have different sizes and shapes from those of other pixels. For example, even if only an upper left photodiode is used in a plurality of pixels by making the dividing position different for each pixel, incident angle directivities of detection signals respectively detected in the plurality of pixels can be made different from each other.

Further, for example, the pixel group of the imaging element 121 may include a pixel in which positions, sizes, shapes, and the like of a plurality of photodiodes arranged in the pixel are different from those of other pixels. That is, the imaging element 121 may include one or more pixels in which at least one of positions, sizes, and shapes of a plurality of photodiodes arranged is different from those of other pixels. For example, even if only an upper left photodiode is used in a plurality of pixels by making the positions, sizes, shapes, and the like of the photodiode different for each pixel, incident angle directivities of detection signals respectively detected in the plurality of pixels can be made different from each other.

Furthermore, for example, one or more pixels in which both parameters (size, shape) of partial areas and parameters (position, size, shape) of photodiodes are different from those of other pixels may be provided.

Further, for example, a pixel in which the number of divisions for forming partial areas in which photodiodes are arranged in the pixel is different from that of other pixels may be included in the pixel group of the imaging element 121. That is, the imaging element 121 may include one or more pixels in which the number of photodiodes arranged is different from that of other pixels. For example, by making the number of divisions (the number of photodiodes) different for each pixel, the incident angle directivity can be set more freely.

<Principle of Generating Incident Angle Directivity>

Figure 9:
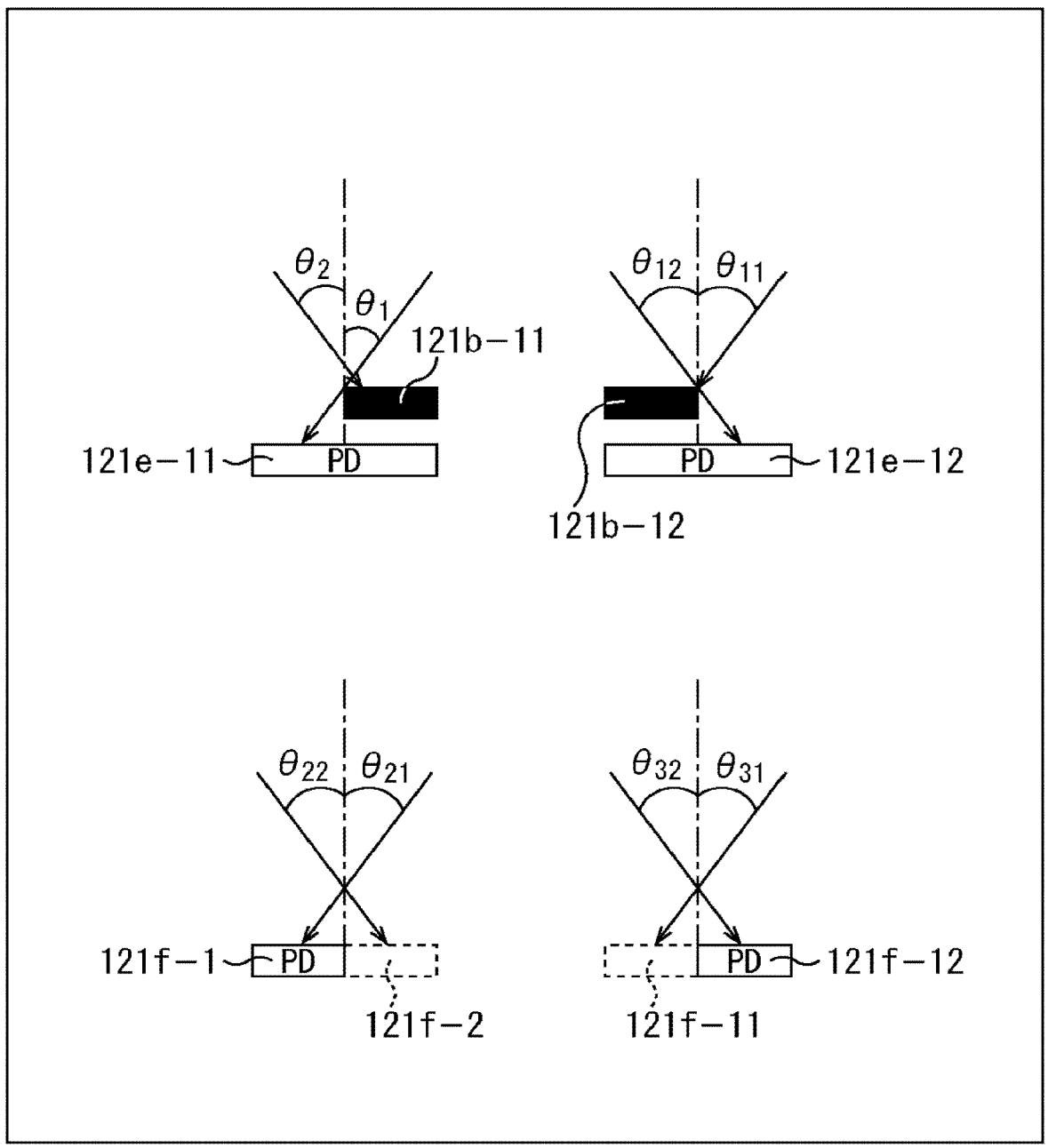
FIG. 9 is a diagram describing principles of generation of an incident angle directivity.

The incident angle directivity of each pixel in the imaging element 121 is generated according to principles illustrated in FIG. 9, for example. Note that an upper left part and an upper right part of FIG. 9 are diagrams describing principles of generation of the incident angle directivity in the imaging element 121 of FIG. 7, and a lower left part and a lower right part of FIG. 9 are diagrams describing principles of generation of the incident angle directivity in the imaging element 121 of FIG. 8.

Further, one pixel in both of the upper left part and the upper right part in FIG. 9 includes one photodiode 121*e*. On the other hand, one pixel in both of the lower left part and the lower right part in FIG. 9 includes two photodiodes 121*f*. Note that, here, an example in which one pixel includes two photodiodes 121*f* is described, but this is for convenience of description, and the number of photodiodes 121*f* constituting one pixel may be another number.

In the upper left part of FIG. 9, a light-shielding film 121*b*-11 is formed so as to shield a right half of a light receiving surface of the photodiode 121*e*-11 from light when incident light enters from an upper side to a lower side in the diagram. Further, in the upper right part of FIG. 9, a light-shielding film 121*b*-12 is formed so as to shield a left half of the light receiving surface of the photodiode 121*e*-12 from light. Note that a dotted and dashed line in the diagram indicates a center position, in the horizontal direction in the diagram, of the light receiving surface of the photodiode 121*e* and a direction perpendicular to the light receiving surface.

For example, in a case of a configuration illustrated in the upper left part of FIG. 9, incident light, from an upper right direction in the diagram, indicated by an arrow forming an incident angle θ1 with respect to a dotted and dashed line in the diagram is easily received in the left half range that is not shielded from light by the light-shielding film 121*b*-11 of the photodiode 121*e*-11, but incident light, from an upper left direction in the diagram, indicated by an arrow forming an incident angle θ2 with respect to the dotted and dashed line in the diagram is difficult to receive in the left half range that is not shielded from light by the light-shielding film 121*b*-11 of the photodiode 121*e*-11. Therefore, in the case of the configuration illustrated in the upper left part of FIG. 9, there is provided an incident angle directivity that a light receiving sensitivity characteristic is high for the incident light from the upper right direction in the diagram and the light receiving sensitivity characteristic is low for the incident light from the upper left direction.

On the other hand, for example, in a case of a configuration illustrated in the upper right part of FIG. 9, incident light from an upper right direction in the diagram indicated by an arrow forming an incident angle θ11 with respect to a dotted and dashed line in the diagram is difficult to receive in the left half range that is shielded from light by the light-shielding film 121*b*-12 of the photodiode 121*e*-12, but incident light from an upper left direction in the diagram indicated by an arrow forming an incident angle θ12 with respect to the dotted and dashed line in the diagram is easily received in the right half range that is not shielded from light by the light-shielding film 121*b*-12 of the photodiode 121*e*-12. Therefore, in the case of the configuration illustrated in the upper right part of FIG. 9, there is provided an incident angle directivity that a light receiving sensitivity characteristic is low for the incident light from the upper right direction in the diagram and the light receiving sensitivity characteristic is high for the incident light from the upper left direction.

Further, in the case of the lower left part of FIG. 9, photodiodes 121*f*-1, 121*f*-2 are provided on the left and right in the diagram, and the incident angle directivity is provided without providing the light-shielding film 121*b* by reading out detection signals of either of the photodiodes.

Specifically, as illustrated in the lower left part of FIG. 9, in a case where two photodiodes 121*f*-1, 121*f*-2 are formed in the pixel 121*a*, by making a detection signal of the photodiode 121*f*-1 provided on the left side in the diagram contribute to the detection signal level of this pixel 121*a*, it is possible to provide a similar incident angle directivity to that of the configuration in the upper left part of FIG. 9. That is, incident light from an upper right direction in the diagram indicated by an arrow forming an incident angle θ21 with respect to a dotted and dashed line in the diagram is incident on the photodiode 121*f*-1 and received, and a detection signal thereof is read out and contributes to the detection signal level of this pixel 121*a*. On the other hand, incident light from an upper left direction in the diagram indicated by an arrow forming an incident angle θ22 with respect to the dotted and dashed line in the diagram is incident on the photodiode 121*f*-2, but a detection signal thereof is not read out and does not contribute to the detection signal level of this pixel 121*a*.

Similarly, as illustrated in the lower right part of FIG. 9, in a case where two photodiodes 121*f*-11, 121*f*-12 are formed in the pixel 121*a*, by making a detection signal of the photodiode 121*f*-12 provided on the left side in the diagram contribute to the detection signal level of this pixel 121*a*, it is possible to provide a similar incident angle directivity to that of the configuration in the upper right part of FIG. 9. That is, incident light from an upper right direction in the diagram indicated by an arrow forming an incident angle θ31 with respect to a dotted and dashed line in the diagram is incident on the photodiode 121*f*-11, but a detection signal thereof is not read out and does not contribute to the detection signal level of this pixel 121*a*. On the other hand, incident light from an upper left direction in the diagram indicated by an arrow forming an incident angle θ32 with respect to the dotted and dashed line in the diagram is incident on the photodiode 121*f*-12 and received, and a detection signal thereof is read out and contributes to the detection signal level of the pixel 121*a*.

Note that in FIG. 9, the example in which a dotted and dashed line in the vertical direction is a center position in the horizontal direction in the diagram of a light receiving surface of the photodiode 121*e* has been described, but this is for convenience of description and another position may be employed. Different incident angle directivities can be generated by having a different position in the horizontal direction of the light-shielding film 121*b* indicated by the dotted and dashed line in the vertical direction.

<Regarding Incident Angle Directivity in Configuration Including On-Chip Lens>

The principles of generation of the incident angle directivity have been described above. Here, an incident angle directivity in a configuration including an on-chip lens 121*c* will be described.

Figure 10:
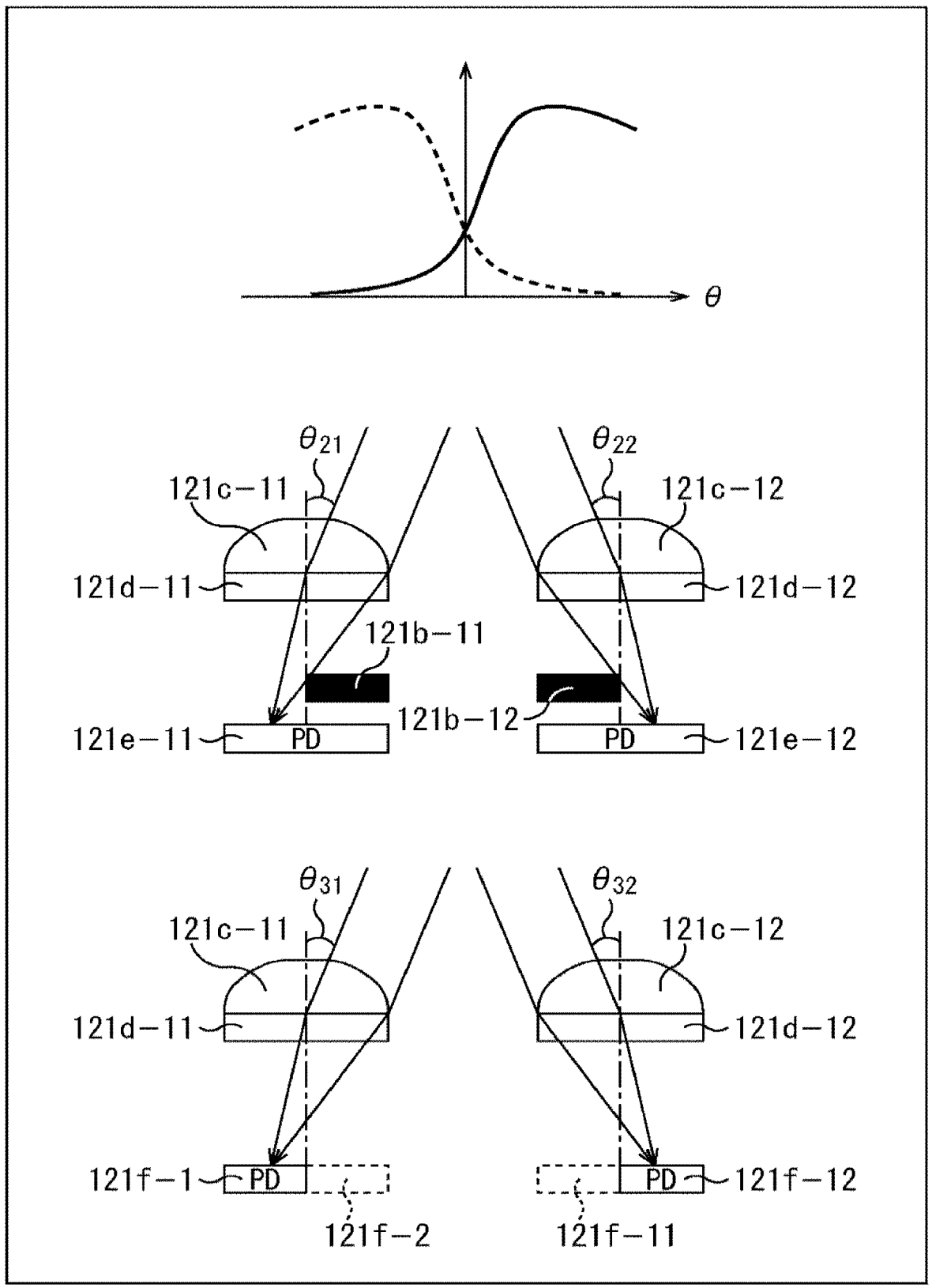
FIG. 10 is a diagram describing changes in the incident angle directivity using an on-chip lens.

That is, an incident angle directivity of each pixel in the imaging element 121 is set as illustrated in FIG. 10, for example, by using an on-chip lens 121*c* in addition to the light-shielding film 121*b* described above. That is, in a middle left part of FIG. 10, an on-chip lens 121*c*-11 that collects incident light from an incident direction in the upper part of diagram, a color filter 121*d*-11 that transmits light with a predetermined wavelength, and a photodiode 121*e*-11 that generates a pixel signal by photoelectric conversion are stacked in this order, and in a middle right part of FIG. 10, an on-chip lens 121*c*-12, a color filter 121*d*-12, and a photodiode 121*e*-12 are provided in this order from the incident direction in the upper part of the diagram.

Note that in a case where it is not necessary to distinguish between the on-chip lenses 121*c*-11, 121*c*-12, the color filters 121*d*-11, 121*d*-12, and the photodiodes 121*e*-11, 121*e*-12, they will be simply referred to as on-chip lenses 121*c*, color filters 121*d*, and photodiodes 121*e*.

The imaging element 121 is further provided with light-shielding films 121*b*-11, 121*b*-12 that shields a part of an area that receives incident light from light, as illustrated in each of the middle left part and the middle right part of FIG. 10.

As illustrated in the middle left part of FIG. 10, in a case where the light-shielding film 121*b*-11 that shields a right half of the photodiode 121*e*-11 in the diagram from light is provided, a detection signal level of the photodiode 121*e*-11 changes according to an incident angle θ of incident light as indicated by a solid-line waveform in an upper part of FIG. 10.

Specifically, if the incident angle θ, which is an angle formed by the incident light, increases with respect to the dotted and dashed line that is at center positions of the photodiode 121*e* and the on-chip lens 121*c* and is perpendicular to each of them (if the incident angle θ increases in a positive direction (if it tilts rightward in the diagram)), light is collected in a range where the light-shielding film 121*b*-11 is not provided, and thus the detection signal level of the photodiode 121*e*-11 increases. Conversely, the smaller the incident angle θ (the larger the incident angle θ is in the negative direction (if it tilts leftward in the diagram)), the more the light is collected in a range where the light-shielding film 121*b*-11 is provided, and thus the detection signal level of the photodiode 121*e*-11 decreases.

Note that the incident angle θ mentioned here is assumed as 0 degree in a case where the direction of the incident light matches the dotted and dashed line, the incident angle θ on the incident angle θ21 side on the middle left side of FIG. 10 where the incident light from the upper right in the diagram is incident is assumed as a positive value, and the incident angle θ on the incident angle θ22 side on the middle right side of FIG. 10 is assumed as a negative value. Therefore, in FIG. 10, the incident light incident on the on-chip lens 121*c* from the upper right has a larger incident angle than the incident light incident from the upper left. That is, in FIG. 10, the incident angle θ increases as a traveling direction of incident light tilts rightward (increases in the positive direction) and decreases as it tilts leftward (increases in the negative direction).

Further, as illustrated in the middle right part of FIG. 10, in a case where the light-shielding film 121b-12 that shields a left half of the photodiode 121e-12 in the diagram from light is provided, a detection signal level of the photodiode 121e-12 changes according to an incident angle θ of incident light as indicated by a dotted-line waveform in the upper part of FIG. 10.

Specifically, as illustrated by the dotted-line waveform in the upper part of FIG. 10, the larger the incident angle θ, which is an angle formed by the incident light with respect to the dotted and dashed line that is at the center positions of the photodiode 121e and the on-chip lens 121c and is perpendicular to each of them (the larger the incident angle θ in the positive direction), the more collected the light is in a range where the light-shielding film 121b-12 is provided, and thus the detection signal level of the photodiode 121e-12 decreases. Conversely, the smaller the incident angle θ (the larger the incident angle θ is in the negative direction), the more the light enters a range where the light-shielding film 121b-12 is not provided, and thus the detection signal level of the photodiode 121e-12 increases.

Note that in the upper part of FIG. 10, a horizontal axis represents the incident angle θ, and a vertical axis represents the detection signal level in the photodiode 121e.

Since the waveforms indicated by the solid line and the dotted line indicating the detection signal levels corresponding to the incident angle θ illustrated in the upper part of FIG. 10 can be changed according to the range of the light-shielding film 121b, it thereby becomes possible to give (set) different incident angle directivities from each other in pixel units. Note that the solid-line waveform in the upper part of FIG. 10 corresponds to solid-line arrows indicating that incident light is collected while changing the incident angle θ in the middle left part and a lower left part of FIG. 10. Further, the dotted waveform in the upper part of FIG. 10 corresponds to dotted-line arrows indicating that incident light is collected while changing the incident angle θ in the middle right part and a lower right part of FIG. 10.

The incident angle directivity mentioned here is a characteristic (light receiving sensitivity characteristic) of the detection signal level of each pixel corresponding to the incident angle θ, but in a case of the example of the middle part of FIG. 10, it can be said that this is a characteristic of light shielding value according to the incident angle θ. That is, the light-shielding film 121b shields incident light in a specific direction at a high level, but cannot sufficiently shield incident light from directions other than the specific direction. This change in light-shielding capability level generates different detection signal levels corresponding to the incident angle θ as illustrated in the upper part of FIG. 10. Therefore, if a direction in which light can be shielded at a highest level in each pixel is defined as a light shielding direction of each pixel, having different incident angle directivities from each other in pixels units means, in other words, having different light shielding directions from each other in pixel units.

Furthermore, as illustrated in the lower left part of FIG. 10, by providing two photodiodes 121f-1, 121f-2 for one on-chip lens 121c-11 (the pixel output unit includes two photodiodes 121f-1, 121f-2) so as to use the detection signal of the photodiode 121f-1 only in the left part of the diagram, it is possible to obtain the same detection signal level as in a state that the right side of the photodiode 121e-11 in the middle left part of FIG. 10 is shielded from light.

Specifically, if the incident angle θ, which is an angle formed by the incident light, increases with respect to the dotted and dashed line that is at the center position of the on-chip lens 121c and is perpendicular to each of them (if the incident angle θ increases in the positive direction), the light is collected in a range of the photodiode 121f-1 where the detection signal is read out, and thus the detection signal level increases. Conversely, the smaller the incident angle θ (the larger the incident angle θ is in the negative direction), the more the light is collected in a range of the photodiode 121f-2 where the detection value is not read out, and thus the detection signal level decreases.

Further, similarly, as illustrated in the lower right part of FIG. 10, by providing two photodiodes 121f-11, 121f-12 for one on-chip lens 121c-12 so as to use the detection signal of the photodiode 121f-12 only in the right part of the diagram, it is possible to obtain the detection signal of the output pixel unit of the same detection signal level as in a state that the left side of the photodiode 121e-12 in the middle right part of FIG. 10 is shielded from light.

Specifically, if the incident angle θ, which is an angle formed by the incident light, increases with respect to the dotted and dashed line that is at the center position of the on-chip lens 121c and is perpendicular to each of them (if the incident angle θ increases in the positive direction), the light is collected in a range of the photodiode 121f-11 where the detection signal does not contribute to a detection signal of the output pixel unit, and thus the detection signal level of the detection signal of the output pixel unit decreases. Conversely, the smaller the incident angle θ (the larger the incident angle θ is in the negative direction), the more the light is collected in a range of the photodiode 121f-12 where the detection signal contributes to the detection signal of the output pixel unit, and thus the detection signal level of the detection signal of the output pixel unit increases.

Note that it is desirable that the incident angle directivity has high randomness. This is because, for example, if adjacent pixels have the same incident angle directivity, the equations (1) to (3) described above or equations (4) to (6) described later may become the same equations as each other, the relationship between the number of unknowns and the number of equations to be solutions of simultaneous equations cannot be satisfied, and pixel values constituting the restored image may not be obtained. Further, in the configuration illustrated in the middle part of FIG. 10, one photodiode 121e-11 and one photodiode 121e-12 are formed in the pixel 121a. On the other hand, in the configuration illustrated in the lower part of FIG. 10, two photodiodes 121f-1 and 121f-2 and photodiodes 121f-11 and 121f-12 are formed in the pixel 121a. Therefore, for example, in the lower part of FIG. 10, a single photodiode 121f does not constitute one pixel.

Further, as illustrated in the lower part of FIG. 10, in a case where one pixel output unit includes a plurality of photodiodes 121f, it can be considered that an output pixel value of the pixel output unit is modulated according to the incident angle. Therefore, the characteristic of the output pixel value (incident angle directivity) can be made different for each pixel output unit, and an incident angle directivity in one pixel output unit is set. Furthermore, in a case where one pixel output unit includes a plurality of photodiodes 121f, one on-chip lens 121c is a necessary component for one pixel output unit in order to generate an incident angle directivity in one pixel output unit.

Further, as illustrated in the upper part of FIG. 10, in a case where each of one photodiode 121e-11 or photodiode 121e-12 constitutes one pixel output unit, by modulating incident light to one photodiode 121e-11 or photodiode 121e-12 constituting one pixel output unit according to the incident angle, an output pixel value is modulated as a result.

Therefore, the characteristics of the output pixel value (incident angle directivities) can be made different, and the incident angle directivity in one pixel output unit is set. Furthermore, in a case where each of one photodiode 121e-11 or photodiode 121e-12 constitutes one pixel output unit, the incident angle directivity is set independently, by the light-shielding film 121b provided for each pixel output unit in manufacturing.

Further, as illustrated in the lower part of FIG. 10, in a case where one pixel output unit includes a plurality of photodiodes 121f, the number of the plurality of photodiodes 121f for setting the incident angle directivity in each one pixel output unit (divided number of photodiodes 121f constituting one pixel output unit) and positions thereof are set independently in one pixel output unit in manufacturing, and further which photodiode 121f among these is used to set the incident angle directivity can be switched at a time of imaging.

<Setting of Incident Angle Directivity>

Figure 11:
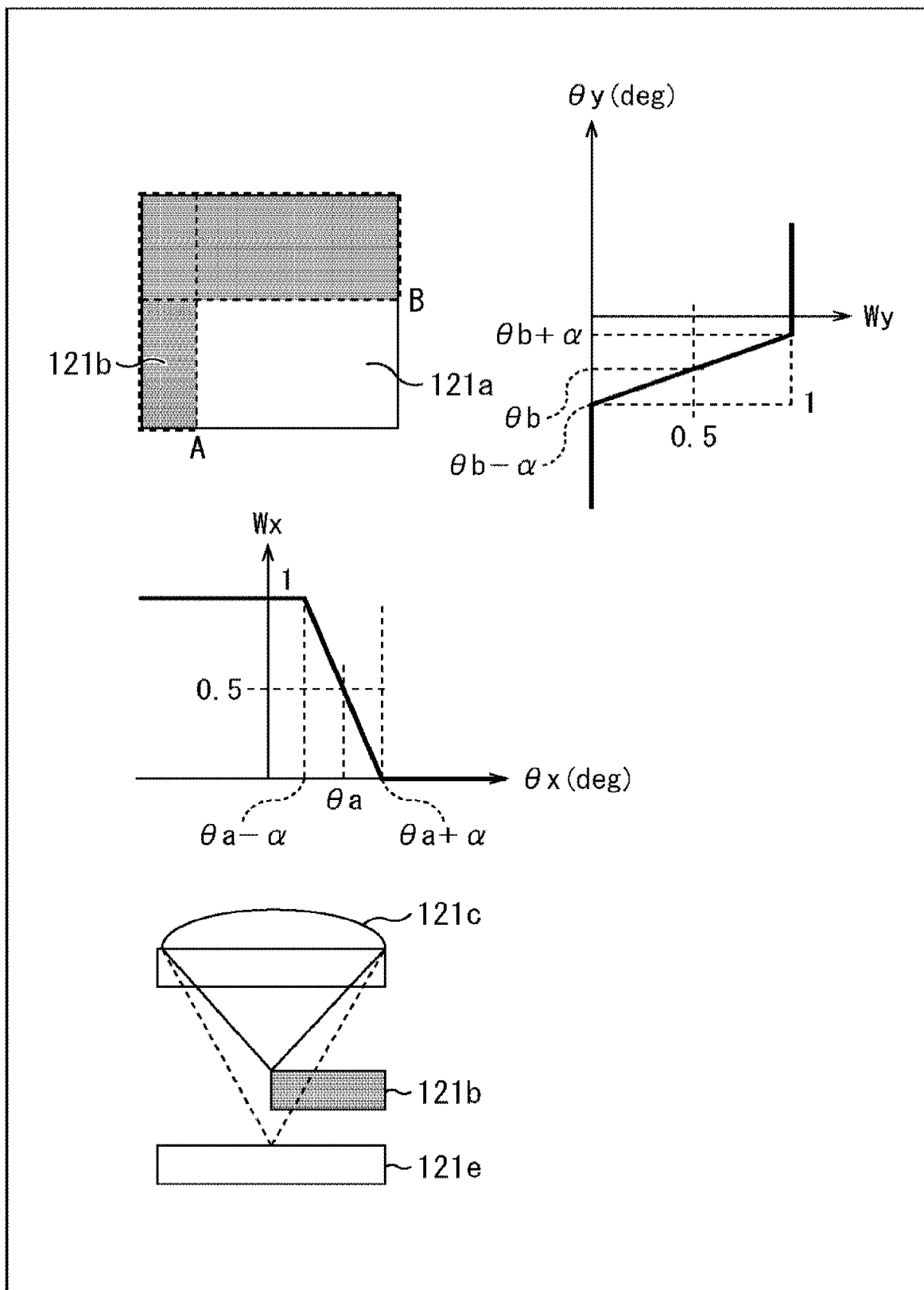
FIG. 11 is a diagram describing a design of the incident angle directivity.

For example, as illustrated in an upper part of FIG. 11, a setting range of the light-shielding film 121b is a range from a left end to a position A in the horizontal direction in the pixel 121a, and a range from an upper end to a position B in the vertical direction.

In this case, a weight Wx of 0 to 1 in the horizontal direction serving as an index of incident angle directivity is set according to an incident angle θx (deg) from a center position in the horizontal direction of each pixel. More specifically, assuming that the weight Wx is 0.5 for the incident angle θx=θa corresponding to the position A, a weight Wh is set so that the weight Wx is 1 for the incident angle θx<θa−α, the weight Wx is (−(θx−θa)/2α+½) for θa−α≤the incident angle θx≤θa+α, and the weight Wx is 0 for the incident angle θx>θa+α. Note that an example in which the weight Wh is 0, 0.5, 1 will be described here, and the weight Wh becomes 0, 0.5, 1 when an ideal condition is satisfied.

Similarly, a weight Wy of 0 to 1 in the vertical direction serving as an index of incident angle directivity is set according to an incident angle θy (deg) from a center position in the vertical direction of each pixel. More specifically, assuming that a weight Wv is 0.5 for the incident angle θy=θb corresponding to the position B, the weight Wy is set so that the weight Wy is 0 for the incident angle θy<θb−α, the weight Wy is ((θy−θb)/2α+½) for θb−α≤the incident angle θy≤θb+α, and the weight Wy is 1 for the incident angle θy>θb+α.

Then, by using the weights Wx, Wy thus obtained, the incident angle directivity of each pixel 121a, that is, a coefficient (coefficient set) corresponding to the light receiving sensitivity characteristic can be obtained.

Further, at this time, an inclination (½α) indicating a change in weight in the range where the weight Wx in the horizontal direction and the weight Wy in the vertical direction are around 0.5 can be set by using an on-chip lens 121c having a different focal length.

In other words, different focal lengths can be provided by using an on-chip lens 121c having a different curvature.

For example, by using the on-chip lens 121c having a different curvature, when the light is collected so that the focal length is on the light-shielding film 121b as illustrated by solid lines in a lower part of FIG. 11, the inclination (½α) becomes steep. That is, the weight Wx in the horizontal direction and the weight Wy in the vertical direction in the upper part of FIG. 11 suddenly change to 0 or 1 near a boundary at the incident angle θx=θa in the horizontal direction and the incident angle θy=θb in the vertical direction where they are close to 0.5.

Further, for example, by using the on-chip lens 121c having a different curvature, when the light is collected so that the focal length is on the photodiode 121e as illustrated by dotted lines in the lower part of FIG. 11, the inclination (½α) becomes gentle. That is, the weight Wx in the horizontal direction and the weight Wy in the vertical direction are close to 0.5 in the upper part of FIG. 11 gently change to 0 or 1 near the boundary at the incident angle θx=θa in the horizontal direction and the incident angle θy=θb in the vertical direction.

As described above, different incident angle directivities, that is, different light receiving sensitivity characteristics can be obtained by using the on-chip lenses 121c having different curvatures to have different focal lengths.

Therefore, the incident angle directivity of the pixel 121a can be set to a different value by making the range in which the photodiode 121e is shielded from light by the light-shielding film 121b and the curvature of the on-chip lens 121c different. Note that the curvature of the on-chip lens may be the same for all pixels in the imaging element 121, or may be different for part of pixels.

<Difference Between On-Chip Lens and Imaging Lens>

As described above, the imaging element 121 does not need an imaging lens. However, the on-chip lens 121c is necessary at least in a case where the incident angle directivity is achieved using a plurality of photodiodes in a pixel as described with reference to FIG. 8. The on-chip lens 121c and the imaging lens have different physical operations.

The imaging lens has a light-collecting function for causing incident light entering from the same direction to be incident on a plurality of pixels adjacent to each other. On the other hand, a light passing through the on-chip lens 121c is incident only on the light receiving surface of the photodiode 121e or 121f constituting one corresponding pixel. In other words, the on-chip lens 121c is provided for each pixel output unit, and collects object light incident on itself on only the corresponding pixel output unit. That is, the on-chip lens 121c does not have a light-collecting function for causing diffused light emitted from a virtual point light source to be incident on a plurality of pixels adjacent to each other.

<Relationship of Distance Between Object Plane and Imaging Element>

Next, the relationship of a distance between an object plane and the imaging element 121 will be described with reference to FIG. 12.

Figure 12:
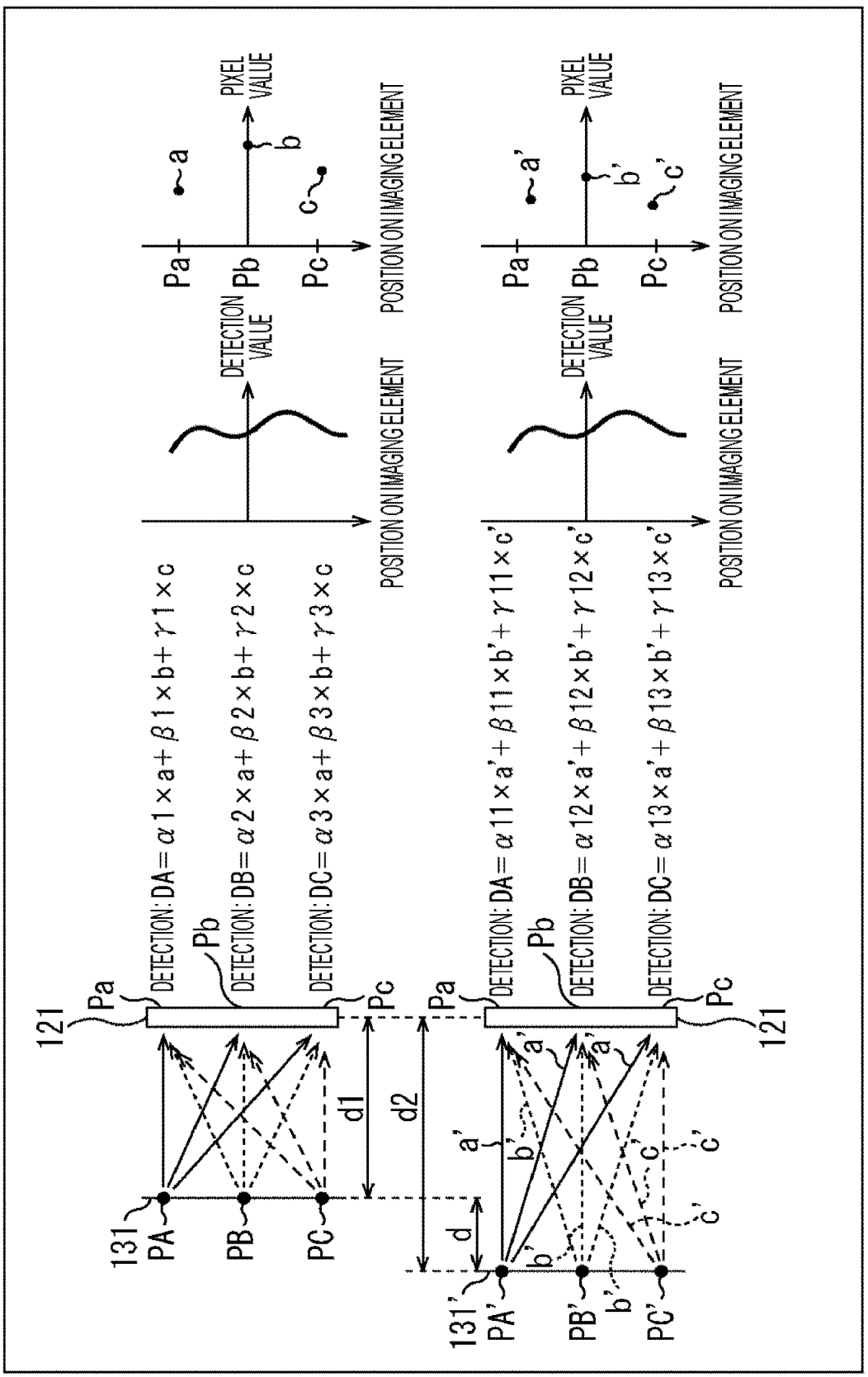
FIG. 12 is a diagram describing a relationship between an object distance and a coefficient expressing the incident angle directivity.

As illustrated in an upper left part of FIG. 12, in a case where the object distance between the imaging element 121 and the object plane 131 is a distance d1, for example, when point light sources PA, PB, PC on the object plane 131 are set, it is assumed that detection signal levels DA, DB, DC at positions Pa, Pb, Pc on the corresponding imaging element 121 can be expressed by the same equations as the equations (1) to (3) described above.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

On the other hand, as illustrated in a lower left part of FIG. 12, in a case where the object distance from the imaging element 121 is an object plane 131' having a distance d2 larger than the distance d1 by d, that is, in a case of the object plane 131' deeper than the object plane 131 as viewed from the imaging element 121, the detection signal levels are similar for all of the detection signal levels DA, DB, DC as illustrated in an upper center part and a lower center part of FIG. 12.

However, in this case, light beams having light intensities a', b', c' from the point light sources PA', PB', PC' on the object plane 131' are received by each pixel of the imaging element 121. At this time, incident angles of the light beams having the light intensities a', b', c' received on the imaging element 121 are different (change) and thus respective different coefficient sets are necessary, and the detection signal levels DA, DB, DC at the respective positions Pa, Pb, Pc are expressed as described in the following equations (4) to (6), for example.

$$DA = \alpha 11 \times a' + \beta 11 \times b' + \gamma 11 \times c' \quad (4)$$

$$DB = \alpha 12 \times a' + \beta 12 \times b' + \gamma 12 \times c' \quad (5)$$

$$DC = \alpha 13 \times a' + \beta 13 \times b' + \gamma 13 \times c' \quad (6)$$

Here, a coefficient set group including a coefficient set $\alpha 11$, $\beta 11$, $\gamma 11$, a coefficient set $\alpha 12$, $\beta 12$, $\gamma 12$, and a coefficient sets $\alpha 13$, $\beta 13$, $\gamma 13$ is a coefficient set group of the object plane 131' that corresponds to a coefficient set $\alpha 1$, $\beta 1$, $\gamma 1$, a coefficient set $\alpha 2$, $\beta 2$, $\gamma 2$, and a coefficient set $\alpha 3$, $\beta 3$, $\gamma 3$, respectively, on the object plane 131.

Therefore, by solving the equations (4) to (6) using the preset coefficient set group $\alpha 11$, $\beta 11$, $\gamma 11$, $\alpha 12$, $\beta 12$, $\gamma 12$, $\alpha 13$, $\beta 13$, $\gamma 13$, they can be obtained as the light intensities (a', b', c') of the light beams from the point light sources PA', PB', PC' as illustrated in a lower right part of FIG. 12 in a similar manner to the method of obtaining the light intensities (a, b, c) of the light beams at the point light sources PA, PB, PC in a case of the object plane 131 illustrated in an upper right part of FIG. 12, and as a result, a restored image of the object on the object plane 131' can be obtained.

That is, in the imaging device 101 in FIG. 4, it is possible to obtain a restored image of the object plane at various object distances on the basis of one detection image by storing coefficient set groups for respective distances from the imaging element 121 to the object plane in advance, composing simultaneous equations by switching the coefficient set groups, and solving the composed simultaneous equations.

In other words, by simply imaging the detection image once, it is also possible to generate a restored image at an arbitrary distance in a subsequent process by switching the coefficient set group according to the distance to the object plane and obtaining the restored image.

Further, in a case where it is desired to obtain characteristics of an object of image recognition or a visible image, or an object other than a visible image, it is also possible to apply machine learning such as deep learning on a detection signal of the imaging element and perform image recognition or the like using the detection signal itself, without performing image recognition or the like on the basis of a restored image after obtaining the restored image.

Further, in a case where an object distance and an angle of view can be specified, a restored image may be generated using a detection image formed by a detection signal of a pixel having an incident angle directivity suitable for imaging an object plane corresponding to the specified object distance and angle of view, without using all the pixels. In this manner, a restored image can be obtained using a detection signal of a pixel suitable for imaging the object plane corresponding to the specified object distance and angle of view.

Figure 13:
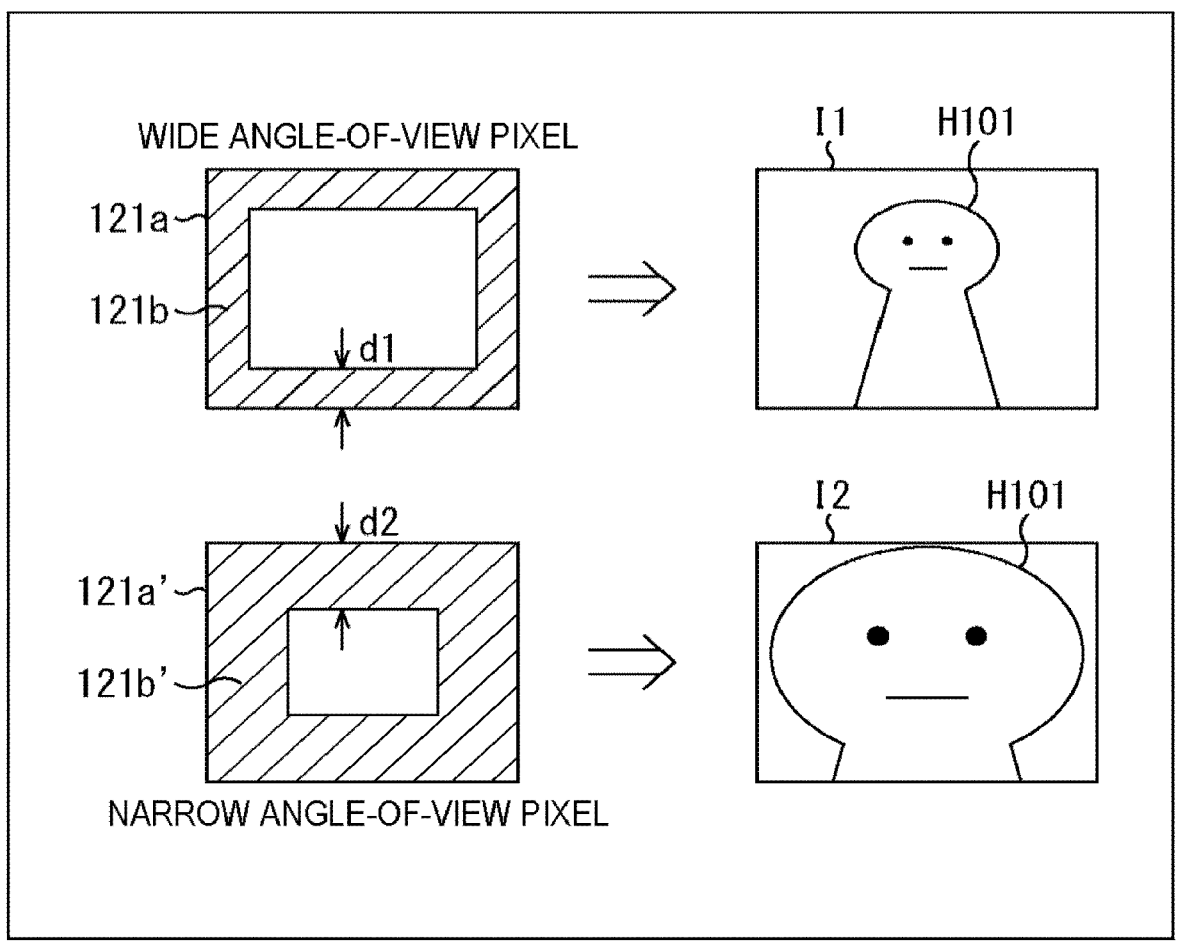
FIG. 13 is a diagram describing a relationship between a narrow angle-of-view pixel and a wide angle-of-view pixel.

For example, a pixel 121a shielded from light by the light-shielding film 121b by a width d1 from each end of the four sides as illustrated in an upper part of FIG. 13, and a pixel 121a' shielded from light by the light-shielding film 121b by a width d2 (>d1) from each end of the four sides as illustrated in a lower part of FIG. 13 will be considered.

Figure 14:
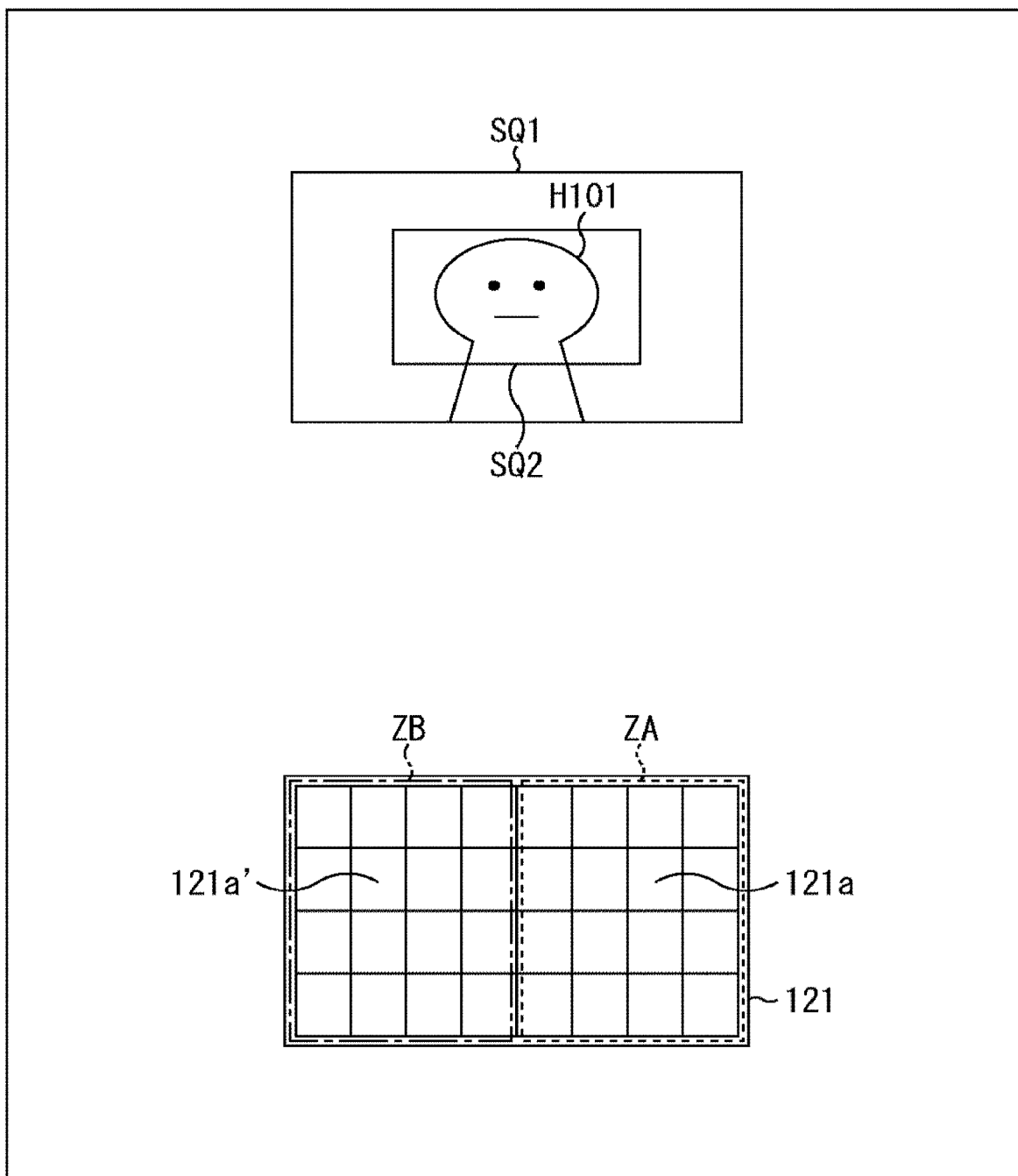
FIG. 14 is a diagram describing the relationship between the narrow angle-of-view pixel and the wide angle-of-view pixel.

The pixel 121a is used, for example, for restoring an image I1 in FIG. 13 corresponding to an angle of view SQ1 including an entire person H101 as an object, as illustrated in an upper part of FIG. 14. On the other hand, the pixel 121a' is used, for example, for restoring an image I2 in FIG. 13 corresponding to an angle of view SQ2 in which a periphery of the face of the person H101 as the object is zoomed up, as illustrated in the upper part of FIG. 14.

Figure 15:
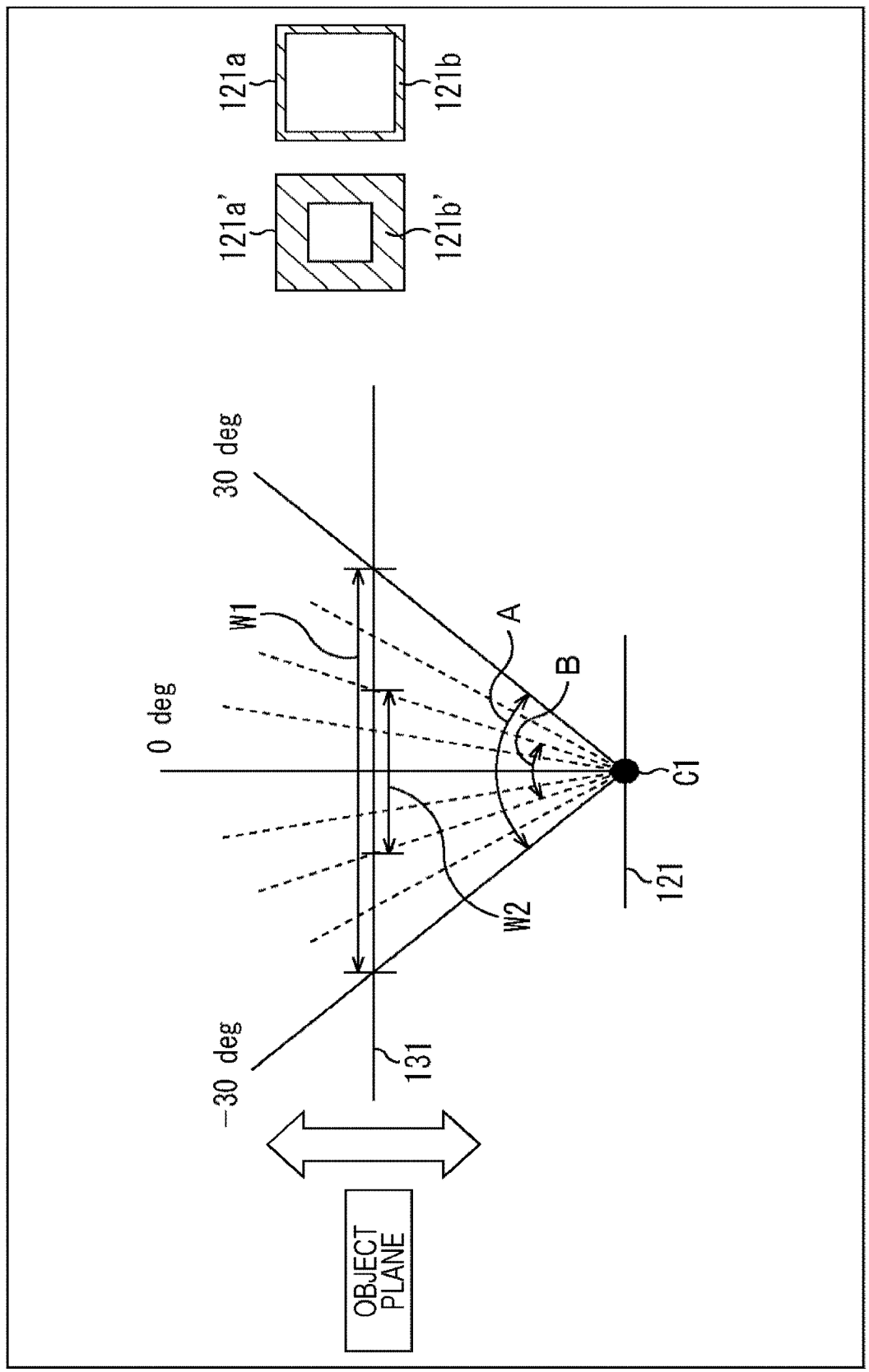
FIG. 15 is a diagram describing the relationship between the narrow angle-of-view pixel and the wide angle-of-view pixel.

The pixel 121a in FIG. 13 is used because it has an incident possible angle range A of incident light with respect to the imaging element 121 as illustrated in a left part of FIG. 15, and thus incident light by an amount of an object width W1 can be received in a horizontal direction on the object plane 131.

On the other hand, the pixel 121a' in FIG. 13 is used because it has a wider light-shielded range than the pixel 121a in FIG. 13 and hence has an incident possible angle range B (<A) of incident light with respect to the imaging element 121 as illustrated in the left part of FIG. 15, and thus incident light by an amount of an object width W2 (<W1) is received in the horizontal direction on the object plane 131.

That is, the pixel 121a in FIG. 13 with a narrow light-shielding range is a wide angle-of-view pixel suitable for imaging a wide range on the object plane 131, whereas the pixel 121a' in FIG. 13 with a wide light-shielding range is a narrow angle-of-view pixel suitable for imaging a narrow range on the object plane 131. Note that the wide angle-of-view pixel and the narrow angle-of-view pixel mentioned here are expressions to compare both the pixels 121a, 121a' in FIG. 13, and are not limited to this for comparing pixels having other angles of views.

Note that FIG. 15 illustrates the relationship between a position on the object plane 131 and the incident angle of incident light from each position with respect to the center position C1 of the imaging element 121. Further, in FIG. 15, the relationship between the position on the object plane 131 and the incident angle of incident light from each position on the object plane 131 with respect to the horizontal direction is illustrated, but a similar relationship applies to the vertical direction. Moreover, a right part of FIG. 15 illustrates the pixels 121a, 121a' in FIG. 13.

With such a configuration, as illustrated in a lower part of FIG. 14, in a case where it is configured by collecting in the imaging element 121 a predetermined number of pixels of each of the pixel 121a of FIG. 13 in a range ZA surrounded by a dotted line and the pixel 121a' of FIG. 13 in a range ZB surrounded by a dotted and dashed line, when it is attempted to restore the image with the angle of view SQ1 corresponding to the object width W1, using the pixel 121a of FIG. 13 that images the angle of view SQ1 enables to appropriately restore the image with the object width W1 of the object plane 131.

Similarly, when it is attempted to restore the image with the angle of view SQ2 corresponding to the object width W2, using the detection signal level of the pixel 121a' of FIG. 13 that images the angle of view SQ2 enables to appropriately restore the image with the object width W2.

Note that in the lower part of FIG. 14, although a configuration in which a predetermined number of pixels 121a' is provided on a left side in the drawing and a predetermined number of pixels 121a is provided on a right side is illustrated, this is illustrated as an example for simplicity of description, and the pixels 121*a* and the pixels 121*a*' are desirably arranged in a random mixture.

In this manner, since the angle of view SQ2 is narrower than the angle of view SQ1, in a case of restoring images of the angle of view SQ2 and the angle of view SQ1 with the same predetermined number of pixels, a restored image with higher image quality can be obtained by restoring the image of the angle of view SQ2 that is narrower than the image of the angle of view SQ1.

That is, in a case where it is considered to obtain a restored image using the same number of pixels, a restored image with higher image quality can be obtained by restoring an image with a narrower angle of view.

Note that in a case of obtaining an image with a wide angle of view as a restored image, all of the wide angle-of-view pixels may be used, or a part of the wide angle-of-view pixels may be used. Further, in a case of obtaining an image with a narrow angle of view as a restored image, all of the narrow angle-of-view pixels may be used, or a part of the narrow angle-of-view pixels may be used.

By using the imaging element 121 as described above, consequently, an imaging lens, an optical element including a diffraction grating and the like, a pinhole, or the like is not necessary. Thus, the degree of freedom in designing the device can be increased, and it is possible to achieve size reduction of the device with respect to an incident direction of incident light, and to reduce manufacturing cost. Further, a lens corresponding to an imaging lens for forming an optical image, such as a focus lens, becomes unnecessary.

Moreover, by using the imaging element 121, it is possible to generate a restored image at various object distances and with angles of view only by obtaining a detection image, and thereafter obtaining a restored image by solving simultaneous equations composed by selectively using a coefficient set group according to an object distance and an angle of view.

Moreover, since the imaging element 121 can have an incident angle directivity in pixel units, pixel multiplication can be implemented, and a restored image with high resolution and high angular resolution can be obtained, compared to an optical filter including a diffraction grating and a conventional imaging element, or the like. On the other hand, in an imaging device including an optical filter and a conventional imaging element, it is difficult to achieve a high resolution or the like of a restored image because it is difficult to miniaturize the optical filter even if the pixels are miniaturized.

Further, since the imaging element 121 does not require an optical filter or the like including a diffraction grating, deformation of an optical filter by heat or the like due to high temperatures of the use environment does not occur. Therefore, by using such an imaging element 121, it is possible to achieve a device with high environmental resistance.

First Modification Example

In the right part of FIG. 6, as a configuration of the light-shielding film 121*b* in each pixel 121*a* of the imaging element 121, there is provided an example in which an overall light-shielding is provided in the vertical direction and a light shielding width and position in the horizontal direction are changed, so as to have a difference in an incident angle directivity in the horizontal direction. However, the configuration of the light-shielding film 121*b* is not limited to this example. For example, an overall light-shielding may be provided in the horizontal direction and a width (height) and position in the vertical direction are changed, so as to have a difference in an incident angle directivity in the vertical direction.

Note that as in the example illustrated in the right part of FIG. 6, the light-shielding film 121*b* that shields the entire pixel 121*a* from light in the vertical direction and shields the pixel 121*a* from light by a predetermined width in the horizontal direction will be referred to as a horizontal band type light-shielding film 121*b*. On the other hand, the light-shielding film 121*b* that shields the entire pixel 121*a* from light in the horizontal direction and shields the pixel 121*a* from light by a predetermined height in the vertical direction will be referred to as a vertical band type light-shielding film 121*b*.

Figure 16:
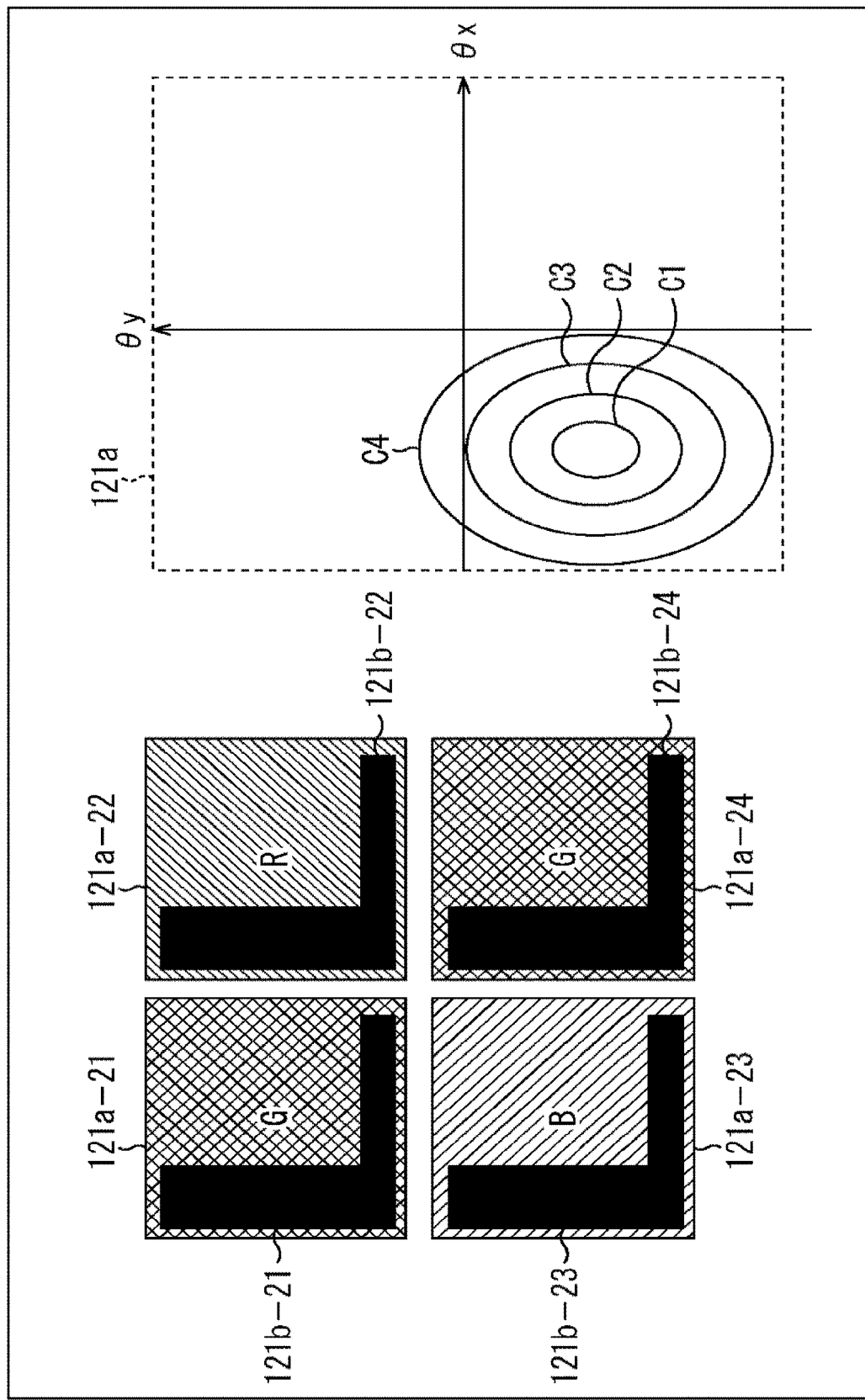
FIG. 16 is a diagram describing a modification example.

Further, as in an example illustrated in a left part of FIG. 16, the pixel 121*a* may be provided with an L-shaped light-shielding film 121*b* by combining vertical band type and horizontal band type light-shielding films 121*b*. In the left part of FIG. 16, a part illustrated in black is a light-shielding film 121*b*. That is, light-shielding films 121*b*-21 to 121*b*-24 are light-shielding films of the pixels 121*a*-21 to 121*a*-24, respectively.

Each of these pixels (pixels 121*a*-21 to 121*a*-24) has an incident angle directivity as illustrated in a right part of FIG. 16. A graph illustrated in the right part of FIG. 16 illustrates light receiving sensitivity in each pixel. A horizontal axis represents an incident angle θx in the horizontal direction (x direction) of incident light, and a vertical axis represents an incident angle θy in the vertical direction (y direction) of the incident light. Then, light receiving sensitivity within a range C4 is higher than that outside the range C4, light receiving sensitivity within a range C3 is higher than that outside the range C3, light receiving sensitivity within a range C2 is higher than that outside the range C2, and light receiving sensitivity within a range C1 is higher than that outside the range C1.

Therefore, it is illustrated that, for each pixel, the incident light that satisfies conditions of the incident angle θx in the horizontal direction (x direction) and the incident angle θy in the vertical direction (y direction), which is within the range C1, has the highest detection signal level, and the detection signal level decreases in the order of the conditions in the range C2, the range C3, the range C4, and the range other than the range C4. The intensity of such light receiving sensitivity is determined by the range shielded from light by the light-shielding film 121*b*.

Further, in the left part of FIG. 16, an alphabet in each pixel 121*a* indicates the color of a color filter (illustrated for convenience of description and is not actually written). The pixel 121*a*-21 is a G pixel in which a green color filter is disposed, the pixel 121*a*-22 is an R pixel in which a red color filter is disposed, the pixel 121*a*-23 is a B pixel in which a blue color filter is disposed, and the pixel 121*a*-24 is a G pixel in which a green color filter is disposed. That is, these pixels form a Bayer array. Of course, this is an example, and the arrangement pattern of the color filters is arbitrary. The arrangement of the light-shielding film 121*b* and the color filter are irrelevant. For example, in part or all of the pixels, a filter other than the color filter may be provided, or no filter may be provided.

In the left part of FIG. 16, although an example in which the "L-shaped" light-shielding film 121*b* shields a left side and a lower side of the pixel 121*a* in the diagram from light is illustrated, the direction of this "L-shaped" light-shielding film 121*b* is arbitrary and is not limited to the example in FIG. 16. For example, the "L-shaped" light-shielding film 121*b* may shield the lower side and a right side of the pixel 121*a* in the diagram from light, may shield the right side and an upper side of the pixel 121*a* in the diagram from light, or may shield the upper side and the left side of the pixel 121*a* in the diagram from light. Of course, the direction of the light-shielding film 121*b* can be set independently for each pixel. Note that the "L-shaped" light-shielding film 121*b* will also be collectively referred to as an "L type light-shielding film 121*b*".

Although the light-shielding film has been described above, the description of this example can also be applied to a case where an incident angle directivity is given by selectively using a plurality of photodiodes disposed in a pixel. That is, for example, by appropriately setting a dividing position (size and shape of each partial area), a position, a size, a shape, and the like of each photodiode, or appropriately selecting a photodiode, incident light directivity equivalent to the incident light directivity by the L type light-shielding film 121*b* described above can be achieved.

Second Modification Example

Figure 17:
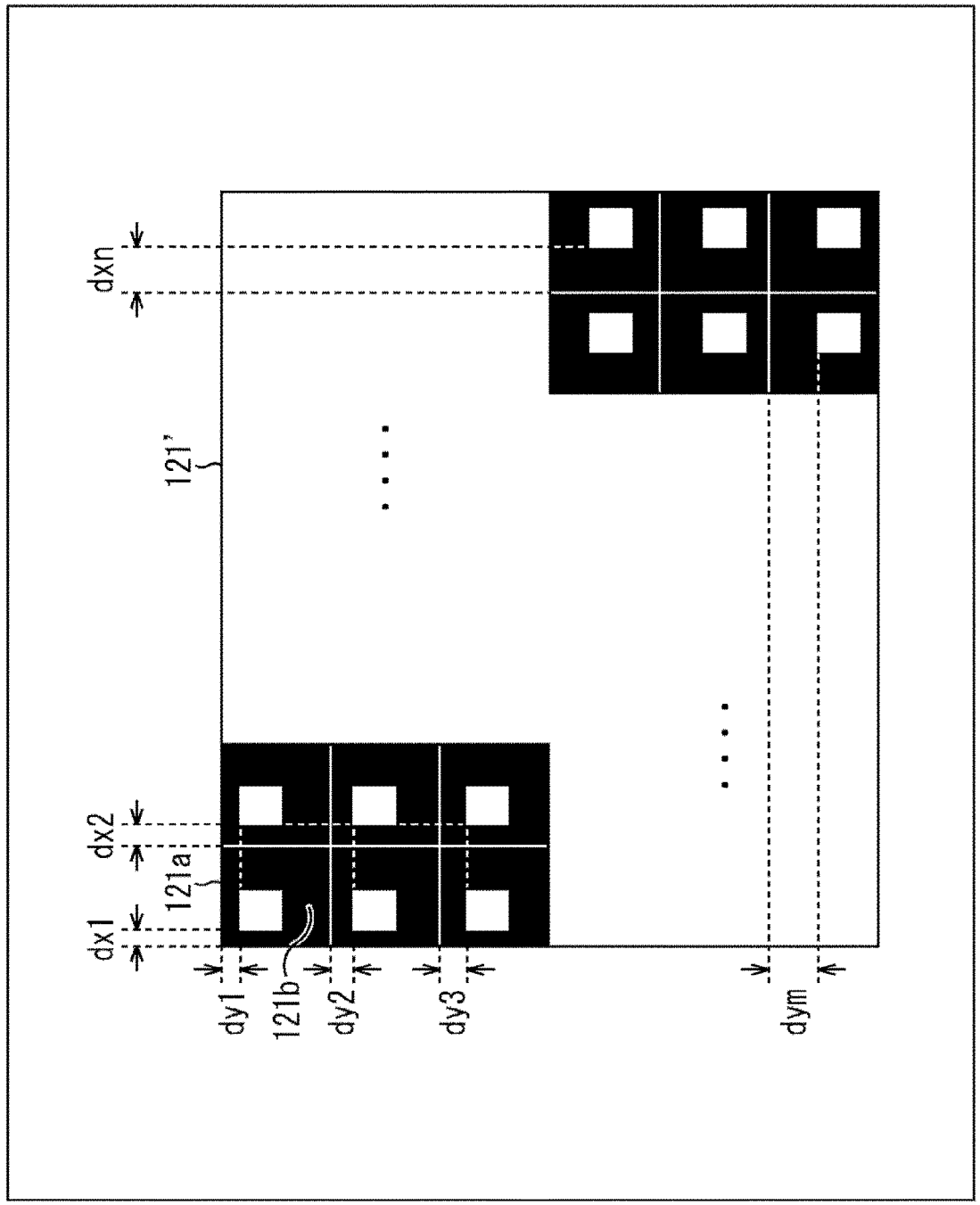
FIG. 17 is a diagram describing a modification example.

In the above, although the horizontal band type, the vertical band type, and the L type light-shielding films have been described with respect to an example in which a light-shielded range is arranged in each pixel in a randomly changing manner, for example, as illustrated by an imaging element 121' in FIG. 17, there may be formed a light-shielding film 121*b* (range illustrated in black in the diagram) that shields a portion other than the range in the vicinity of a position where a light beam is received in each of the pixels from light in a case where a rectangular opening is provided.

That is, the light-shielding film 121*b* may be provided so as to have an incident angle directivity to receive, in a case where a rectangular opening is provided for each pixel, only a light beam that is transmitted through the rectangular opening to be received, out of light beams from a point light source that form an object plane at a predetermined object distance.

Note that in FIG. 17, for example, the width in the horizontal direction of the light-shielding film 121*b* changes to widths dx1, dx2, . . . dxn with respect to a pixel arrangement in the horizontal direction, and the widths are in the relationship of dx1<dx2< . . . <dxn. Similarly, the height in the vertical direction of the light-shielding film 121*b* changes to heights dy1, dy2 . . . dym with respect to a pixel arrangement in the vertical direction, and the heights are in the relationship of dy1<dy2< . . . <dxm. Further, intervals of respective changes in the width in the horizontal direction and the width in the vertical direction of the light-shielding film 121*b* depend on object resolution (angular resolution) to be restored.

In other words, it can be said that the configuration of each pixel 121*a* in the imaging element 121' in FIG. 17 has an incident angle directivity such that the light-shielding range changes so as to correspond to the pixel arrangement in the imaging element 121' in the horizontal direction and the vertical direction.

Figure 18:
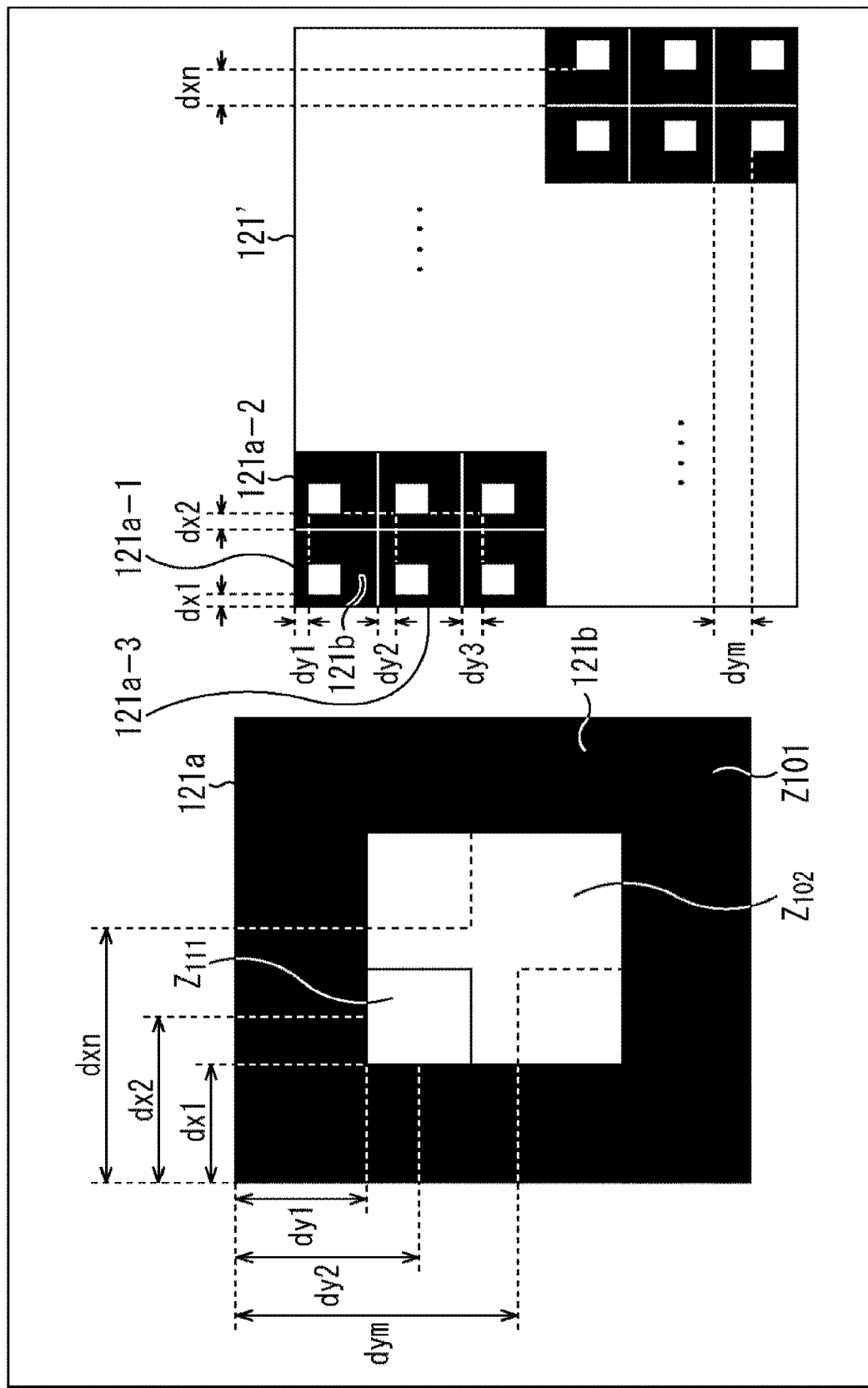
FIG. 18 is a diagram describing the modification example.

More specifically, the light-shielding range of each pixel 121*a* in FIG. 17 is determined according to rules described using a pixel 121*a* illustrated on a left part in FIG. 18, for example.

Note that a right part of FIG. 18 illustrates the same configuration of the imaging element 121' as that of FIG. 17. Further, the left part of FIG. 18 illustrates a configuration of the pixel 121*a* of the imaging element 121' in the right part of FIG. 18 (same as FIG. 17).

As illustrated in the left part of FIG. 18, the light-shielding film 121*b* shields light by width dx1 from each of upper and lower side ends of the pixel 121*a* toward the inside of the pixel 121*a*, and the light-shielding film 121*b* shields light by height dy1 from each of left and right side ends toward the inside of the pixel 121*a*. Note that in FIGS. 18 and 19, the light-shielding film 121*b* is a range illustrated in black.

A range shielded from light by the light-shielding film 121*b* formed in this manner in the left part of FIG. 18 will be hereinafter referred to as a main light-shielding portion 2101 of the pixel 121*a* (black part in the left part of FIG. 18), and a square-shaped range other than that will be referred to as a range 2102.

A rectangular opening 2111 that is not shielded from light by the light-shielding film 121*b* is provided in the range 2102 in the pixel 121*a*. Therefore, in the range 2102, the range other than the rectangular opening Z111 is shielded from light by the light-shielding film 121*b*.

The pixel arrangement in the imaging element 121' in FIG. 17 is such that in the pixel 121*a*-1 at a left end portion and an upper end portion, a rectangular opening Z111 is arranged so that a left side thereof is at a distance of width dx1 from the left side of the pixel 121*a*, and an upper side thereof is at a distance of dy1 from the upper side of the pixel 121*a*, as illustrated in the right part of FIG. 18 (same as FIG. 17).

Similarly, in the pixel 121*a*-2 on a right side of the pixel 121*a*-1, a rectangular opening Z111 is arranged so that a left side thereof is at a distance of width dx2 from the left side of the pixel 121*a*, and an upper side thereof is at a distance of height dy1 from the upper side of the pixel 121*a*, and a range other than the rectangular opening Z111 is shielded from light by the light-shielding film 121*b*.

Thereafter, similarly, in a pixel 121*a* adjacent in the horizontal direction, the right side of the rectangular opening Z111 moves by the widths dx1, dx2 . . . dxn from the right side of the pixel 121*a* as its arrangement moves toward a right side in the diagram. Note that a rectangular portion of a dotted line of an upper right portion in the range Z102 of FIG. 18 illustrates a state that the rectangular opening 2111 is arranged so that a left side thereof is at a distance of the width dxn from the left side of the pixel 121*a*, and an upper side thereof is at the distance of height dy1 from the upper side of the pixel 121*a*. Further, each of intervals of the widths dx1, dx2 . . . dxn is a value obtained by dividing a width obtained by subtracting the width of the rectangular opening 2111 from the width in the horizontal direction of the range 2102 by the number of pixels n in the horizontal direction. That is, an interval of change in the horizontal direction is determined by dividing by the number of pixels n in the horizontal direction.

Further, a position in the horizontal direction of the rectangular opening Z111 in the pixel 121*a* in the imaging element 121' is the same in the pixels 121*a* (pixels 121*a* in the same column) at the same positions in the horizontal direction in the imaging element 121'.

Moreover, in the pixel 121*a*-3 adjacent on an immediately lower side of the pixel 121*a*-1, a rectangular opening Z111 is arranged so that a left side thereof is at a distance of width dx1 from the left side of the pixel 121*a*, and an upper side thereof is at a distance of height dy2 from the upper side of the pixel 121*a*, and a range other than the rectangular opening Z111 is shielded from light by the light-shielding film 121*b*.

Thereafter, similarly, in a pixel 121*a* adjacent in the vertical direction, the upper side of the rectangular opening 2111 moves by the heights dy1, dy2 . . . dyn from the upper side of the pixel 121*a* as its arrangement moves toward a lower side in the diagram. Note that a rectangular portion of a dotted line of a lower left portion in the range Z102 of FIG. 18 illustrates a state that the rectangular opening Z111 is arranged so that a left side thereof is at the distance of width dx1 from the left side of the pixel 121*a*, and an upper side thereof is at a distance of the height dym from the upper side of the pixel 121*a*. Further, each of intervals of the heights dy1, dy2 . . . dym is a value obtained by dividing a height obtained by subtracting the height of the rectangular opening Z111 from the height in the vertical direction of the range Z102 by the number of pixels m in the vertical direction. That is, an interval of change in the vertical direction is determined by dividing by the number of pixels m in the vertical direction.

Further, a position in the vertical direction of the rectangular opening 2111 in the pixel 121*a* in the imaging element 121' is the same in the pixels 121*a* (pixels 121*a* in the same row) at the same positions in the vertical direction in the imaging element 121'.

Moreover, the angle of view can be changed by changing the main light-shielding portion 2101 and the rectangular opening Z111 of each pixel 121*a* constituting the imaging element 121' illustrated in FIG. 18 (FIG. 17).

Figure 19:
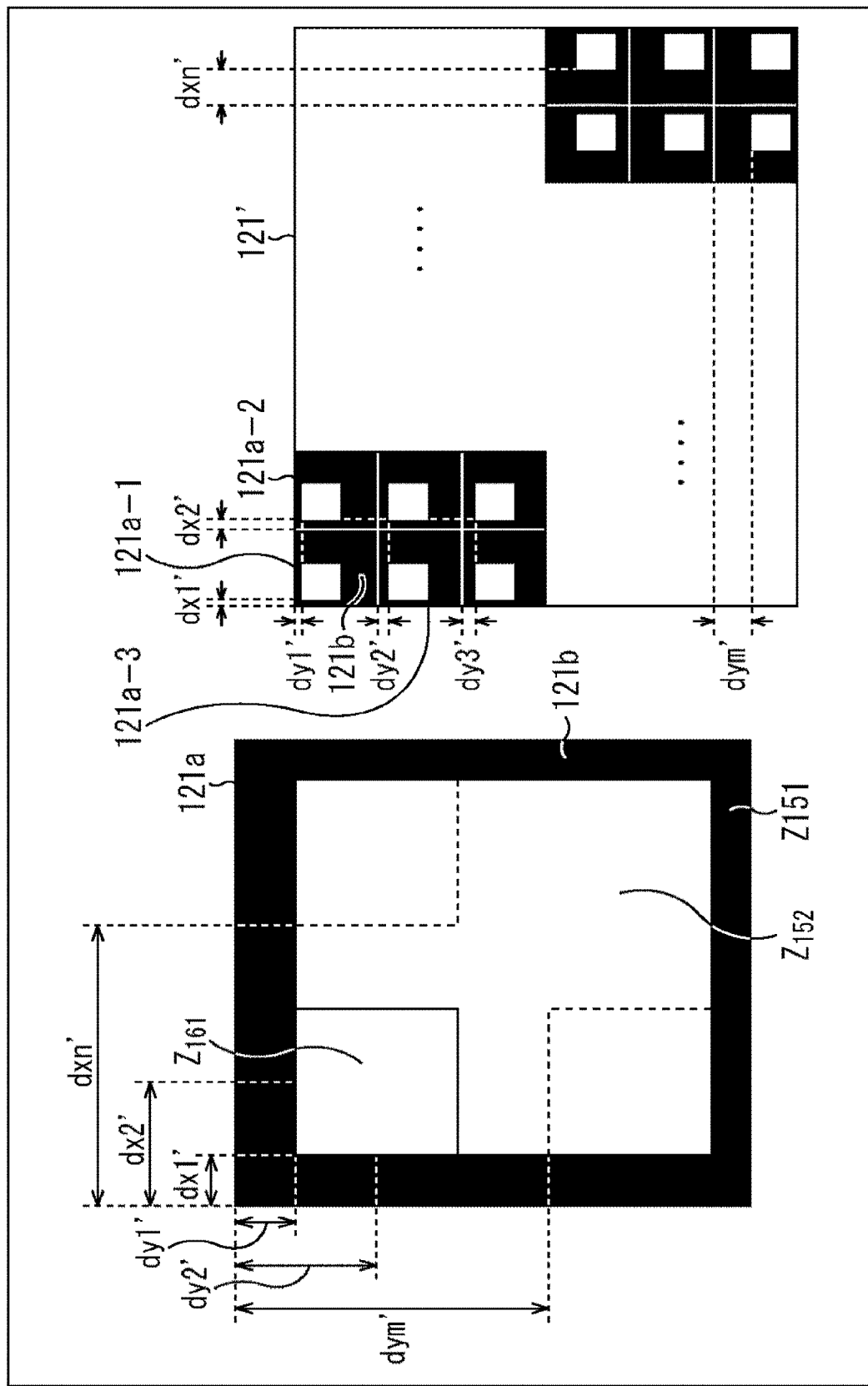
FIG. 19 is a diagram describing an example in which an angle of view is changed by applying the modification example.

A right part of FIG. 19 illustrates a configuration of an imaging element 121' in a case where the angle of view is wider than that of the imaging element 121' of FIG. 18 (FIG. 17). Further, a left part of FIG. 19 illustrates a configuration of the pixel 121*a* of the imaging element 121' in the right part of FIG. 19.

That is, as illustrated in the left part of FIG. 19, for example, a main light-shielding portion Z151 (black part in the left part of FIG. 19) having a light-shielding range narrower than the main light-shielding portion Z101 in FIG. 18 is set in the pixel 121*a*, and a range other than that is set as a range Z152. Moreover, a rectangular opening Z161 having a larger opening area than the rectangular opening Z111 is set in the range Z152.

More specifically, as illustrated in the left part of FIG. 19, the light-shielding film 121*b* shields light by width dx1' (<dx1) from each of upper and lower side ends of the pixel 121*a* toward the inside of the pixel 121*a*, and the light-shielding film 121*b* shields light by height dy1' (<dy1) from each of left and right side ends toward the inside of the pixel 121*a*, thereby forming the rectangular opening Z161.

Here, as illustrated in the right part of FIG. 19, in the pixel 121*a*-1 at a left end portion and at an upper end portion, a rectangular opening Z161 is arranged so that a left side thereof is at a distance of width dx1' from the left side of the pixel 121*a*, and an upper side thereof is at a distance of height dy1' from the upper side of the pixel 121*a*, thereby light-shielding a range other than the rectangular opening Z161 by the light-shielding film 121*b*.

Similarly, in the pixel 121*a*-2 on a right side of the pixel 121*a*-1, a rectangular opening Z161 is arranged so that a left side thereof is at a width dx2' from the left side of the pixel 121*a*, and an upper side thereof is at a height dy1' from the upper side of the pixel 121*a*, and a range other than the rectangular opening Z161 is shielded from light by the light-shielding film 121*b*.

Thereafter, similarly, in a pixel 121*a* adjacent in the horizontal direction, the right side of the rectangular opening Z161 moves by the widths dx1', dx2' dxn' from the right side of the pixel 121*a* as its arrangement moves toward a right side in the diagram. Here, each of intervals of the widths dx1', dx2' dxn' is a value obtained by dividing a width obtained by subtracting the width in the horizontal direction of the rectangular opening Z161 from the width in the horizontal direction of the range Z152 by the number of pixels n in the horizontal direction. That is, an interval of change in the vertical direction is determined by dividing by the number of pixels n in the horizontal direction. Therefore, intervals of changes in the widths dx1', dx2' . . . dxn' are larger than intervals of changes in the widths dx1, dx2 . . . dxn.

Further, a position in the horizontal direction of the rectangular opening Z161 in the pixel 121*a* in the imaging element 121' of FIG. 19 is the same in the pixels 121*a* (pixels 121*a* in the same column) at the same positions in the horizontal direction in the imaging element 121'.

Moreover, in the pixel 121*a*-3 adjacent on an immediately lower side of the pixel 121*a*-1, a rectangular opening Z161 is arranged so that a left side thereof is at a distance of width dx1' from the left side of the pixel 121*a*, and an upper side thereof is at a distance of height dy2' from the upper side of the pixel 121*a*, and a range other than the rectangular opening Z161 is shielded from light by the light-shielding film 121*b*.

Thereafter, similarly, in a pixel 121*a* adjacent in the vertical direction, the upper side of the rectangular opening Z161 moves by the heights dy1', dy2' . . . dym' from the upper side of the pixel 121*a* as its arrangement moves toward a lower side in the diagram. Here, intervals of changes in the heights dy1', dy2' . . . dym' are a value obtained by dividing a height obtained by subtracting the height in the vertical direction of the rectangular opening Z161 from the height in the vertical direction of the range Z152 by the number of pixels m in the vertical direction. That is, an interval of change in the vertical direction is determined by dividing by the number of pixels m in the vertical direction. Therefore, intervals of changes in the heights dy1', dy2' . . . dym' are larger than intervals of changes in the width heights dy1, dy2 . . . dym.

Further, a position in the vertical direction of the rectangular opening Z161 in the pixel 121*a* in the imaging element 121' of FIG. 19 is the same in the pixels 121*a* (pixels 121*a* in the same row) at the same positions in the vertical direction in the imaging element 121'.

In this manner, by changing the combination of the light-shielding range of the main light-shielding portion and the opening range of the opening, the imaging element 121' including pixels 121*a* having various angles of view (having various incident angle directivities) can be achieved.

Moreover, the imaging element 121 may be achieved by combining not only the pixels 121*a* having the same angle of view but also the pixels 121*a* having various angles of view.

Figure 20:
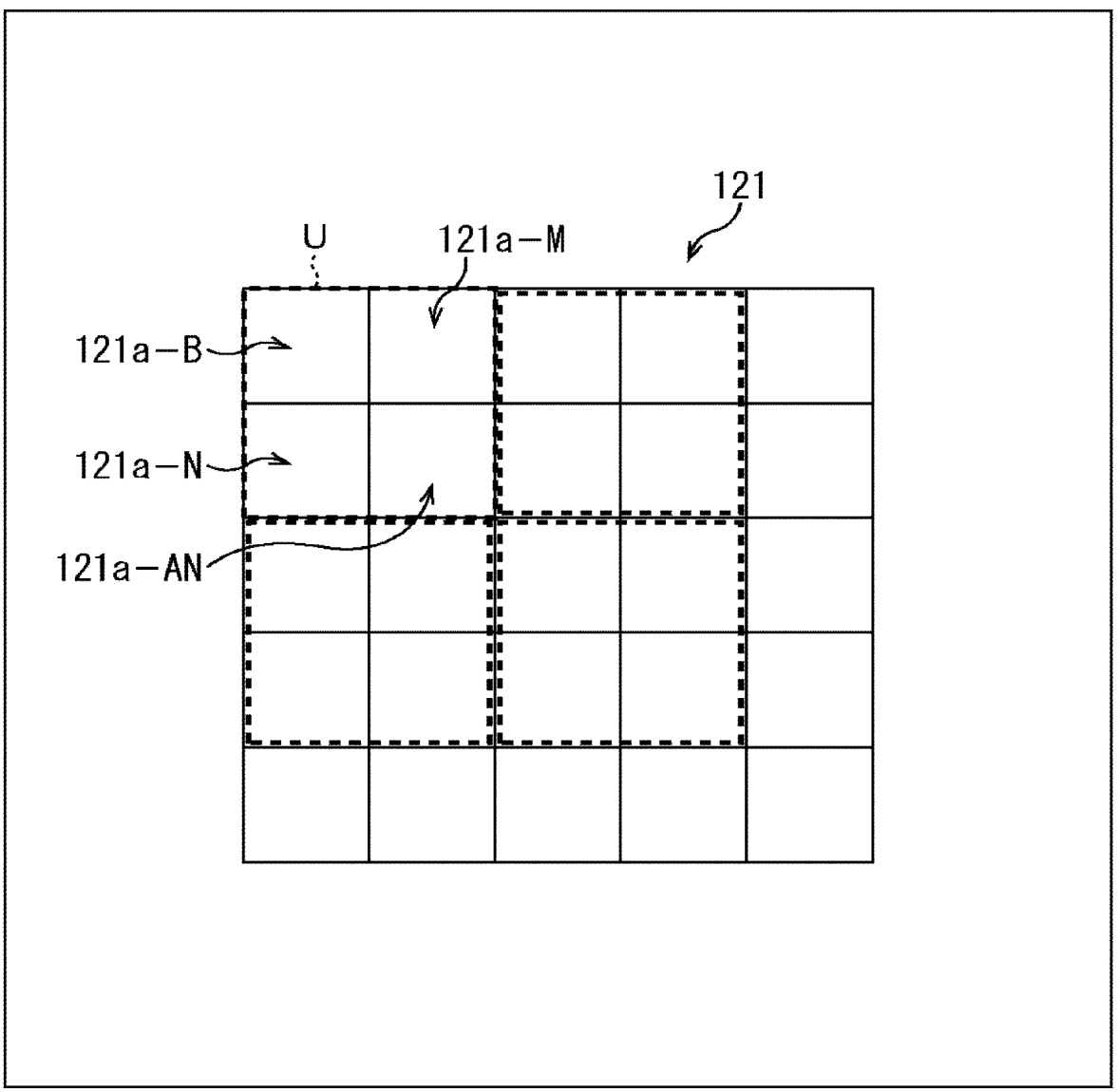
FIG. 20 is a diagram describing an example of combining pixels having a plurality of angles of view when an angle of view is changed by applying a modification example.

For example, as illustrated in FIG. 20, four pixels including two pixels×two pixels indicated by dotted lines are defined as one unit U, and each unit U includes a wide angle-of-view pixel 121*a*-W, a medium angle-of-view pixel 121*a*-M, a narrow angle-of-view pixel 121*a*-N, and a very narrow angle-of-view pixel 121*a*-AN.

In this case, for example, in a case where the number of pixels of all the pixels 121*a* is X, it is possible to restore the restored image using detection images of every X/4 pixels for each of the four types of angles of view. At this time, four different types of coefficient sets are used for every angle of view, and restored images having different angles of view are restored respectively by four different simultaneous equations.

Thus, by restoring the restored image of an angle of view to be restored using a detection image obtained from pixels suitable for imaging with the angle of view to be restored, an appropriate restored image corresponding to the four types of angles of view can be restored.

Further, an image with an intermediate angle of view among the four types of angles of view or with an angle of view before or after it may be generated by interpolation from images of the four types of angles of view, and pseudo optical zoom may be achieved by seamlessly generating images with various angles of view.

Although the light-shielding film has been described above, the description of this example can also be applied to a case where an incident angle directivity is given by selectively using a plurality of photodiodes disposed in a pixel. That is, for example, by appropriately setting a dividing position (size and shape of each partial area), a position, a size, a shape, and the like of each photodiode, or appropriately selecting a photodiode, incident light directivity equivalent to the incident light directivity by the light-shielding film 121b having a rectangular opening described above can be achieved. Of course, also in this case, the imaging element 121 can be achieved also by combining pixels 121a having various angles of view. Further, an image with an intermediate angle of view or with an angle of view before or after it may be generated by interpolation from images with a plurality of types of angles of view, and pseudo optical zoom may be achieved by seamlessly generating images of various angles of view.

Third Modification Example

Incidentally, in a case where ranges shielded from light by the light-shielding films 121b of pixels 121a in the imaging element 121 have randomness, the larger the randomness of differences in the ranges shielded from light by the light-shielding films 121b, the larger the load of processing by a restoration unit 321 and the like. Accordingly, part of the differences in the ranges shielded from light by the light-shielding films 121b of the pixels 121a may be regularized to reduce this randomness of differences, to thereby reduce the processing load.

For example, horizontal band type light-shielding films 121b having the same widths are combined in a predetermined column direction, and vertical band type light-shielding films 121b having the same heights are combined in a predetermined row direction, so as to form L type light-shielding films 121b combining a vertical band type and a horizontal band type. In this manner, light-shielding ranges of the light-shielding films 121b of respective pixels 121a are set to different values at random in pixel units while having regularity in the column direction and the row direction. As a result, randomness of differences in light-shielding ranges of the light-shielding films 121b of respective pixels 121a, that is, differences in incident angle directivities of respective pixels can be reduced, and a processing load outside the imaging element 121, such as that of the restoration unit 321, can be reduced.

Figure 21:
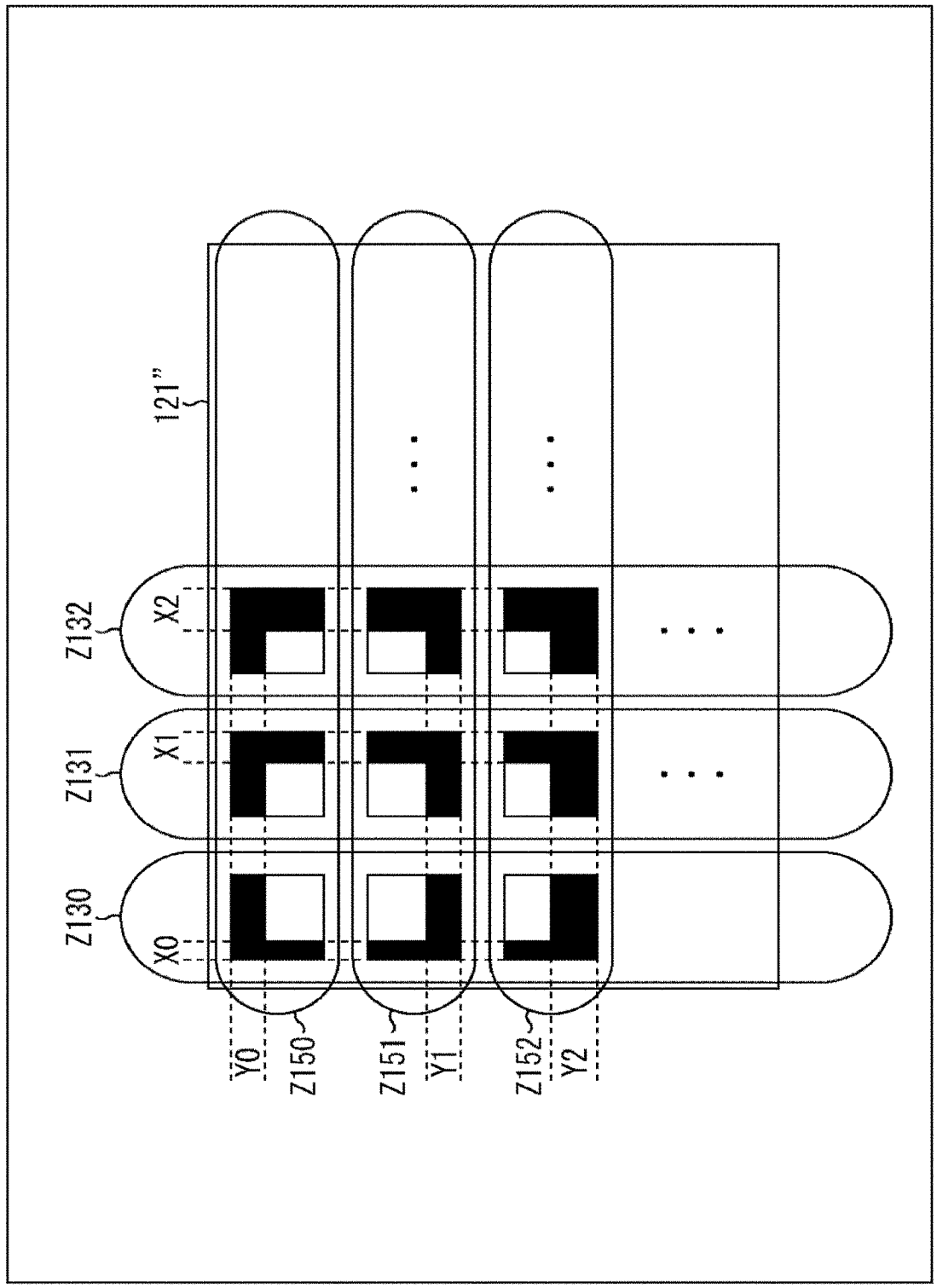
FIG. 21 is a diagram describing a modification example.

For example, in a case of the imaging element 121″ in FIG. 21, horizontal band type light-shielding films 121b having the same widths X0 are used for all pixels in the same column indicated by a range Z130, vertical band type light-shielding films 121b having the same heights Y0 are used for pixels in the same row indicated by a range Z150, and L type light-shielding films 121b in which they are combined are set for pixels 121a identified by respective rows and columns.

Similarly, horizontal band type light-shielding films 121b having the same widths X1 are used for all pixels in the same column indicated by a range Z131 adjacent to the range Z130, vertical band type light-shielding films 121b having the same heights Y1 are used for pixels in the same row indicated by a range 2151 adjacent to the range Z150, and L type light-shielding films 121b in which they are combined are set for pixels 121a identified by respective rows and columns.

Moreover, horizontal band type light-shielding films having the same widths X2 are used for all pixels in the same column indicated by a range Z132 adjacent to the range Z132, vertical band type light-shielding films having the same heights Y2 are used for pixels in the same row indicated by a range Z152 adjacent to the range Z151, and L type light-shielding films 121b in which they are combined are set for pixels 121a identified by respective rows and columns.

In this manner, while the light-shielding films 121b have regularity in widths and positions in the horizontal direction as well as heights and positions in the vertical direction, the ranges of the light-shielding films can be set to different values in pixel units, and thus it is possible to suppress the randomness of differences in the incident angle directivities. Consequently, patterns of coefficient sets can be reduced, and a processing load of arithmetic processing in a subsequent stage (for example, the restoration unit 321, and the like) can be reduced.

Figure 22:
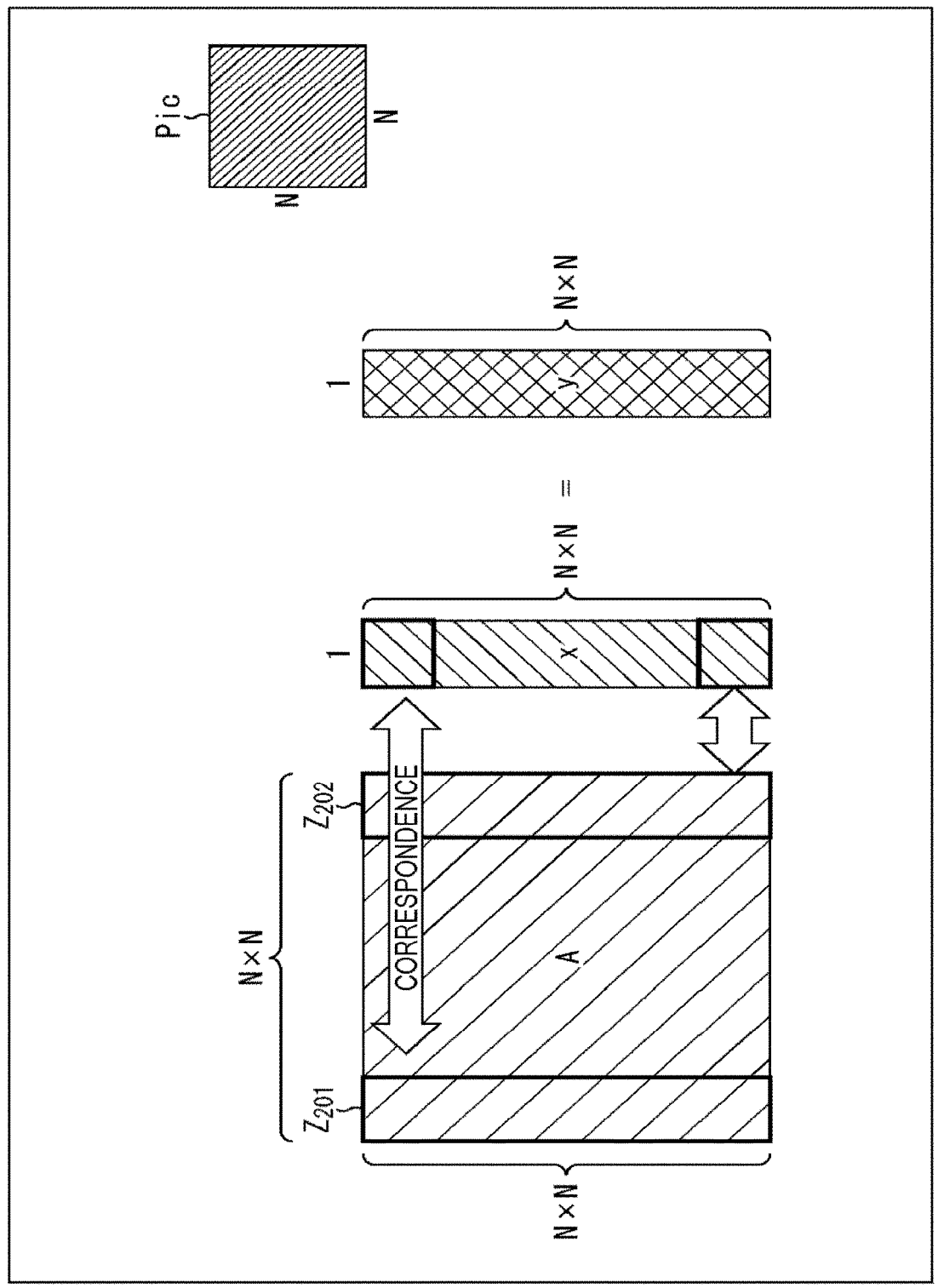
FIG. 22 is a diagram describing a reason why a calculation amount and a memory capacity are reduced by providing rules for a light-shielding range in each of a horizontal direction and a vertical direction.

More specifically, in a case where a restored image with N×N pixels is obtained from a detection image Pic with N pixels×N pixels as illustrated in an upper right part of FIG. 22, a relationship illustrated in a left part of FIG. 22 is established by a vector X having pixel values of respective pixels of a restored image with N×N rows and one column as elements, a vector Y having pixel values of respective pixels of a detection image with N×N rows and one column as elements, and a matrix A with N×N rows and N×N columns including coefficient sets.

That is, FIG. 22 illustrates that a result of multiplying each element of the matrix A with N×N rows and N×N columns including coefficient sets and the vector X with N×N rows and one column that represents the restored image becomes the vector Y with N×N rows and one column that represents a detection image, and a simultaneous equation is obtained from this relationship.

Note that FIG. 22 illustrates that each element of a first column indicated by a range 2201 of the matrix A corresponds to an element of a first row of the vector X, and each element of an N×N-th column indicated by a range 2202 of the matrix A corresponds to an element of an N×N-th row of the vector X.

In other words, a restored image is obtained by obtaining each element of the vector X by solving a simultaneous equation based on a determinant illustrated in FIG. 22. Further, in a case where a pinhole is used, and in a case where a light-collecting function for causing incident light entering from the same direction to be incident on both pixel output units adjacent to each other, such as an imaging lens, is used, the relationship between the position of each pixel and the incident angle of light is uniquely determined, and thus the matrix A becomes a diagonal matrix which is a square matrix in which all diagonal components ((i, i) elements) are constituted of 1 and all other than the diagonal components are constituted of 0. Conversely, in a case where neither a pinhole nor an imaging lens is used as in the imaging element 121 in FIG. 5, the relationship between the position of each pixel and the incident angle of light is not uniquely determined, and thus the matrix A does not become a diagonal matrix.

Figure 23:
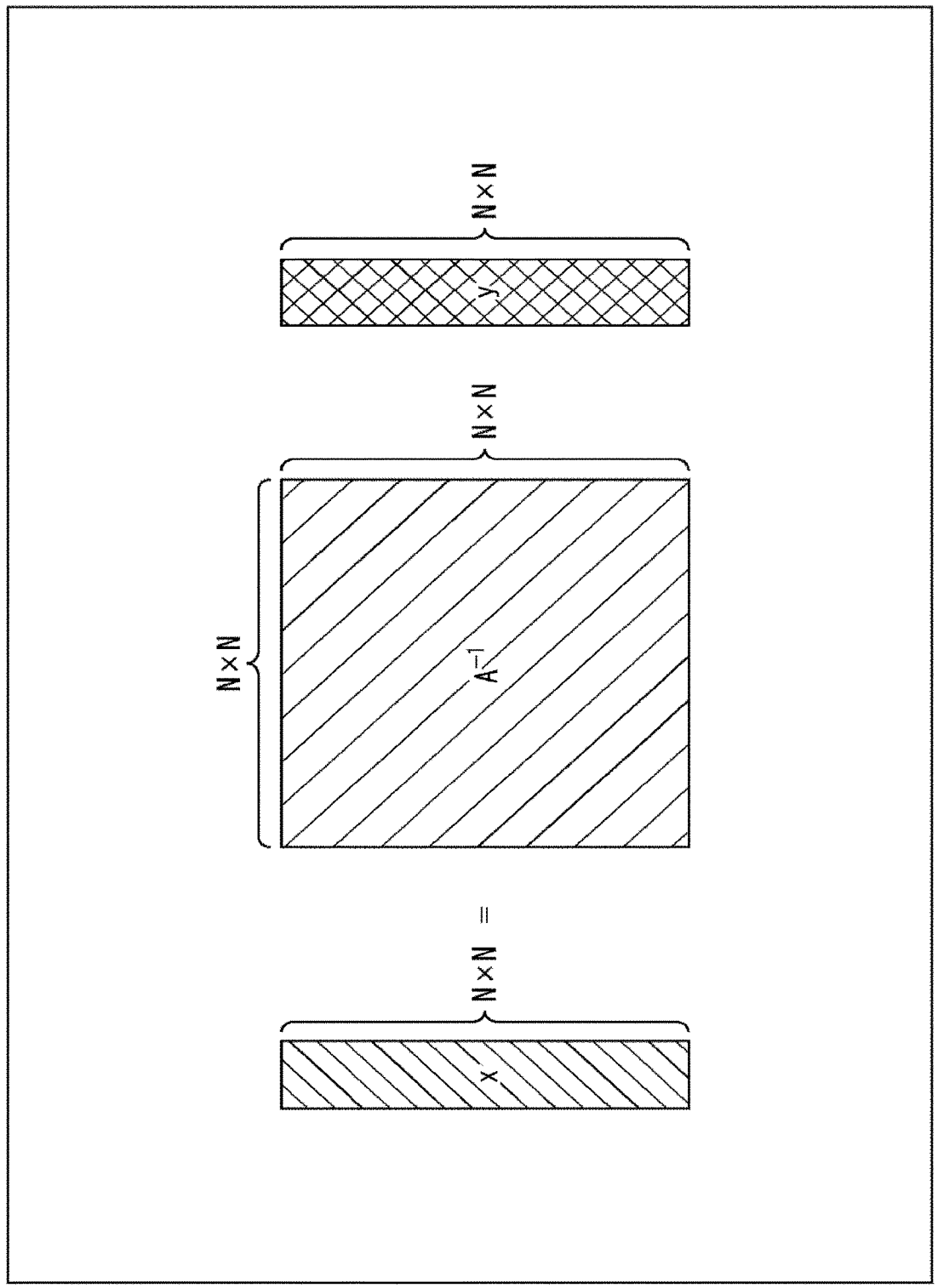
FIG. 23 is a diagram describing a reason why the calculation amount and the memory capacity are reduced by providing rules for the light-shielding range in each of the horizontal direction and the vertical direction.

Incidentally, in general, the determinant of FIG. 22 is transformed as illustrated in FIG. 23 by multiplying both sides by an inverse matrix $A^{-1}$ of the matrix A from the left, and each element of the vector X, which is a detection image, is obtained by multiplying the vector Y of the detection image by the inverse matrix $A^{-1}$ from the right.

However, it is possible that the simultaneous equation cannot be solved due to any of reasons that a real matrix A cannot be obtained accurately or cannot be measured accurately, that it cannot be solved because it is in a case where a basis vector of the matrix A is close to linear dependence, and that each element of the detection image contains noise, or a combination thereof.

Therefore, considering a robust configuration against various errors, following equation (7) using the concept of a regularized least squares method is taken.

[Equation 1]

$$\hat{x} = \min \|A\hat{x} - y\|^2 + \|\gamma\hat{x}\|^2 \quad (7)$$

Here, in equation (7), x to which "^" is added on the top represents the vector X, A represents the matrix A, Y represents the vector Y, γ represents a parameter, and ‖A‖ represents an L2 norm (square root sum of squares). Here, a first term is a norm when a difference between both sides in FIG. 22 is minimized, and a second term is a regularization term.

When this equation (7) is solved for x, it is expressed by following equation (8).

[Equation 2]

$$\hat{x} = (A^t A + \gamma I)^{-1} A^t y \quad (8)$$

However, since the matrix A is enormous in size, a calculation time and a large amount of memory for calculation are needed.

Figure 24:
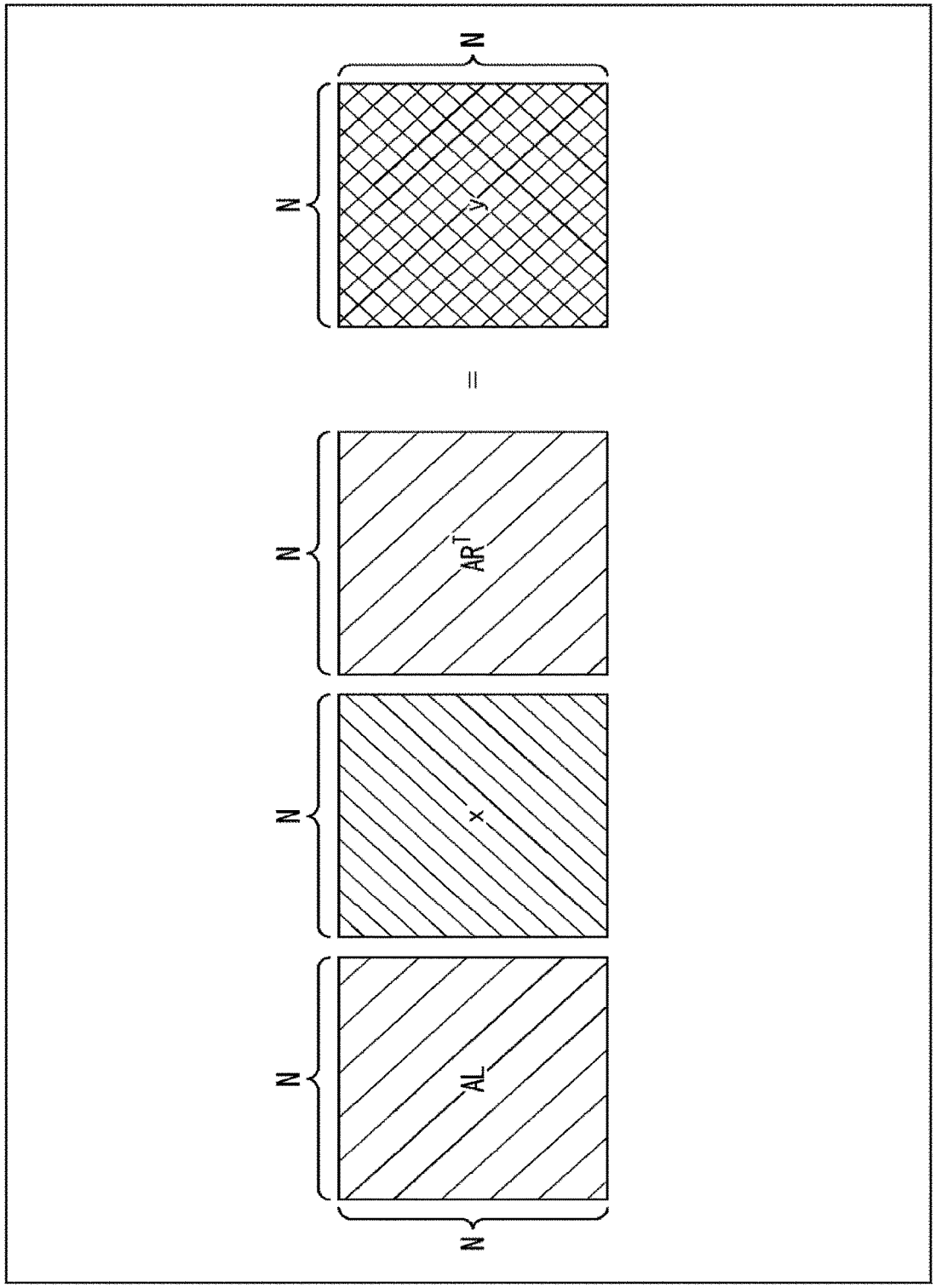
FIG. 24 is a diagram describing a reason why the calculation amount and the memory capacity are reduced by providing rules for the light-shielding range in each of the horizontal direction and the vertical direction.

Therefore, for example, as illustrated in FIG. 24, it is considered that the matrix A is decomposed into a matrix AL with N rows and N columns and a matrix $AR^T$ with N rows and N columns, and a result of multiplication from a preceding stage and a succeeding stage of a matrix X with N rows and N columns that each represent a restored image becomes a matrix Y with N rows and N columns that represents a detection image. Thus, they become matrices AL, $AR^T$ having the number of elements (N×N) for the matrix A having the number of elements (N×N)×(N×N), and thus the number of elements can be decreased to 1/(N×N). As a result, it is only necessary to use two matrices AL, $AR^T$ having the number of elements (N×N), and thus the calculation amount and the memory capacity can be reduced.

Here, $A^T$ is a transposed matrix of the matrix A, γ is a parameter, and I is a unit matrix. In equation (8), the matrix in parentheses is the matrix AL, and the inverse matrix of the transposed matrix of the matrix A is the matrix $AR^T$. A determinant illustrated in FIG. 24 is achieved.

Figure 25:
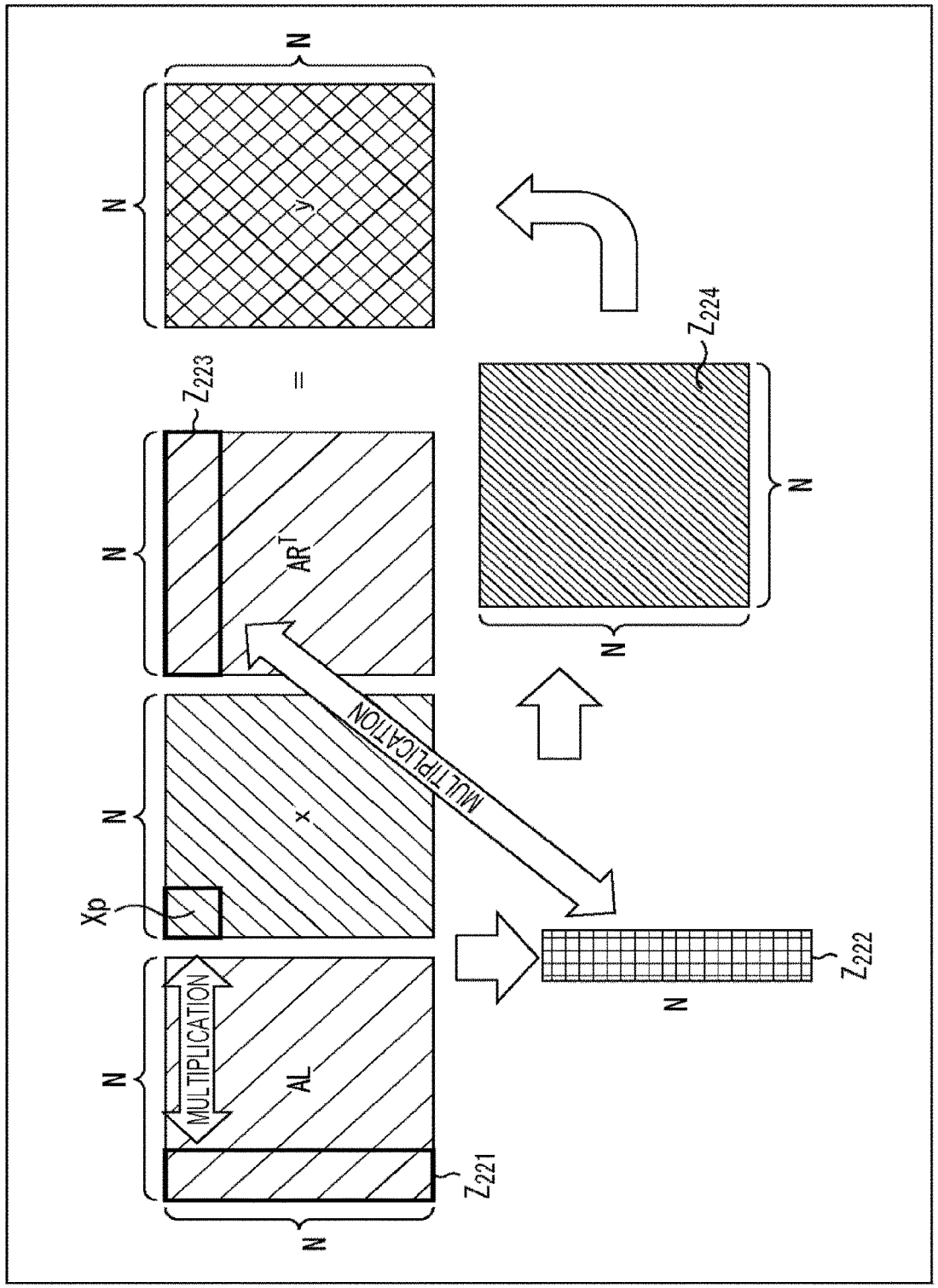
FIG. 25 is a diagram describing a reason why the calculation amount and the memory capacity are reduced by providing rules for the light-shielding range in each of the horizontal direction and the vertical direction.
Figure 26:
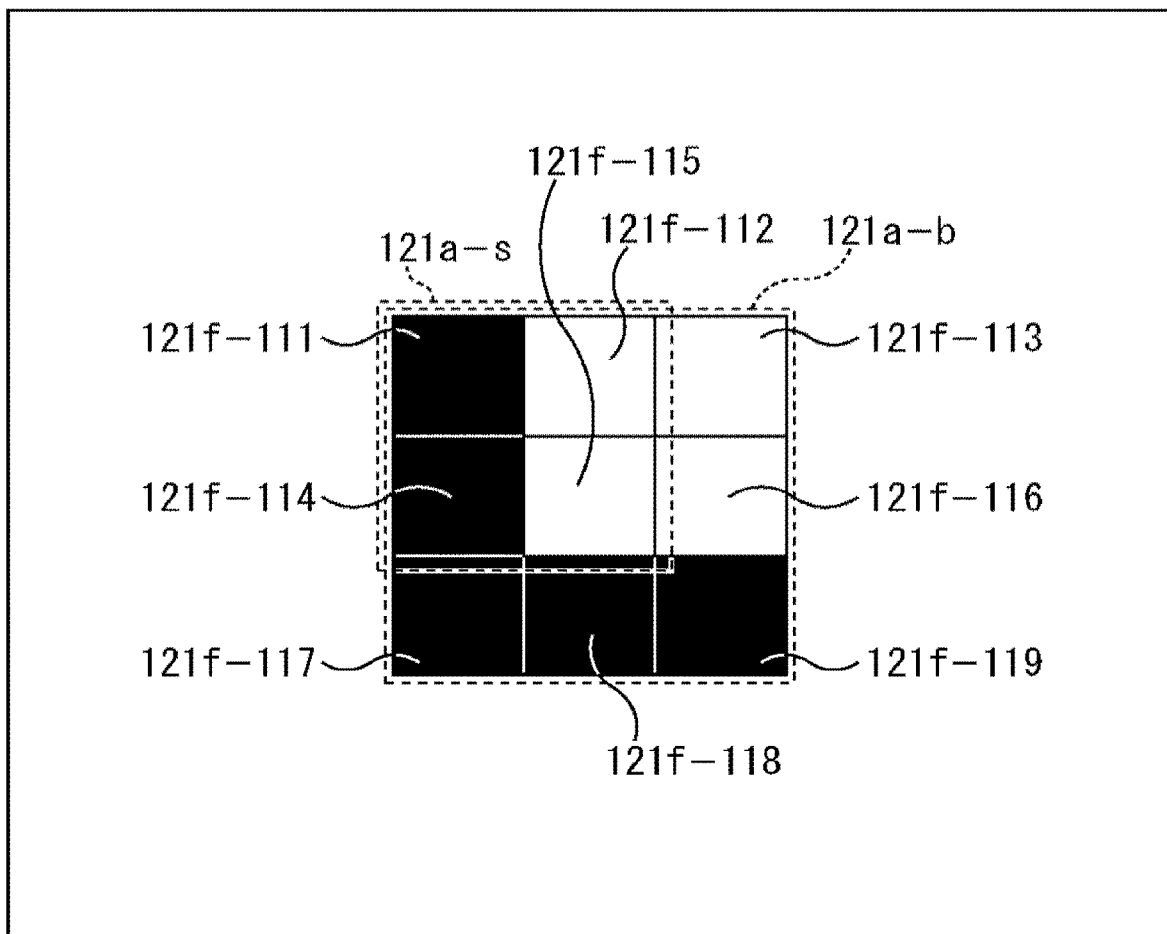
FIG. 26 is a diagram describing a modification example.
Figure 27:
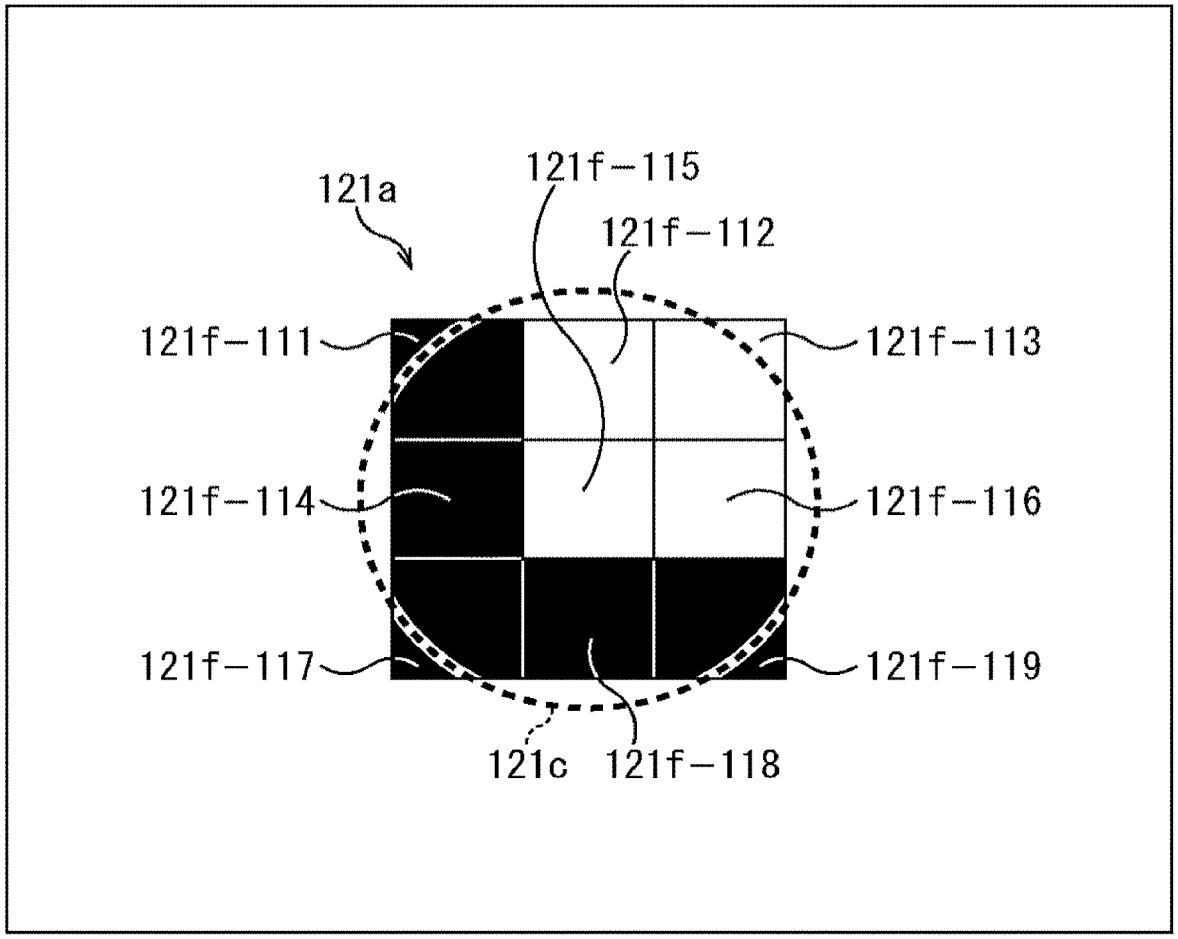
FIG. 27 is a diagram describing a modification example.

In this manner, as a calculation as illustrated in FIG. 24, an element group 2222 is obtained by multiplying an element of interest Xp in the matrix X by each element group 2221 of a corresponding column of the matrix AL as illustrated in FIG. 25. Moreover, by multiplying the element group 2222 and an element in a row corresponding to the element of interest Xp of the matrix $AR^T$, a two-dimensional response 2224 corresponding to the element of interest Xp is obtained. Then, the matrix Y is obtained by integrating two-dimensional responses 2224 corresponding to all the elements of the matrix X.

Accordingly, the element group 2221 corresponding to each row of the matrix AL is given a coefficient set corresponding to the incident angle directivity of the horizontal band type pixel 121*a* set to have the same width for each column of the imaging element 121 illustrated in FIG. 21.

Similarly, the element group 2223 of each row of the matrix $AR^T$ is given a coefficient set corresponding to the incident angle directivity of the vertical band type pixel 121*a* set to have the same height set for each row of the imaging element 121 illustrated in FIG. 21.

As a result, since it is possible to reduce the matrix used when the restored image is restored on the basis of the detection image, the calculation amount is reduced, and thereby it becomes possible to improve processing speed and reduce power consumption related to calculation. Further, since the matrix can be reduced, it becomes possible to reduce capacity of the memory used for calculation, and to reduce device cost.

Note that, in the example of FIG. 21, although an example in which the ranges shielded from light (ranges that can receive light) in pixel units are changed while having predetermined regularity in the horizontal direction and the vertical direction is illustrated, in the technology of the present disclosure, ranges shielded from light (ranges that can receive light) in pixel units that are not set completely at random but set at random to some extent in this manner are also considered as set at random. In other words, in the present disclosure, not only a case where the ranges shielded from light (ranges that can receive light) in pixel units are set completely at random, but also ones that are random to some extent (for example, a case where part of all pixels include a range having regularity, but other ranges are random), or ones that seem to be irregular to some extent (a case where an arrangement according to the rules described with reference to FIG. 21 cannot be confirmed among all pixels) are also considered as random.

Although the light-shielding film has been described above, the description of this example can also be applied to a case where an incident angle directivity is given by selectively using a plurality of photodiodes disposed in a pixel. That is, for example, by appropriately setting a dividing position (size and shape of each partial area), a position, a size, a shape, and the like of each photodiode, or appropriately selecting a photodiode, incident light directivity equivalent to the incident light directivity in a case where part of change in the range shielded from light by the light-shielding film 121*b* of the pixel 121*a* described above is made regular can be achieved. In this manner, randomness in the incident angle directivity of each pixel can be reduced, and a processing load outside the imaging element 121, such as that of the restoration unit 122, can be reduced.

Fourth Modification Example

Variations of shapes of the light-shielding film 121*b* in pixel units are arbitrary, and are not limited to the above-described respective examples. For example, the light-shielding film 121*b* may be set to have a triangular shape and hence a range thereof is made different to thereby have (or set to) a different incident angle directivity, or the light-shielding film 12*b* may be set to have a circular shape and hence a range thereof is made different to thereby have a different incident angle directivity. Further, for example, an obliquely linear light-shielding film in an oblique direction and the like may be used.

Further, a variation (pattern) of the light-shielding film 121*b* may be set in a plurality of pixel units constituting a unit including a predetermined number of pixels. This one unit may include any pixel. For example, the imaging element 121 may include a color filter, and may include pixels that constitute units of a color array of the color filter. Further, a pixel group in which pixels having different exposure times are combined may be used as a unit. Note that it is desirable that randomness of the pattern of the range shielded from light by the light-shielding film 121b in each pixel constituting the unit is high, that is, the pixels constituting the unit have respective different incident angle directivities.

Further, an arrangement pattern of the light-shielding film 121b may be set among the units. For example, the width and position of the light-shielding film may be changed in each unit. Moreover, the pattern of the range shielded from light by the light-shielding film 121b may be set within a unit including a plurality of pixels classified into different categories or among units.

Although the light-shielding film has been described above, the description of this example can also be applied to a case where an incident angle directivity is given by selectively using a plurality of photodiodes disposed in a pixel. That is, for example, by appropriately setting a dividing position (size and shape of each partial area), a position, a size, a shape, and the like of each photodiode, or appropriately selecting a photodiode, incident light directivity equivalent to the incident light directivity in a case where part of change in the range shielded from light by the light-shielding film 121b of the pixel 121a described above is made regular can be achieved. In this manner, randomness in the incident angle directivity of each pixel can be reduced, and a processing load outside the imaging element 121, such as that of the restoration unit 122, can be reduced.

Although the light-shielding film has been described above, the description of this example can also be applied to a case where an incident angle directivity is given by selectively using a plurality of photodiodes disposed in a pixel. That is, by appropriately setting a dividing position (size and shape of each partial area), a position, a size, a shape, and the like of each photodiode, or appropriately selecting a photodiode, for example, incident light directivity equivalent to the incident light directivity by a light-shielding film of any shape such as a triangle, a circle, or an oblique line can be achieved.

Further, for example, setting of the dividing position (size and shape of each partial area), setting of a position, a size, a shape, and the like of each photodiode, selection of a photodiode, and the like may be set in each unit similarly to the case of the light-shielding film 121b described above.

<Control of Photodiode>

In a case where a plurality of photodiodes arranged in a pixel as described above with reference to FIG. 5 is selectively used, the presence and absence and degree of contribution to the output pixel value of each pixel output unit of the plurality of photodiodes 121f may be switchable so that the incident angle directivity of the output pixel value of the pixel output unit can be changed variously.

For example, as illustrated in FIG. 19, it is assumed that nine photodiodes 121f (3 vertical×3 horizontal) of photodiodes 121f-111 to 121f-119 are arranged in the pixel 121a. In this case, this pixel 121a may be used as a pixel 121a-b having the photodiodes 121f-111 to 121f-119, or may be used as a pixel 121a-s having the photodiodes 121f-111, 121f-112, 121f-114, and 121f-115.

For example, in a case where the pixel 121a is used as the pixel 121a-b, the incident angle directivity of the output pixel value is controlled by controlling the presence and absence and degree of contribution of the photodiodes 121f-111 to 121f-119 to the output pixel value of the pixel 121a. On the other hand, in a case where the pixel 121a is used as the pixel 121a-s, the incident angle directivity of the output pixel value is controlled by controlling the presence and absence and degree of contribution of the photodiodes 121f-111, 121f-112, 121f-114, and 121f-115 to the output pixel value of the pixel 121a. In this case, the other photodiodes 121f (photodiodes 121f-113, 121f-116, 121f-117 to 121f-119) are controlled so as not to contribute to the output pixel value.

That is, for example, in a case where the incident angle directivities of the output pixel value differ from each other among the plurality of pixels 121a-b, the presence and absence and degree of contribution of at least one of the photodiodes 121f-111 to 121f-119 to the output pixel value is different. On the other hand, for example, in a case where the incident angle directivity of the output pixel value is different among the plurality of pixels 121a-s, the presence and absence and degree of contribution of at least one of the photodiodes 121f-111, 121f-112, 121f-114, and 121f-115 to the output pixel value is different, and the other photodiodes 121f-113, 121f-116, and 121f-117 to 121f-119 do not contribute to the output pixel value, which is common among these pixels.

Note that whether to use the pixel 121a as the pixel 121a-b or the pixel 121a-s can be set for each pixel. Further, this setting may be performed for each unit (a plurality of pixels).

Further, as described above, one on-chip lens is formed on each pixel (each pixel output unit) of the imaging element 121. That is, in a case where the pixel 121a has a configuration as in the example illustrated in FIG. 19, one on-chip lens 121c is provided for the photodiodes 121f-111 to 121f-119 as illustrated in FIG. 20. Therefore, as described with reference to FIG. 19, both in a case where the pixel 121a is the pixel 121a-b and a case where it is the pixel 121a-s, one pixel (one pixel output unit) and one on-chip lens 121c correspond one to one.

<Operation of Imaging Device>

The imaging element 121 has been described above. In the imaging device 101 of FIG. 4, the imaging element 121 as described above is used. Next, operation of the imaging device 101 will be described.

As described with reference to FIG. 1, the imaging device 101 outputs a detection image obtained by imaging in the imaging element 121 without associating it with a restoration matrix.

Here, the term "associate" means that, for example, when information (data, command, program, or the like) on one hand is processed, information on the other hand can be used (can be linked). That is, pieces of information associated with each other may be organized as one file or the like, or may be assumed as individual pieces of information. For example, information B associated with information A may be transmitted on a transmission path different from that of the information A. Further, for example, the information B associated with the information A may be recorded on a recording medium different from that of the information A (or in another recording area of the same recording medium). Note that the "association" may be of a part of information, not the entire information. For example, an image and information corresponding to the image may be associated with each other in any unit such as a plurality of frames, one frame, or a part of the frame.

In this manner, a detection image in which the object is visually unrecognizable can be transmitted to the image output device 102 on a display side, and thus unauthorized use and tampering of an image can be suppressed more easily.

<Flow of Imaging Process>

Figure 28:
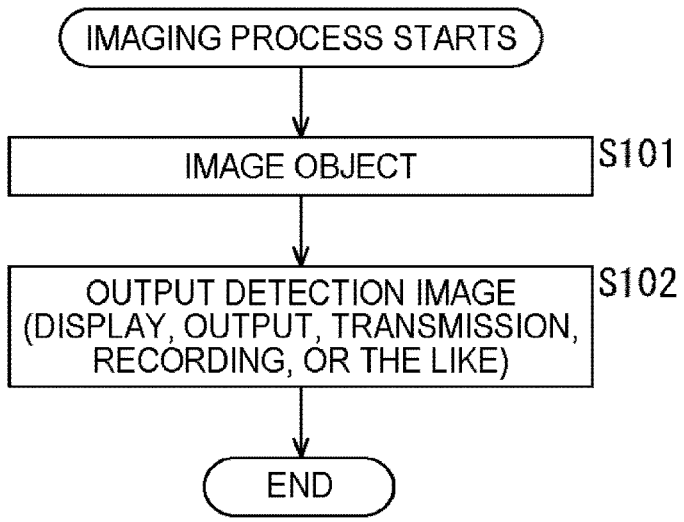
FIG. 28 is a flowchart describing an example of flow of an imaging process.

The imaging device 101 executes an imaging process to perform the above-described process. An example of flow of the imaging process executed by the imaging device 101 in this case will be described with reference to a flowchart of FIG. 28.

When the imaging process is started, the imaging element 121 of the imaging device 101 images an object and obtains a detection image in step S101.

In step S102, the output processing unit 123 outputs the detection image obtained in step S101. This output includes any method. For example, this output may include image display, data output to another device and printing, storage on a storage medium, transmission to a communication partner, recording on the recording medium 116, and the like.

For example, in a case where the output is the "data output", the imaging element 121 supplies data of the detection image or the like to the output unit 112. The output unit 112 outputs the data of the detection image or the like that is not associated with a restoration matrix thereof from the external output terminal to another device. Further, for example, in a case where the output is the "storage", the imaging element 121 supplies the data of the detection image or the like to the storage unit 113. The storage unit 113 stores the data of the detection image or the like that is not associated with a restoration matrix thereof on a storage medium that the storage unit 113 has. Further, for example, in a case where the output is the "transmission", the imaging element 121 supplies the data of the detection image or the like to the communication unit 114. The communication unit 114 communicates with other devices using a predetermined communication method, and transmits the data of the detection image or the like that is not associated with a restoration matrix thereof to a communication partner thereof. Moreover, for example, in a case where the output is the "recording", the imaging element 121 supplies the data of the detection image or the like to the recording-reproduction unit 115. The recording-reproduction unit 115 records the data of the detection image or the like not associated with a restoration matrix thereof on the recording medium 116 attached to itself.

When the process of step S102 ends, the imaging process ends. By performing the imaging process as described above, a detection image in which the object is visually unrecognizable can be transmitted, and thus unauthorized use and tampering of an image can be suppressed more easily.

<Image Output Device>

Figure 29:
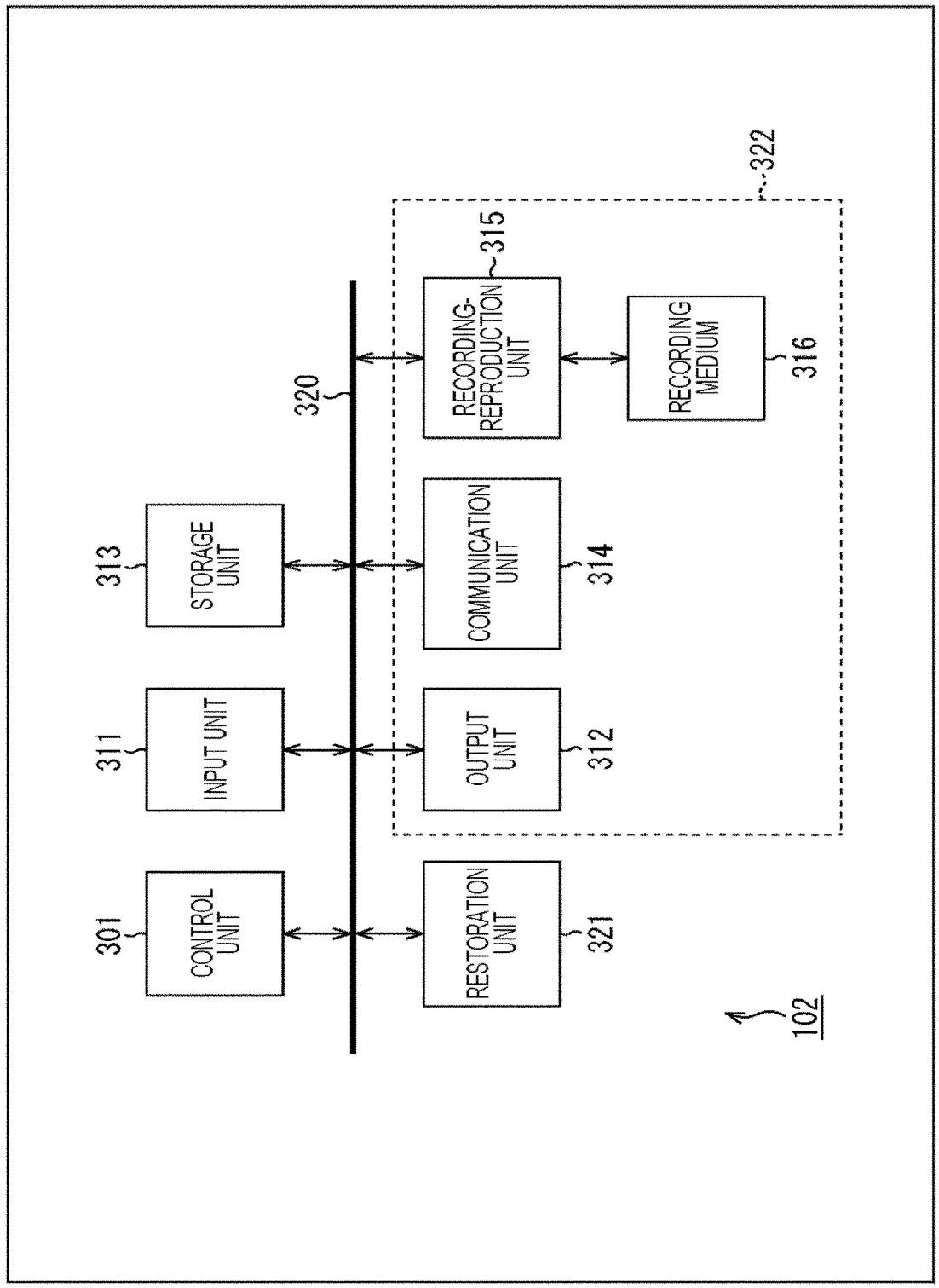
FIG. 29 is a block diagram illustrating a main configuration example of an image output device.

Next, an image output device that restores a restored image from a detection image will be described. FIG. 29 is a diagram illustrating a main configuration example of an image output device which is an embodiment of an image processing device to which the present technology is applied. An image output device 102 illustrated in FIG. 29 is a device that converts a detection image transmitted from another device into a restored image and outputs the restored image.

As illustrated in FIG. 29, the image output device 102 has a control unit 301, an input unit 311, an output unit 312, a storage unit 313, a communication unit 314, a recording-reproduction unit 315, a restoration unit 321, and the like.

Each processing unit and the like are connected via a bus 320, and can exchange information, instruction, and the like with each other.

The control unit 301 is configured to perform processing related to control of each processing unit and the like in the image processing device 102. For example, the control unit 301 has a CPU, a ROM, a RAM, and the like, and performs the above-described processing by executing a program using the CPU and the like.

The input unit 311 is configured to perform processing related to input of information. For example, the input unit 311 has input devices such as an operating button, a dial, a switch, a touch panel, a remote controller, and a sensor, and an external input terminal. For example, the input unit 311 receives an instruction (information corresponding to an input operation) from the outside by a user or the like with these input devices. Further, for example, the input unit 311 obtains arbitrary information (program, command, data, or the like) supplied from an external device via the external input terminal. Further, for example, the input unit 311 supplies the received information (obtained information) to another processing unit or the like via the bus 120.

Note that the sensor included in the input unit 311 may be, for example, any sensor such as an acceleration sensor as long as it is capable of receiving an instruction from the outside by the user or the like. Further, the input devices which the input unit 311 has are arbitrary, and the number thereof is also arbitrary. The input unit 311 may have a plurality of types of input devices. For example, the input unit 311 may have a part of the above-described examples, or may have all of them. Further, the input unit 311 may have an input device other than the examples described above. Moreover, for example, the input unit 311 may obtain control information of itself (input device or the like) supplied via the bus 320 and drive on the basis of the control information.

The output unit 312 is configured to perform processing related to output of information. For example, the output unit 312 has an image display device such as a monitor, an image projection device such as a projector, an audio output device such as a speaker, the external output terminal, and the like. For example, the output unit 312 outputs information supplied from another processing unit or the like via the bus 320 using those output devices and the like. For example, the output unit 312 displays an arbitrary image of a GUI or the like on a monitor for example, projects an arbitrary image of the GUI or the like from a projector for example, outputs audio (for example, audio corresponding to an input operation, a processing result, or the like), or outputs arbitrary information (program, command, data, or the like) to the outside (another device).

Note that the output device and the like which the output unit 312 has are arbitrary, and the number thereof is also arbitrary. The output unit 312 may have a plurality of types of output devices and the like. For example, the output unit 312 may have a part of the above-described examples, or may have all of them. Further, the output unit 312 may have an output device and the like other than the examples described above. Furthermore, for example, the output unit 312 may obtain control information of itself (output device or the like) supplied via the bus 320 and drive on the basis of the control information.

The storage unit 313 is configured to perform processing related to storage of information. For example, the storage unit 313 has an arbitrary storage medium such as a hard disk or a semiconductor memory. For example, the storage unit 313 stores information (program, command, data, or the like) supplied from other processing units and the like via the bus 320 in the storage medium. Further, the storage unit 313 may store arbitrary information (program, command, data, or the like) at a time of shipment. Furthermore, the storage unit 313 reads out information stored in the storage medium at an arbitrary timing or in response to a request from another processing unit or the like, and supplies the read-out information to another processing unit or the like via the bus 320.

Note that the storage medium included in the storage unit 313 is arbitrary, and the number thereof is also arbitrary. The storage unit 313 may have a plurality of types of storage media. For example, the storage unit 313 may have a part of the examples of the storage medium described above, or may have all of them. Further, the storage unit 313 may have a storage medium and the like other than the examples described above. Further, for example, the storage unit 313 may obtain control information of itself supplied via the bus 320 and drive on the basis of the control information.

The communication unit 314 is configured to perform processing related to communication with other devices. For example, the communication unit 314 has a communication device that performs communication for exchanging information such as programs and data with an external device via a predetermined communication medium (for example, an arbitrary network such as the Internet). For example, the communication unit 314 communicates with other devices, and supplies information (program, command, data, or the like) supplied from another processing unit or the like via the bus 320 to another device that is a communication partner thereof. Further, for example, the communication unit 314 communicates with other devices, obtains information supplied from another device that is a communication partner thereof, and supplies the information to another processing unit or the like via the bus 320.

The communication device which the communication unit 314 has may be any device. For example, the communication device may be a network interface. A communication method and a communication standard are arbitrary. For example, the communication unit 314 may be capable of performing wired communication, wireless communication, or both of them. Further, for example, the communication unit 314 may obtain control information of itself (communication device or the like) supplied via the bus 320 and drive on the basis of the control information.

The recording-reproduction unit 315 is configured to perform processing related to recording and reproduction of information using the recording medium 316 attached to itself. For example, the recording-reproduction unit 315 reads out information (program, command, data, or the like) recorded on the recording medium 316 attached to itself, and supplies the information to another processing unit or the like via the bus 320. Further, for example, the recording-reproduction unit 315 obtains information supplied from another processing unit or the like via the bus 320, and writes (records) the information in (on) the recording medium 316 attached to itself. Note that, for example, the recording-reproduction unit 315 may obtain control information of itself supplied via the bus 320 and drive on the basis of the control information.

Note that the recording medium 316 may be any type. For example, the recording medium 316 may be a magnetic disk, an optical disk, a magneto-optical disk, a semiconductor memory, or the like.

The restoration unit 321 is configured to perform processing related to generation (restoration) of a restored image. For example, the restoration unit 321 obtains a detection image from another processing unit via the bus 320. Further, for example, the restoration unit 321 converts the detection image into a restored image using the restoration matrix. Furthermore, for example, the restoration unit 321 supplies data (pixel values and the like) related to the generated restored image to another processing unit or the like via the bus 320.

Note that a part or all of the output unit 312, the communication unit 314, and the recording-reproduction unit 315 may be integrated into an output processing unit 322. The output processing unit 322 is configured to perform processing related to output of the detection image. The output processing unit 322 may be implemented by any physical component. For example, the output processing unit 322 may be implemented as a processor such as a system LSI. Further, the output processing unit 322 may be implemented as, for example, a module using a plurality of processors or the like, a unit using a plurality of modules or the like, or a set obtained by further adding other functions to a unit, or the like (that is, a part of the configuration of the device). Further, the output processing unit 322 may be implemented as a device.

<Operation of Image Output Device>

Next, operation of this image output device 102 will be described. As described with reference to FIG. 1, the image output device 102 obtains a detection image which is transmitted from an imaging side and in which the object is visually unrecognizable, and converts the detection image into a restored image in which the object is visually recognizable by using a valid restoration matrix.

This detection image is obtained by the imaging element 121 described above with reference to FIGS. 1 to 28, and is information having characteristics. That is, the detection image is a detection image obtained by imaging an object by an imaging element including a plurality of pixel output units and formed by a detection signal obtained in the pixel output units, the plurality of pixel output units receiving incident light entering without passing through either an imaging lens or a pinhole, and each outputting one detection signal indicating an output pixel value modulated by an incident angle of the incident light (for example, an imaging element having a configuration such that incident angle directivities indicating directivities with respect to the incident angle of incident light from an object, of output pixel values of at least two pixel output units out of the plurality of pixel output units are different characteristics from each other).

Then, this restoration matrix is also the restoration matrix described above with reference to FIGS. 1 to 28, and has the characteristics described above. That is, this restoration matrix is a matrix including coefficients used when the restored image is restored from the detection image. The restoration unit 321 restores the restored image from a detection image obtained from an external device using such a restoration matrix.

More specifically, for example, the image output device 102 obtains (data of) a detection image transmitted from, for example, an external device such as the imaging device 101 or the server 106 via an arbitrary transmission path such as a network, a cable, or a recording medium 316. For example, the input unit 311, the communication unit 314, the recording-reproduction unit 315, or the like of the image output device 102 obtains a detection image supplied in this manner, and supplies the obtained detection image to the restoration unit 321.

The restoration unit 321 of the image output device 102 converts the detection image supplied from another processing unit in this manner into a restored image using a valid restoration matrix.

The method for obtaining (data of) the restoration matrix is arbitrary. For example, the restoration matrix may be stored in advance in the storage unit 313 or the like (at a time of factory shipment or the like). In this case, the image output device 102 is a dedicated device that outputs a detection image generated by the imaging device 101 having a mask pattern corresponding to the restoration matrix.

Further, for example, the restoration matrix may be input by a valid user or the like. In that case, for example, the input device of the input unit 311 receives an input of the restoration matrix. Further, for example, a valid user or the like may attach the recording medium 316 in which the restoration matrix is recorded to the recording-reproduction unit 315 so that the recording-reproduction unit 315 reads out the restoration matrix from the recording medium 316. Moreover, for example, the restoration matrix may be supplied from another device. In that case, data of the restoration matrix is received via the external input terminal of the input unit 311, the communication unit 314, or the like.

In any case, the restoration matrix is supplied to the restoration unit 321 via the bus 320 at an arbitrary timing or according to a request from the restoration unit 321 or the control unit 301 or the like.

The restoration unit 321 of the image output device 102 supplies a restored image that is restored to the output processing unit 322 or the like, so as to output the image. For example, the restoration unit 321 may supply (data of) the restored image to the output unit 312. In this case, the output unit 312 displays the restored image on a monitor, projects it from a projector, or supplies it to another device such as a peripheral device via the external output terminal. Further, for example, the restoration unit 321 may supply the restored image to the communication unit 314. In this case, the communication unit 314 transmits the restored image to another device. Further, the restoration unit 321 may supply the restored image to the recording-reproduction unit 315. In this case, the recording-reproduction unit 315 records the restored image on the recording medium 316.

Note that the restoration unit 321 may supply the restored image to the storage unit 313. In this case, the storage unit 313 stores the restored image in its own storage medium.

<Flow of Image Output Process>

Figure 30:
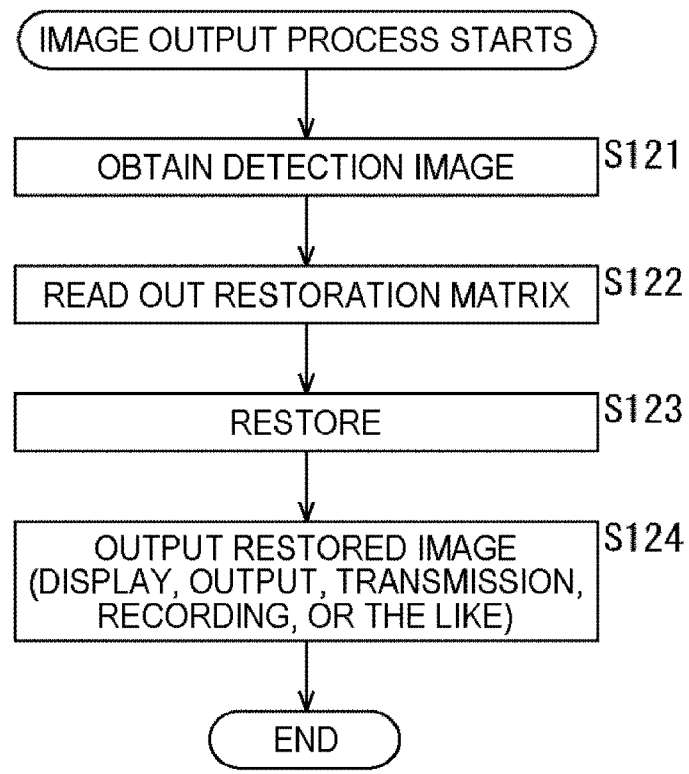
FIG. 30 is a flowchart describing an example of flow of an image output process.

The image output device 102 performs the above-described process by executing an image output process. An example of flow of the image output process executed by the image output device 102 in this case will be described with reference to a flowchart of FIG. 30.

When the image output process is started, for example, the communication unit 314 (which may be the input unit 311, the recording-reproduction unit 315, or the like) of the image output device 102 obtains the transmitted detection image in step S121, and supplies it to the restoration unit 321.

In step S122, the storage unit 313 reads out the restoration matrix stored in itself and supplies it to the restoration unit 321. Note that as described above, the restoration matrix may be supplied to the restoration unit 321 from a processing unit other than the storage unit 313.

In step S123, the restoration unit 321 converts (restores) the detection image obtained in step S121 into a restoration matrix using the restoration matrix obtained in step S122. In a case where the used restoration matrix corresponds to the detection image as a processing target (in a case where the restoration matrix is a valid restoration matrix for the detection image), a restored image in which the object is visually recognizable is obtained by this process. The restoration unit 321 supplies (data of) the obtained restored image to the output processing unit 322 or the like.

In step S124, the output processing unit 322 outputs the restored image. This output includes any method. For example, this output may include image display, data output to another device and printing, storage on a storage medium, transmission to a communication partner, recording on the recording medium 316, and the like.

When the process of step S124 ends, the image output process ends. By performing the image output process as described above, the restored image can be correctly restored from the transmitted detection image. Therefore, unauthorized use and tampering of an image can be suppressed more easily.

2. Second Embodiment

<Effective Pattern>

As described above, since the mask pattern of the imaging element is formed by a physical structure (light-shielding film), it is difficult to change the mask pattern after shipment. That is, in a case where a detection signal is read out from all the pixels of the imaging element to obtain a detection image, the valid restoration matrix for the detection image is fixed. However, the detection image can be changed by controlling which pixel of the imaging element the detection signal is read out from. That is, a valid restoration matrix for the detection image can be changed.

Figure 31:
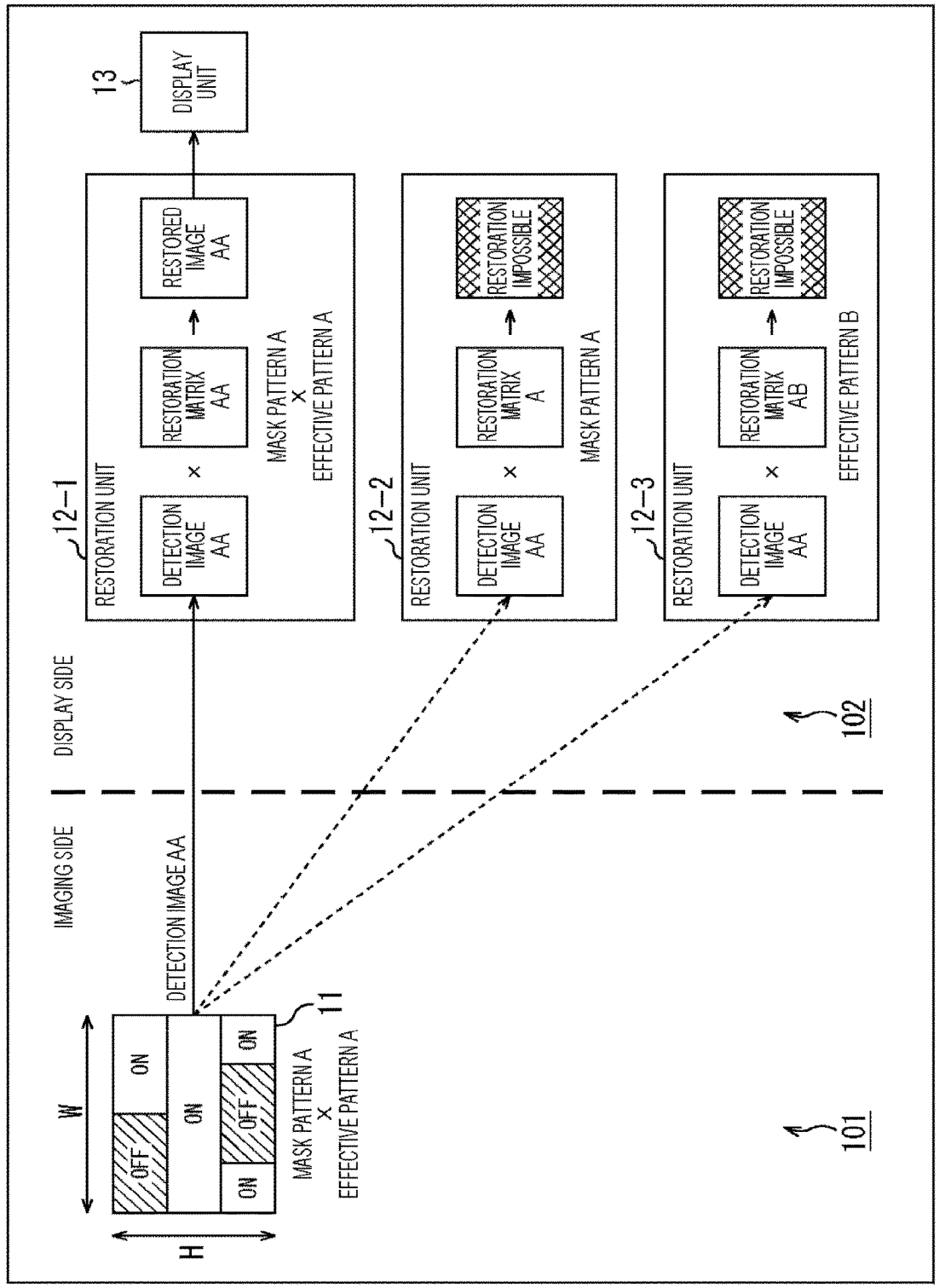
FIG. 31 is a diagram for describing an example of a state of transmission of a detection image.

For example, as illustrated in FIG. 31, the imaging element 11 on which a light-shielding film of a mask pattern A is formed is configured such that the detection signal is read out from part of pixels (the detection signal is not read out from part of pixels). Assuming that a pattern of pixels from which this detection signal is read out is an effective pattern A, a detection image AA read out from the imaging element 11 is affected by a combination of the mask pattern A and the effective pattern A (mask pattern A×effective pattern A). Therefore, this detection image AA cannot be converted into a restored image AA in which the object is visually recognizable unless a restoration matrix AA that is a coefficient matrix (corresponding to mask pattern A×effective pattern A) that reflects the influence of the combination of the mask pattern A and the effective pattern A (mask pattern A×effective pattern A) is used.

For example, a restoration unit 12-1 on a display side has this restoration matrix AA, and can obtain the restored image AA by obtaining a transmitted detection image AA and multiplying the detection image AA by the restoration matrix AA. Therefore, the restored image AA can be displayed on the display unit 13.

On the other hand, the restoration unit 12-2 has the restoration matrix A corresponding to the mask pattern A. Therefore, even if the restoration unit 12-2 obtains the transmitted detection image AA, it cannot be restored correctly with this restoration matrix A, and an image in which the object is visually recognizable cannot be displayed on the display unit 13.

Further, a restoration unit 12-3 has a restoration matrix AB corresponding to a combination (mask pattern A×effective pattern B) of the mask pattern A and the effective pattern B different from the effective pattern A. Therefore, even if the restoration unit 12-3 obtains the transmitted detection image AA, it cannot be restored correctly with this restoration matrix AB, and an image in which the object is visually recognizable cannot be displayed on the display unit 13.

In this manner, by selecting (controlling) the pixel from which the detection signal of the imaging element is read, it is possible to set (control) a detection image to be obtained. That is, a restoration matrix necessary for restoration can be set (controlled). That is, an effect similar to updating the mask pattern after shipment can be obtained. Therefore, the present technology can be applied to a wider variety of systems.

For example, by setting a unique effective pattern for each user, a different restoration matrix can be provided for each user. That is, even in a case where the imaging device 101 is shared by a plurality of users, a right to browse the restored image (access right to the restored image) can be managed for each user by the restoration matrix.

Further, for example, since the mask pattern of the physical structure can be analyzed from the imaging element, there is a risk that the restoration matrix corresponding to the mask pattern of the physical structure leaks from the imaging element even when data of the restoration matrix itself has not leaked. However, since the effective pattern as described above does not depend on the physical structure, leak from the imaging element can be suppressed. Therefore, by selecting (controlling) the pixel from which the detection signal of the imaging element is read out, the possibility of leak of the restoration matrix can be reduced.

<Control of Effective Pattern>

Figure 32:
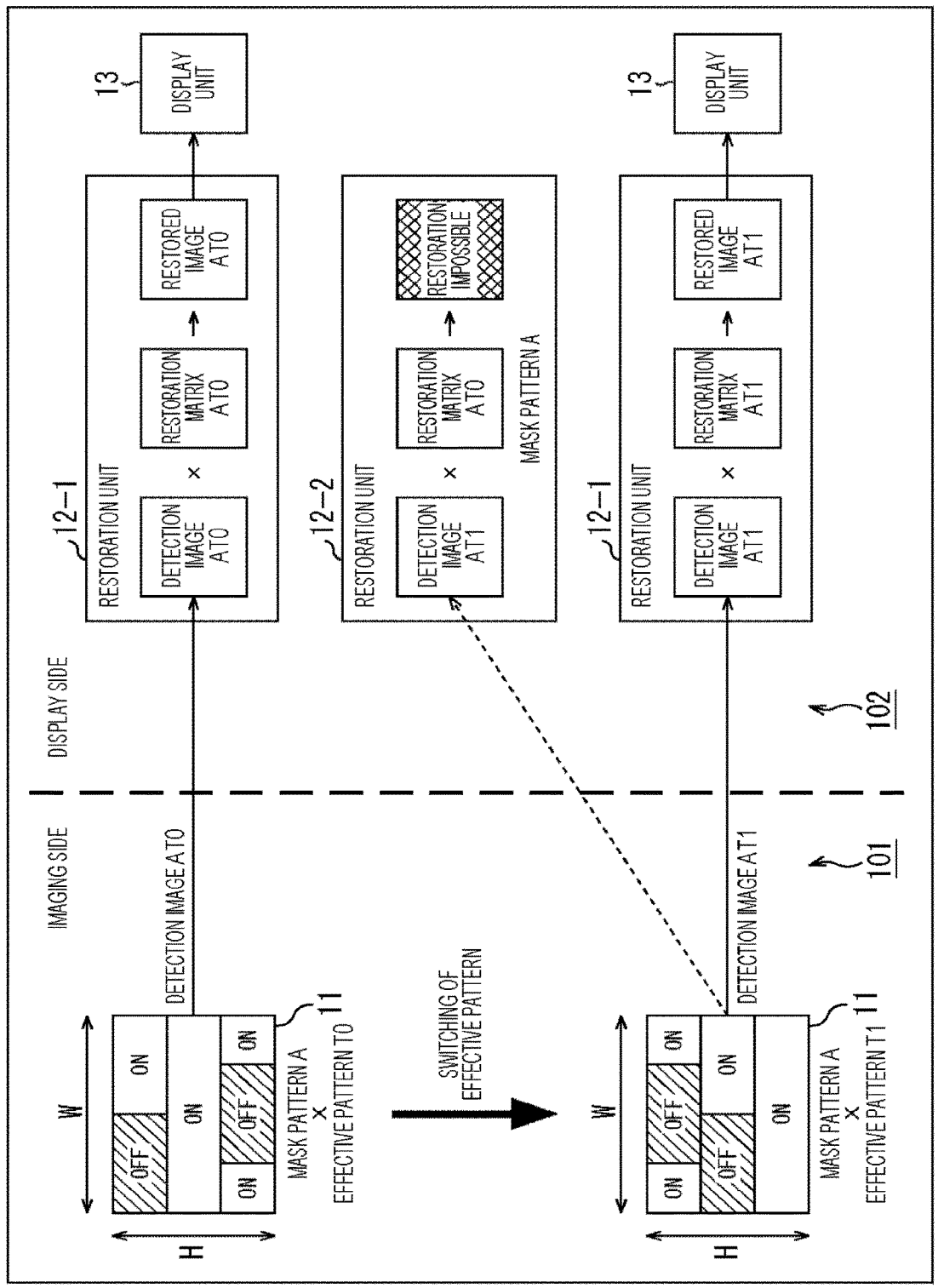
FIG. 32 is a diagram for describing an example of a state of transmission of a detection image.

Furthermore, since the effective pattern can be easily changed even after shipment, the restoration matrix necessary for restoration can be updated by updating the valid pattern, for example, as illustrated in FIG. 32.

For example, it is assumed that the effective pattern of the imaging element 11 of the mask pattern A is an effective pattern T0. A detection image AT0 obtained by the imaging element 11 is affected by a combination of the mask pattern A and the effective pattern T0 (mask pattern A×effective pattern T0). Therefore, this detection image AT0 cannot be converted into a restored image AT0 in which the object is visually recognizable unless a restoration matrix AT0 that is a coefficient matrix (corresponding to mask pattern A×effective pattern T0) that reflects the influence of the combination of the mask pattern A and the effective pattern T0 (mask pattern A×effective pattern T0) is used.

For example, a restoration unit 12-1 on a display side has this restoration matrix AT0, and can obtain the restored image AT0 by obtaining a transmitted detection image AT0 and multiplying the detection image AT0 by the restoration matrix AT0. Therefore, the restored image AT0 can be displayed on the display unit 13.

It is assumed that the effective pattern of the imaging element 11 is changed to an effective pattern T1. A detection image AT1 obtained by the imaging element 11 is affected by a combination of the mask pattern A and the effective pattern T1 (mask pattern A×effective pattern T1). Therefore, this detection image AT1 cannot be converted into a restored image AT1 in which the object is visually recognizable unless a restoration matrix AT1 corresponding to the combination of the mask pattern A and the effective pattern T1 (mask pattern A×effective pattern T1) is used.

Therefore, even if the restoration unit 12-1 having the restoration matrix AT0 obtains the transmitted detection image AT1, it cannot be restored correctly with this restoration matrix AT0, and an image in which the object is visually recognizable cannot be displayed on the display unit 13.

By updating the restoration matrix AT0 to the restoration matrix AT1, the restoration unit 12-1 becomes capable of correctly restoring the detection image AT1.

That is, the restoration matrix necessary for restoration can be updated by switching the effective pattern as described above. Therefore, for example, even if a restoration matrix leaks once, the leaked restoration matrix can be invalidated. Therefore, it is possible to further suppress unauthorized use and tampering of an image.

Further, for example, the present technology can be applied to time limit management of access right to a restored image, or the like. That is, it can be applied to a wider variety of systems.

<Imaging Device>

Figure 33:
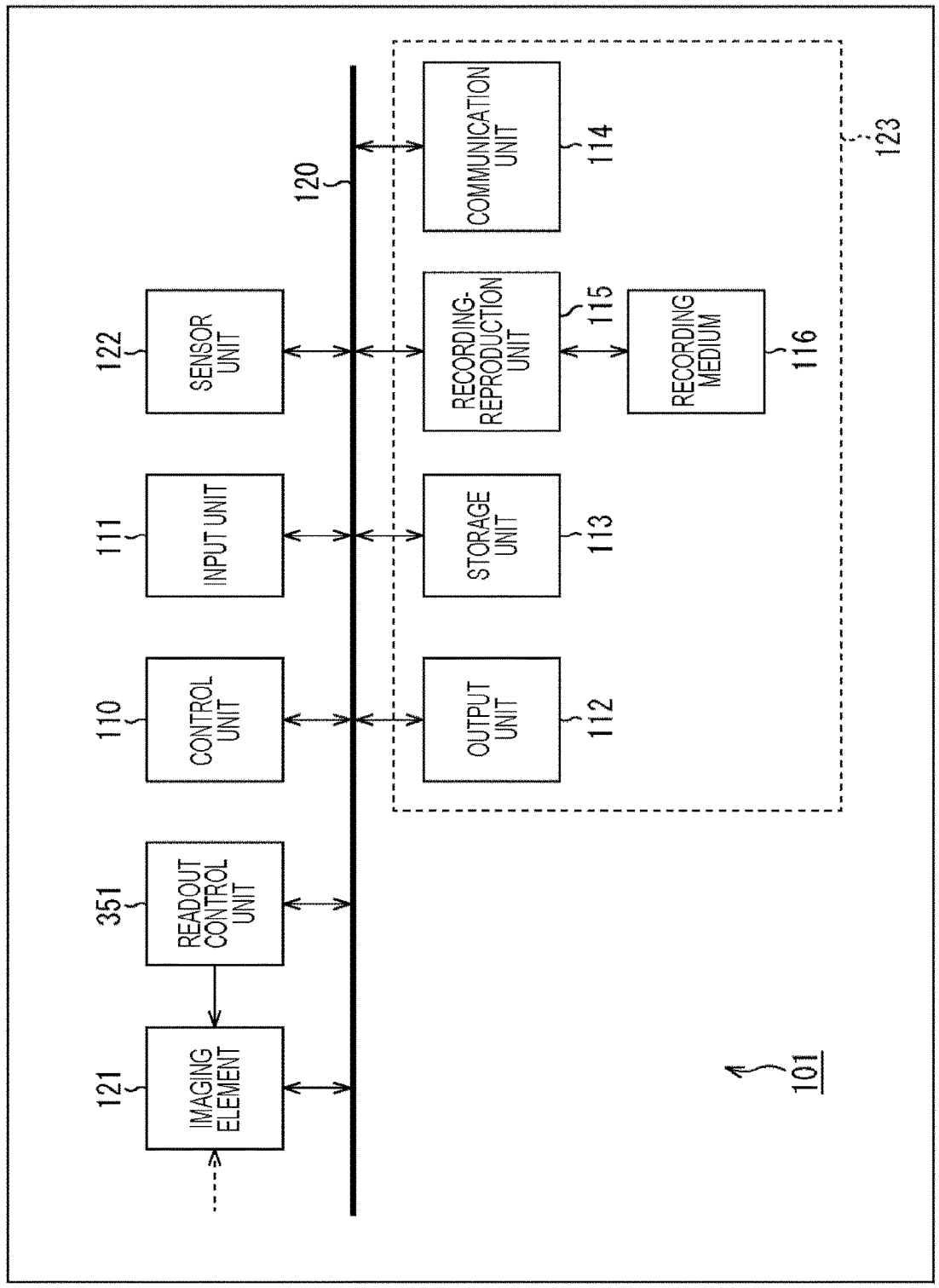
FIG. 33 is a block diagram illustrating a main configuration example of the imaging device.

FIG. 33 is a block diagram illustrating a main configuration example of the imaging device 101 in this case. As illustrated in FIG. 33, the imaging device 101 in this case further has a readout control unit 351 in addition to the configuration in the case of the first embodiment (FIG. 4).

The readout control unit 351 is configured to perform processing related to control of readout of the imaging element 121. For example, the readout control unit 351 controls which pixel of the imaging element 121 a control signal is read out from. That is, the readout control unit 351 sets (controls) the effective pattern of the imaging element 121.

The imaging element 121 reads out a detection signal from a pixel designated as a pixel from which a detection signal is read out by the readout control unit 351, and uses it as a detection image. That is, this detection image is affected by a combination of a mask pattern by the physical structure (such as a light-shielding film) of the imaging element 121 and the effective pattern set by the readout control unit 351. That is, this detection image can be converted into a restored image in which the object is visually recognizable by a restoration matrix corresponding to a combination of a mask pattern by the physical structure (such as a light-shielding film) of the imaging element 121 and an effective pattern set by the readout control unit 351.

Note that the readout control unit 351 can switch the effective pattern on the basis of an arbitrary reason (trigger). For example, the readout control unit 351 may switch the effective pattern regularly or irregularly on the basis of time information. Further, for example, the readout control unit 351 may switch the effective pattern using imaging as a trigger. For example, the readout control unit 351 may switch the effective pattern every time imaging is performed, or may switch the effective pattern every predetermined number of times. Further, for example, the readout control unit 351 may switch the effective pattern on the basis of an external instruction such as a user input.

A setting method of the effective pattern is also arbitrary. For example, the readout control unit 351 may select a desired (optimum) effective pattern from a plurality of candidates prepared in advance. A method of this selection is also arbitrary. For example, each candidate may be selected in a predetermined order. Further, for example, a candidate to be selected may be determined on the basis of some information such as time information, position information, or a password. Further, for example, each candidate may be selected at random. Furthermore, the readout control unit 351 may generate an effective pattern.

<Flow of Imaging Process>

Figure 34:
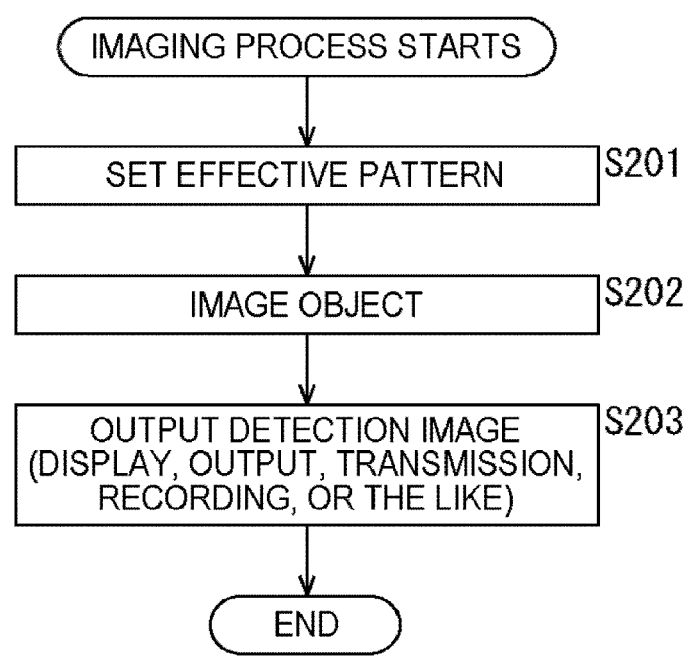
FIG. 34 is a flowchart describing an example of flow of an imaging process.

An example of flow of an imaging process executed by the imaging device 101 in this case will be described with reference to a flowchart of FIG. 34.

When the imaging process is started, the readout control unit 351 of the imaging device 101 sets (controls) the effective pattern of the imaging element 121 by controlling which pixel of the imaging element 121 the control signal is read out from in step S201.

In step S202, the imaging element 121 of the imaging device 101 images an object according to the effective pattern set in step S101 (with pixels designated when a detection signal is read out by the effective pattern), and obtains the detection image.

In step S203, the output processing unit 123 outputs the detection image obtained in step S202. That is, a detection image affected by a combination of the mask pattern of the imaging element 121 and the effective pattern set by the readout control unit 351 is output.

Note that this output includes any method. For example, this output may include image display, data output to another device and printing, storage on a storage medium, transmission to a communication partner, recording on the recording medium 116, and the like.

When the process of step S203 ends, the imaging process ends. By performing the imaging process as described above, a detection image in which the object is visually unrecognizable can be transmitted, and thus unauthorized use and tampering of an image can be suppressed more easily. Further, in a case of this method, since the effective pattern can be used, unauthorized use and tampering of an image can be suppressed more reliably. Further, it can be applied to a wider variety of systems.

<Image Output Device>

Figure 35:
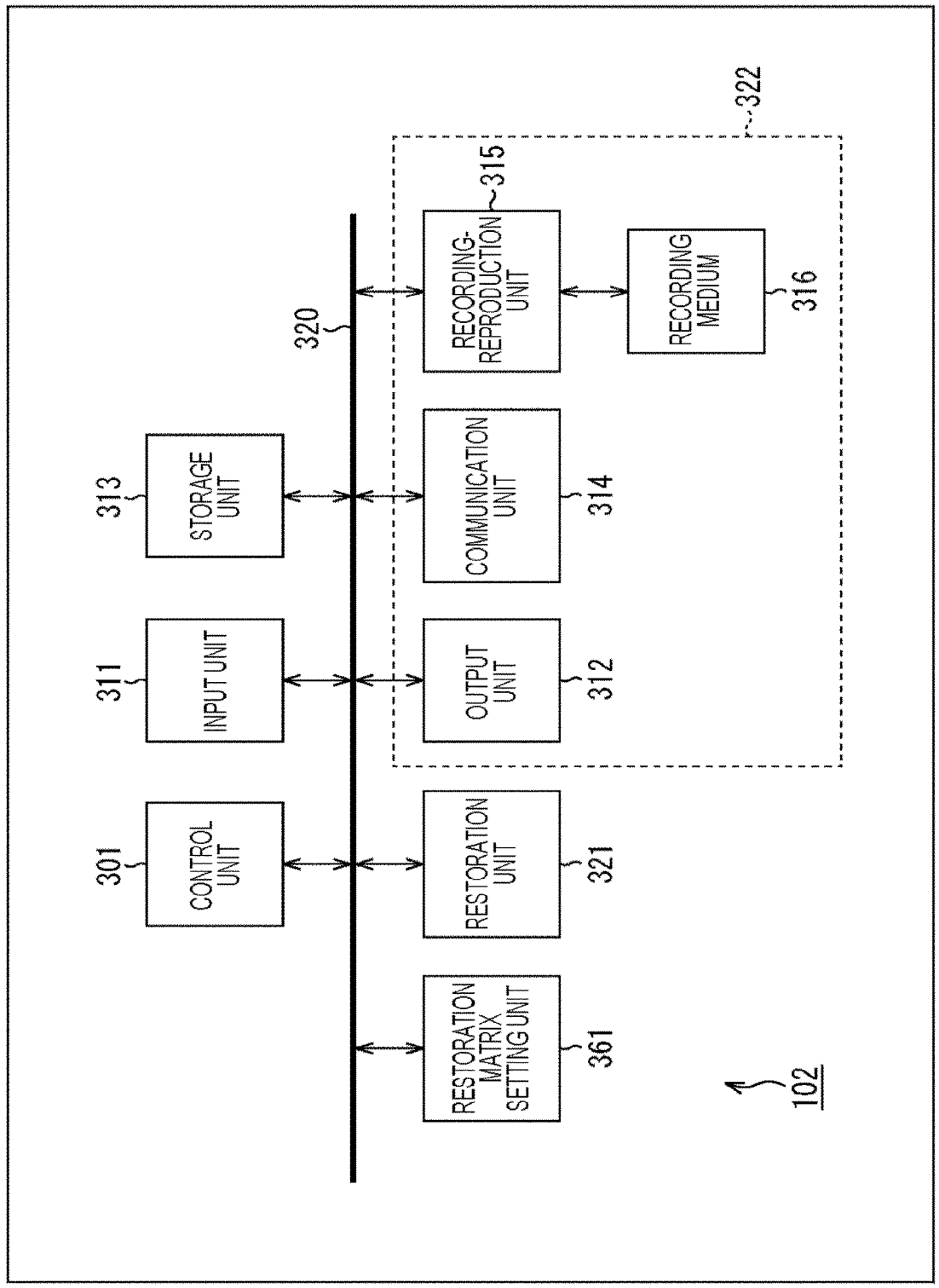
FIG. 35 is a block diagram illustrating a main configuration example of the image output device.

FIG. 35 is a block diagram illustrating a main configuration example of the image output device 102 in this case. As illustrated in FIG. 35, the image output device 102 in this case further includes a restoration matrix setting unit 361 in addition to the configuration in the case of the first embodiment (FIG. 29).

The restoration matrix setting unit 361 performs processing related to setting of a restoration matrix used by the restoration unit 321 for restoration. For example, the restoration matrix setting unit 361 sets the restoration matrix used by the restoration unit 321 for restoration, and supplies the set restoration matrix to the restoration unit 321. The restoration unit 321 restores the restored image using the restoration matrix.

Note that a method for setting the restoration matrix is arbitrary. For example, the restoration matrix setting unit 361 may select a desired (optimum) restoration matrix from a plurality of candidates. In that case, a supply source of the candidates is arbitrary. The candidates may be registered in advance in the image output device 102, or may be obtained from the outside after shipment. In that case, a providing source of the candidates is arbitrary. For example, it may be a user of the image output device 102, an imaging device 101 (a user thereof), a manufacturer of the imaging device 101, or a third party such as a service provider which provides services such as image distribution and license provision. Further, a method of providing candidates is also arbitrary. For example, it may be provided via a network or a cable, or may be provided via a recording medium or the like.

Further, selection criteria are arbitrary. For example, the restoration matrix setting unit 361 may select a candidate designated by a user or the like, or may select a candidate on the basis of arbitrary information such as time information and position information.

Further, the restoration matrix setting unit 361 may generate a restoration matrix.

<Flow of Image Output Process>

Figure 36:
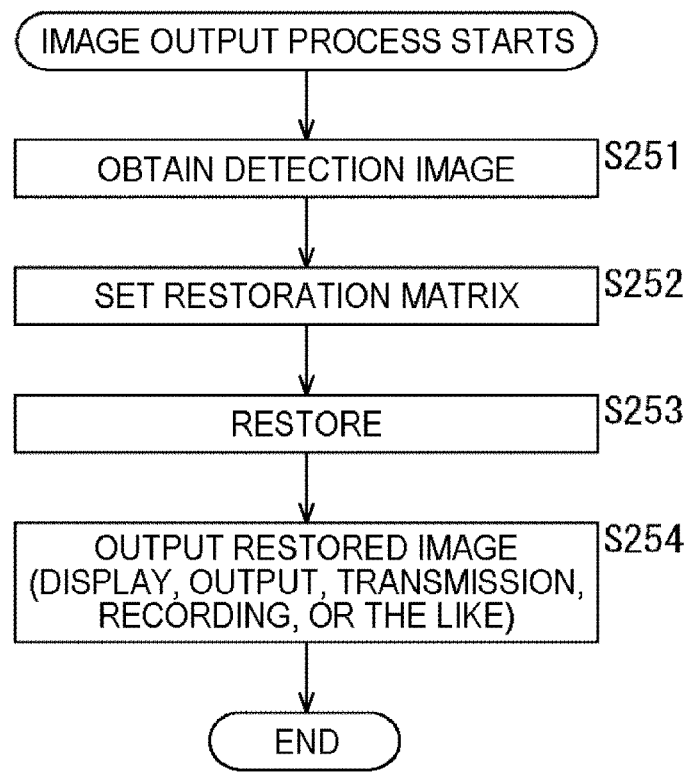
FIG. 36 is a flowchart describing an example of flow of an image output process.

An example of flow of the image output process executed by the image output device 102 in this case will be described with reference to a flowchart of FIG. 36.

When the image output process is started, for example, the communication unit 314 (which may be the input unit 311, the recording-reproduction unit 315, or the like) of the image output device 102 obtains the transmitted detection image in step S251, and supplies it to the restoration unit 321.

In step S252, the restoration matrix setting unit 361 sets a restoration matrix corresponding to the detection image as a processing target by a predetermined method, and supplies the set restoration matrix to the restoration unit 321.

In step S253, the restoration unit 321 converts (restores) the detection image obtained in step S251 into a restored image using the restoration matrix set in step S252. In a case where the used restoration matrix corresponds to the detection image as a processing target (in a case where the restoration matrix is a valid restoration matrix for the detection image), a restored image in which the object is visually recognizable is obtained by this process. The restoration unit 321 supplies (data of) the obtained restored image to the output processing unit 322 or the like.

In step S254, the output processing unit 322 outputs the restored image. This output includes any method. For example, this output may include image display, data output to another device and printing, storage on a storage medium, transmission to a communication partner, recording on the recording medium 316, and the like.

When the process of step S254 ends, the image output process ends. By performing the image output process as described above, the restored image can be correctly restored from the transmitted detection image. Therefore, unauthorized use and tampering of an image can be suppressed more easily. Further, in a case of this method, since the effective pattern can be used, unauthorized use and tampering of an image can be suppressed more reliably. Further, it can be applied to a wider variety of systems.

3. Third Embodiment

<Provision of Restoration Matrix>

Note that the imaging device 101 may provide the image output device 102 on the display side with a correct restoration matrix for the detection image. By providing the restoration matrix by the imaging device 101 that generates the detection image, it is possible to more easily provide the correct restoration matrix to the image output device 102. For example, if a restoration matrix is provided from a third party, there may be a case where it is difficult to guarantee the correspondence between the imaging device 101 (mask pattern of the imaging element 121) and the restoration matrix to be provided. In particular, in a case where an effective pattern is set as in the second embodiment, consistency with the effective pattern must be guaranteed, and more complicated control may become necessary. Since the imaging device 101 can easily grasp the mask pattern and the effective pattern, the restoration matrix corresponding to them can be easily specified. That is, the correct restoration matrix can be provided more easily.

Note that in this case, an authentication process is performed on another party that provides the restoration matrix, and the restoration matrix may be provided only in a case where the authentication is successful, that is, to a device (user) that is determined to be valid. In this manner, leak of the restoration matrix can be suppressed, and unauthorized use and tampering of an image can be suppressed.

Further, the provided restoration matrix may be encrypted. By encrypting the restoration matrix, leak of the restoration matrix can be suppressed, and unauthorized use and tampering of an image can be suppressed.

<Imaging Device>

Figure 37:
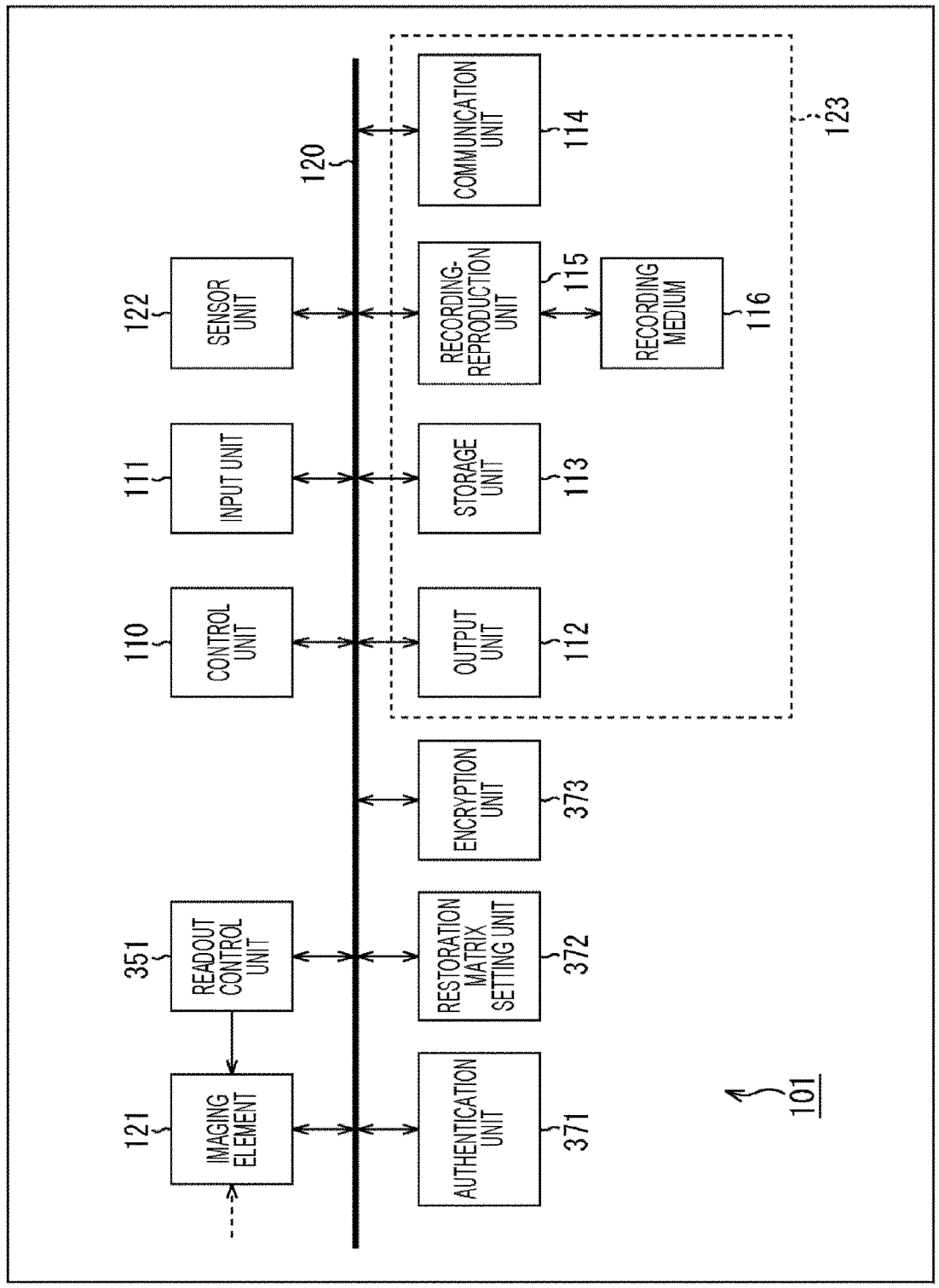
FIG. 37 is a block diagram illustrating a main configuration example of the imaging device.

FIG. 37 is a block diagram illustrating a main configuration example of the imaging device 101 in this case. As illustrated in FIG. 37, the imaging device 101 in this case further includes an authentication unit 371, a restoration matrix setting unit 372, and an encryption unit 373 in addition to the configuration in the second embodiment (FIG. 33).

The authentication unit 371 is configured to perform processing related to the authentication process. For example, the authentication unit 371 authenticates the other party that provides the restoration matrix.

The restoration matrix setting unit 372 is configured to perform processing related to setting of a restoration matrix. For example, the restoration matrix setting unit 372 sets a restoration matrix corresponding to the detection image read out from the imaging element 121 under control of the readout control unit 351. The mask pattern and the effective pattern are known from settings of the imaging element 121 and the readout control unit 351, and thus the restoration matrix setting unit 372 can set the restoration matrix corresponding to a detection image to be output. Note that this setting method of the restoration matrix is arbitrary, but depends on the setting method of the effective pattern. The set restoration matrix is supplied to the encryption unit 373, for example.

The encryption unit 373 is configured to perform processing related to encryption. For example, the encryption unit 373 encrypts the restoration matrix set by the restoration matrix setting unit 372. This encryption method may be any method that is known to the output destination of the restoration matrix. The encrypted restoration matrix is supplied to the output processing unit 123 and output.

<Flow of Restoration Matrix Providing Process>

Figure 38:
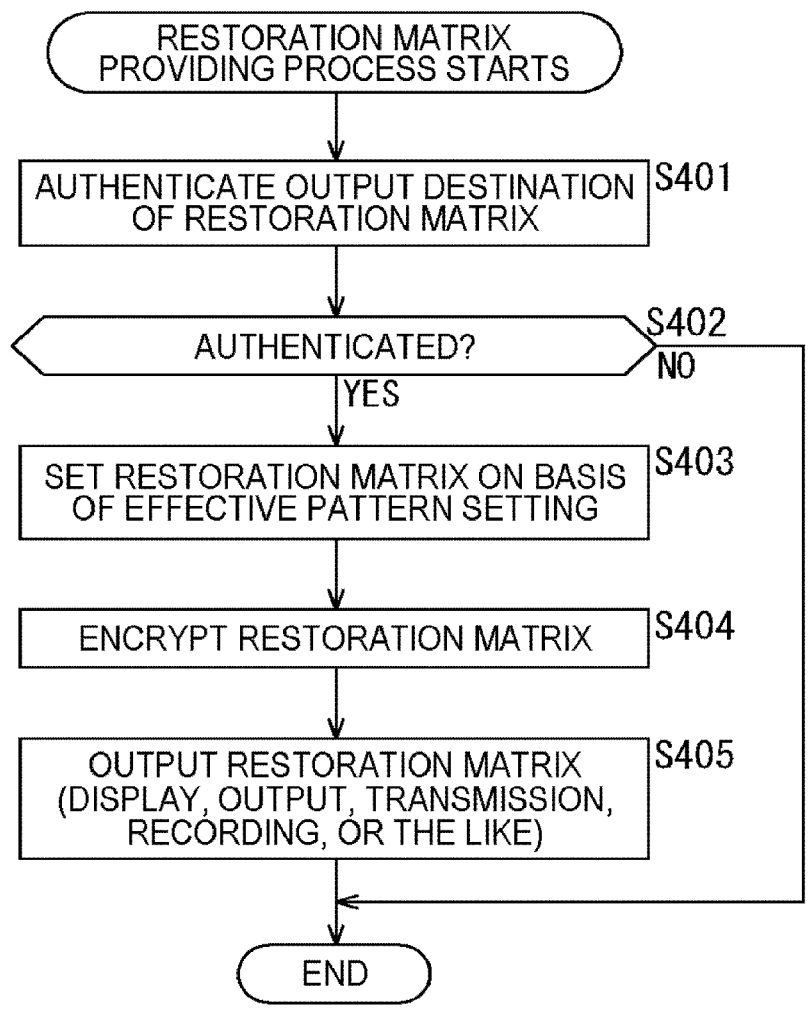
FIG. 38 is a flowchart describing an example of flow of a restoration matrix providing process.

The imaging device 101 provides a restoration matrix by executing a restoration matrix providing process. An example of flow of the restoration matrix providing process executed by the imaging device 101 in this case will be described with reference to a flowchart of FIG. 38.

When the restoration matrix providing process is started, the authentication unit 371 of the imaging device 101 authenticates an output destination of the restoration matrix (for example, the image output device 102) in step S401.

In step S402, the authentication unit 371 determines whether or not authentication for the output destination is successful. In a case where it is determined that the authentication is successful, the process proceeds to step S403.

In step S403, the restoration matrix setting unit 372 sets the restoration matrix on the basis of effective pattern setting or the like of the readout control unit 351.

In step S404, the encryption unit 373 encrypts the restoration matrix set in step S403.

In step S405, the output processing unit 123 outputs the restoration matrix encrypted in step S404 to the output destination for which authentication is successful.

Note that this output includes any method. For example, this output may include data output to another device, transmission to a communication partner, recording on the recording medium 116, and the like.

When the process of step S405 ends, the restoration matrix providing process ends. Further, in a case where it is determined in step S402 that the authentication has failed, the respective processes in steps S403 to S405 are skipped, and the restoration matrix providing process ends.

By performing the restoration matrix providing process as described above, a correct restoration matrix can be provided more easily. Further, by performing the authentication process, leak of the restoration matrix can be suppressed, and unauthorized use and tampering of an image can be suppressed. Moreover, by encrypting the restoration matrix, leak of the restoration matrix can be suppressed, and unauthorized use and tampering of an image can be suppressed.

<Image Output Device>

Figure 39:
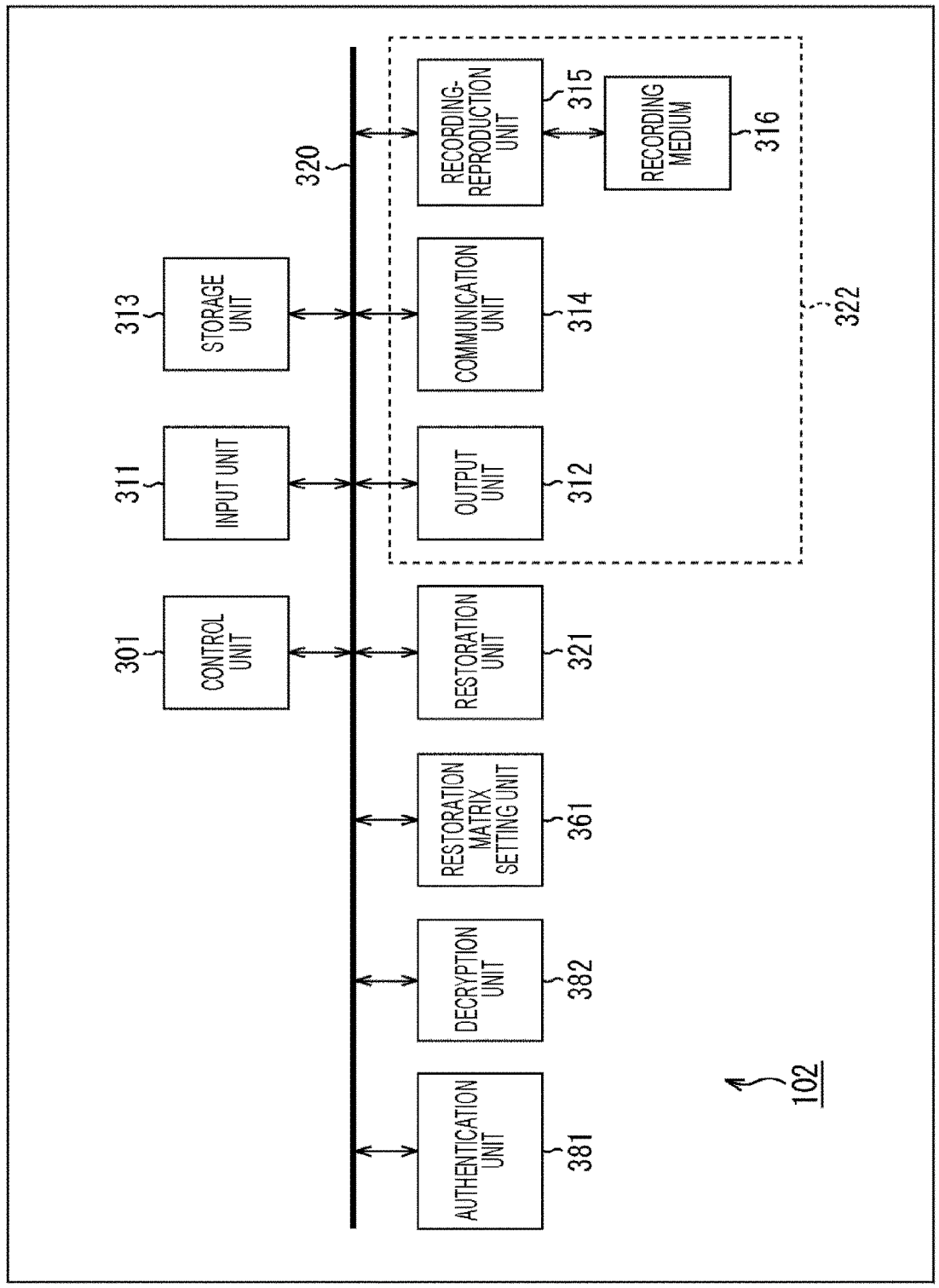
FIG. 39 is a block diagram illustrating a main configuration example of the image output device.

FIG. 39 is a block diagram illustrating a main configuration example of the image output device 102 in this case. As illustrated in FIG. 39, the image output device 102 in this case further includes an authentication unit 381 and a decryption unit 382 in addition to the configuration in the case of the second embodiment (FIG. 29).

The authentication unit 381 is a processing unit corresponding to the authentication unit 371 of the imaging device 101, and is configured to perform processing related to the authentication process. For example, the authentication unit 381 exchanges information with the authentication unit 371 of the imaging device 101 to perform the authentication process, and authenticates the image output device 102 itself.

The decryption unit 382 is a processing unit corresponding to the encryption unit 373 of the imaging device 101, and is configured to perform processing related to decryption. For example, the decryption unit 382 decrypts an encrypted restoration matrix supplied from the imaging device 101 to obtain a plaintext restoration matrix. This decryption method is arbitrary as long as it corresponds to the encryption method of the encryption unit 373. The decryption unit 382 supplies the plaintext decryption matrix obtained by decryption to, for example, the storage unit 313 to store it.

The restoration matrix setting unit 361 reads out the restoration matrix obtained in this manner from the storage unit 313 at a predetermined timing, and sets it as a restoration matrix that the restoration unit 321 uses for restoration.

<Flow of Restoration Matrix Obtaining Process>

Figure 40:
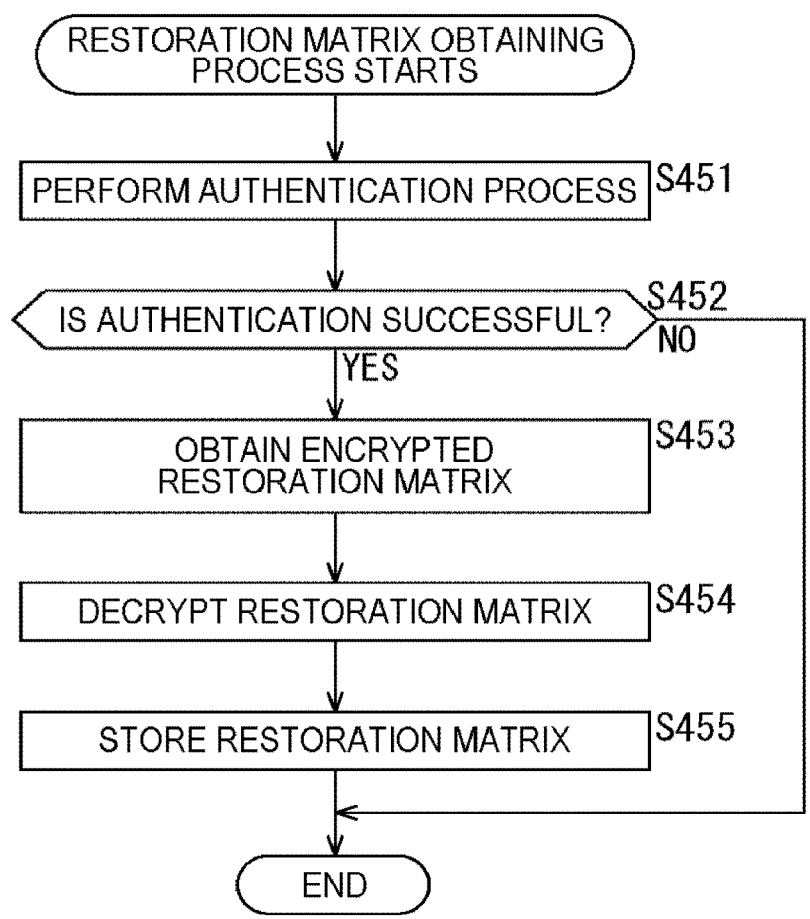
FIG. 40 is a flowchart describing an example of flow of a restoration matrix obtaining process.

The image output device 102 obtains a restoration matrix by executing a restoration matrix obtaining process. An example of flow of the restoration matrix obtaining process executed by the image output device 102 in this case will be described with reference to a flowchart of FIG. 40.

When the restoration matrix obtaining process is started, the authentication unit 381 of the image output device 102 performs an authentication process with the obtaining source of the restoration matrix (for example, the imaging device 101) in step S451.

In step S452, the authentication unit 381 determines whether or not authentication of itself is successful. In a case where it is determined that the authentication is successful, the process proceeds to step S453.

In step S453, for example, the communication unit 314 (which may be the input unit 311, the recording-reproduction unit 315, or the like) of the image output device 102 obtains an encrypted restoration matrix transmitted from an external device through communication.

In step S454, the decryption unit 382 decrypts the encrypted restoration matrix obtained in step S453.

In step S455, the storage unit 313 stores a plaintext restoration matrix obtained by decoding in step S404.

When the process of step S455 ends, the restoration matrix obtaining process ends. Further, in a case where it is determined in step S452 that the authentication has failed, the respective processes in steps S453 to S455 are skipped, and the restoration matrix obtaining process ends.

By performing the restoration matrix obtaining process as described above, the restoration matrix provided from the imaging device 101 can be obtained, and thus a correct restoration matrix can be obtained more easily. Further, by performing the authentication process, leak of the restoration matrix can be suppressed, and unauthorized use and tampering of an image can be suppressed. Furthermore, it is possible to realize transmission of the encrypted restoration matrix by decrypting the encrypted restoration matrix. Therefore, leak of the restoration matrix can be suppressed, and unauthorized use and tampering of an image can be suppressed.

4. Fourth Embodiment

<Association of Restoration Matrix>

Note that the imaging device 101 may associate a detection image with a restoration matrix corresponding to the detection image and provide them to the image output device 102 on the display side. By providing the detection image and the restoration matrix in association with each other, the image output device 102 can more easily grasp the restoration matrix corresponding to the detection image. Therefore, convenience can be improved.

On the other hand, by providing the detection image and the restoration matrix without associating them as in the third embodiment, leak of correspondence between the restoration matrix and the detection image can be suppressed, and unauthorized use and tampering of an image can be suppressed.

<Imaging Device>

Figure 41:
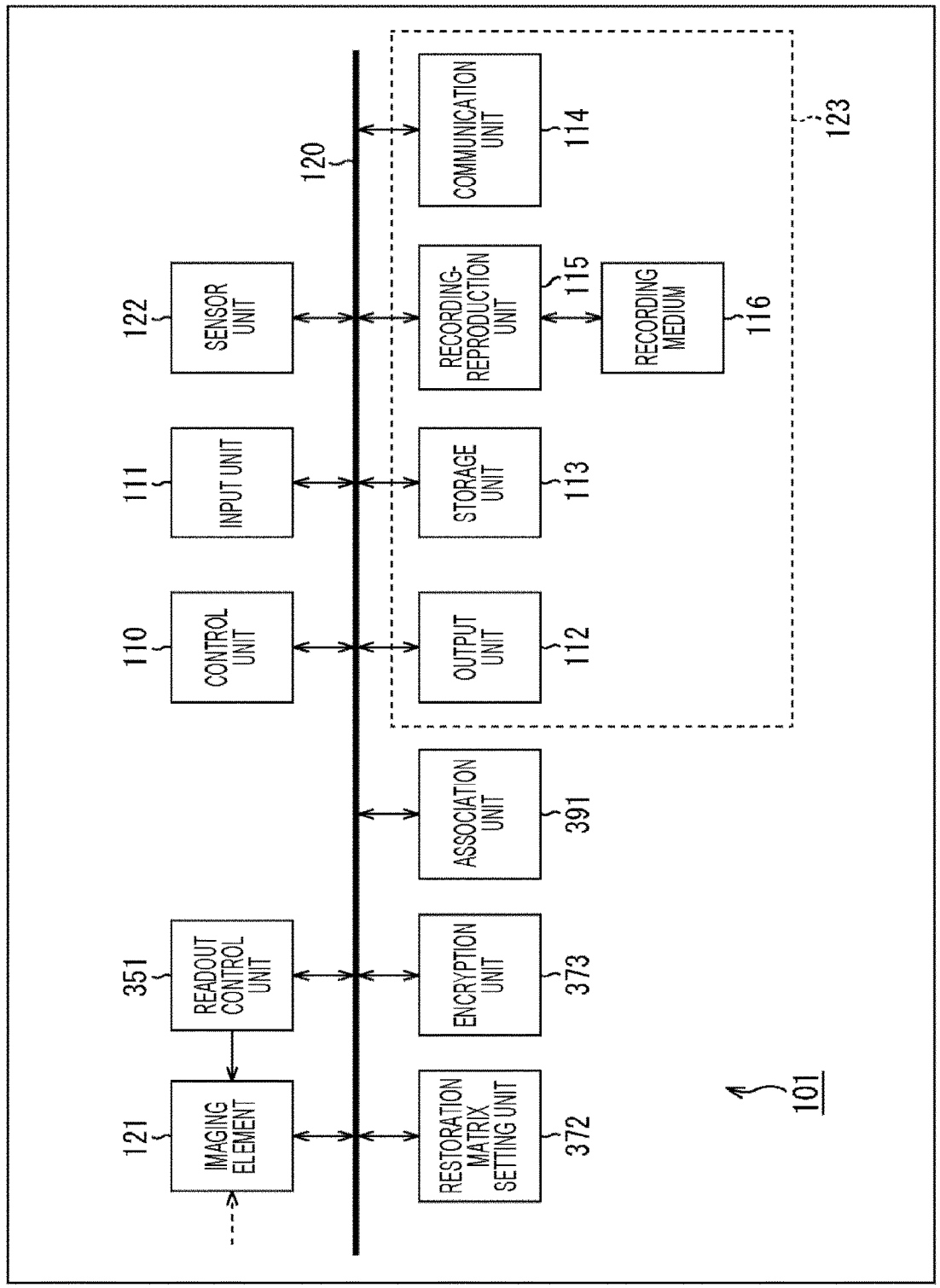
FIG. 41 is a block diagram illustrating a main configuration example of the imaging device.

FIG. 41 is a block diagram illustrating a main configuration example of the imaging device 101 in this case. As illustrated in FIG. 41, the imaging device 101 in this case further includes an association unit 391 in addition to the configuration in the case of the third embodiment (FIG. 37). Note that although the authentication unit 371 is omitted here, the imaging device 101 may further include the authentication unit 371.

The association unit 391 is configured to perform processing related to association of information. For example, the association unit 391 associates a detection image read out from the imaging element 121 with a restoration matrix that is set by the restoration matrix setting unit 372 and corresponds to the detection image, and that is encrypted by the encryption unit 373. The association unit 391 supplies the associated detection image and restoration matrix to the output processing unit 123, so as to output them.

<Flow of Imaging Process>

Figure 42:
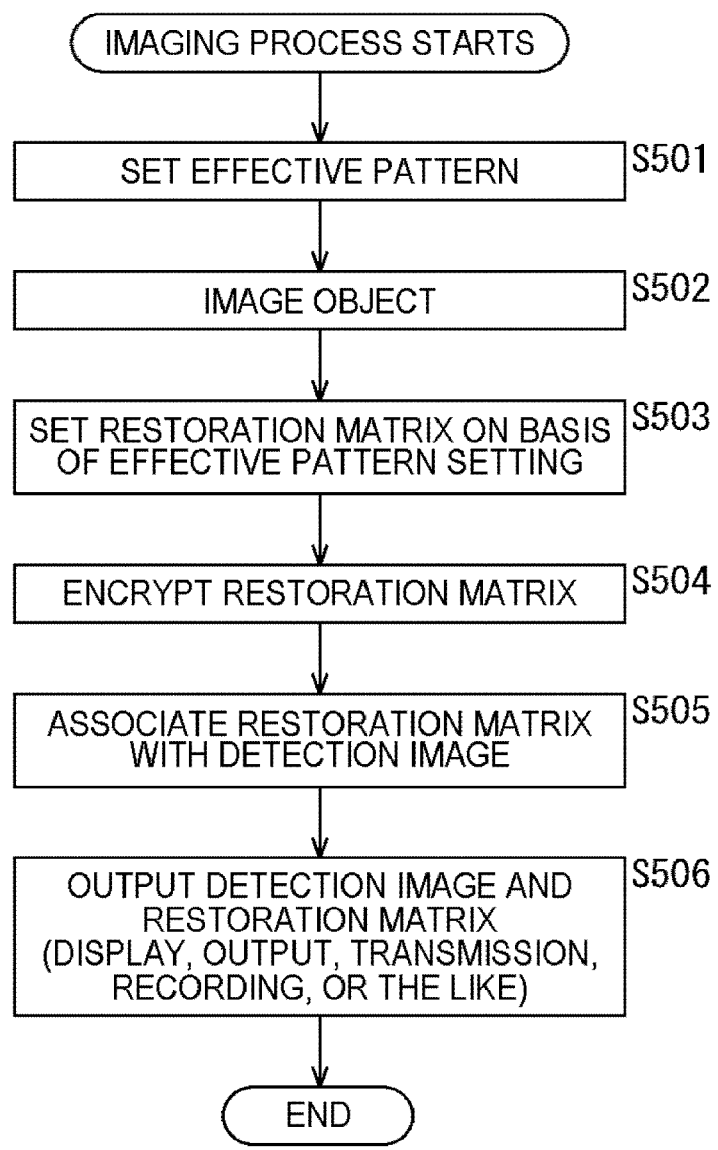
FIG. 42 is a flowchart describing an example of flow of an imaging process.

An example of flow of an imaging process executed by the imaging device 101 in this case will be described with reference to a flowchart of FIG. 42.

When the imaging process is started, the readout control unit 351 of the imaging device 101 sets (controls) the effective pattern of the imaging element 121 by controlling which pixel of the imaging element 121 the control signal is read out from in step S501.

In step S502, the imaging element 121 of the imaging device 101 images an object according to the effective pattern set in step S501 (with pixels designated when a detection signal is read out by the effective pattern), and obtains a detection image.

In step S503, the restoration matrix setting unit 372 sets a restoration matrix corresponding to the detection image obtained in step S502 on the basis of the effective pattern or the like set in step S501.

In step S504, the encryption unit 373 encrypts the restoration matrix set in step S503.

In step S505, the association unit 391 associates the encrypted restoration matrix obtained in step S504 with the detection image obtained in step S502.

In step S506, the output processing unit 123 outputs the detection image and the encrypted restoration matrix associated with each other in step S505.

When the process of step S506 ends, the imaging process ends. By executing the imaging process as described above, the imaging device 101 can be improved in convenience.

<Image Output Device>

Figure 43:
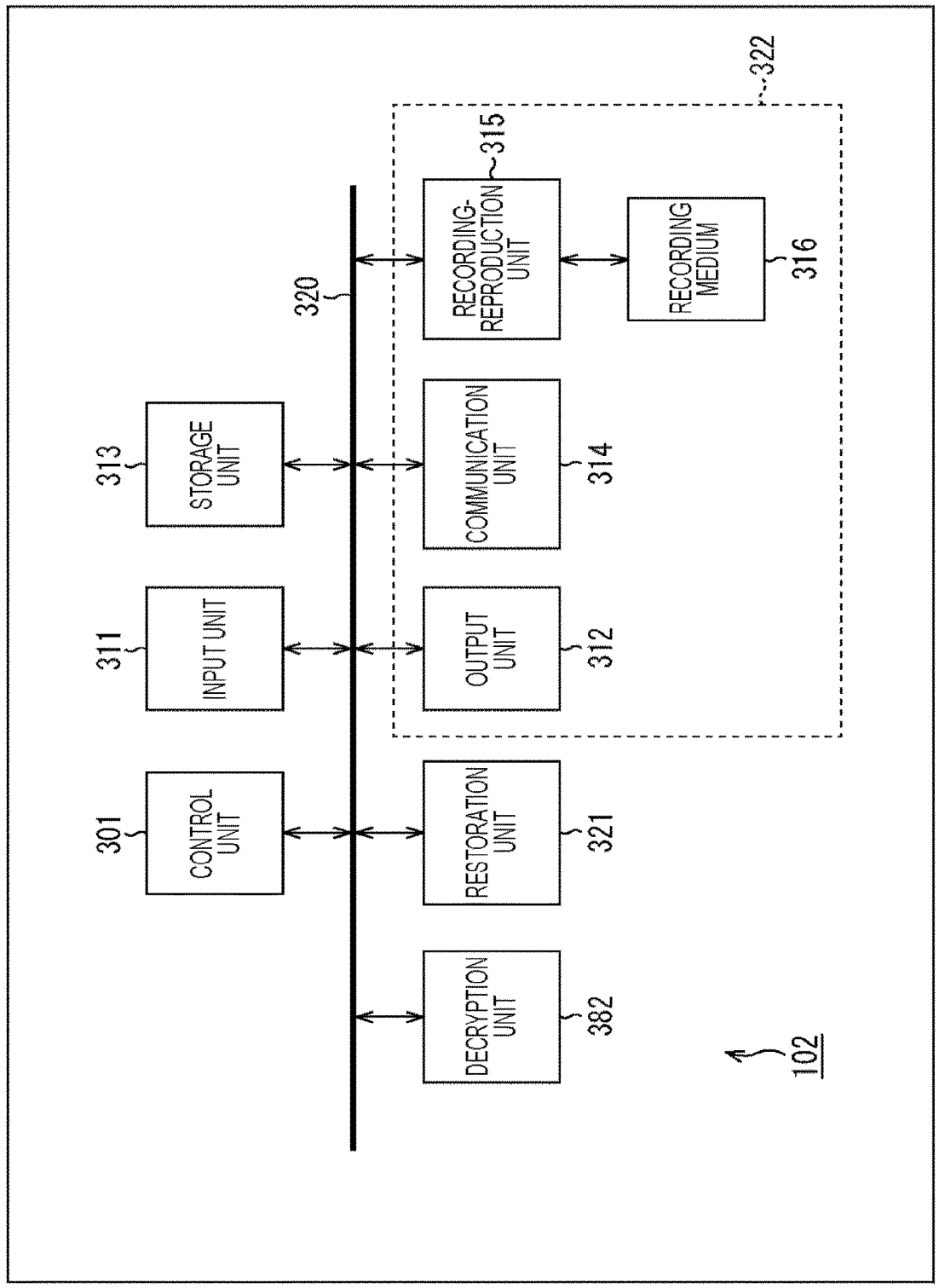
FIG. 43 is a block diagram illustrating a main configuration example of the image output device.

FIG. 43 is a block diagram illustrating a main configuration example of the image output device 102 in this case. As illustrated in FIG. 43, in the image output device 102 in this case, the authentication unit 381 and the restoration matrix setting unit 361 are omitted from the configuration in the case of the third embodiment (FIG. 39). Note that the image output device 102 may further include the authentication unit 371.

<Flow of Image Output Process>

Figure 44:
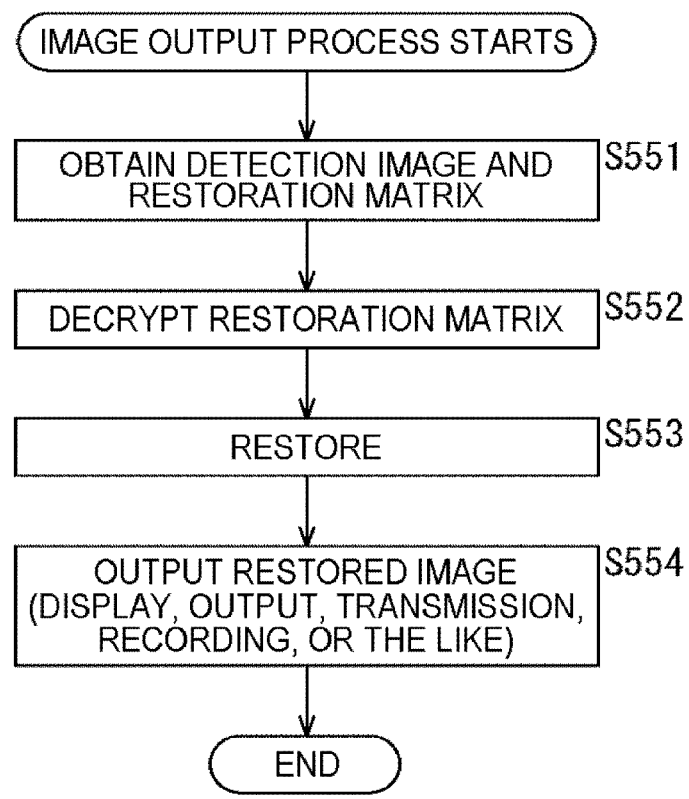
FIG. 44 is a flowchart describing an example of flow of an image output process.

An example of flow of the image output process executed by the image output device 102 in this case will be described with reference to a flowchart of FIG. 44.

When the image output process is started, for example, the communication unit 314 (which may be the input unit 311, the recording-reproduction unit 315, or the like) of the image output device 102 obtains a transmitted detection image and restoration matrix in step S551 (detection image and restoration matrix associated with each other). This restoration matrix is encrypted.

In step S552, the decryption unit 382 decrypts the encrypted restoration matrix.

In step S553, the restoration unit 321 restores a restored image using the restoration matrix associated with the detection image as a processing target. The restoration unit 321 supplies (data of) the obtained restored image to the output processing unit 322 or the like.

In step S554, the output processing unit 322 outputs the restored image. This output includes any method. For example, this output may include image display, data output to another device and printing, storage on a storage medium, transmission to a communication partner, recording on the recording medium 316, and the like.

When the process of step S554 ends, the image output process ends. By performing the image output process as described above, the restoration unit 321 can more easily identify a restoration matrix corresponding to a detection image according to association. That is, the restoration unit 321 can more easily convert a detection image into a restored image using a restoration matrix corresponding to the detection image. That is, convenience can be improved.

5. Fifth Embodiment

<Transmission Via Server>

Note that, as described above, a detection image and a restoration matrix may be transmitted via a server 106.

Figure 45:
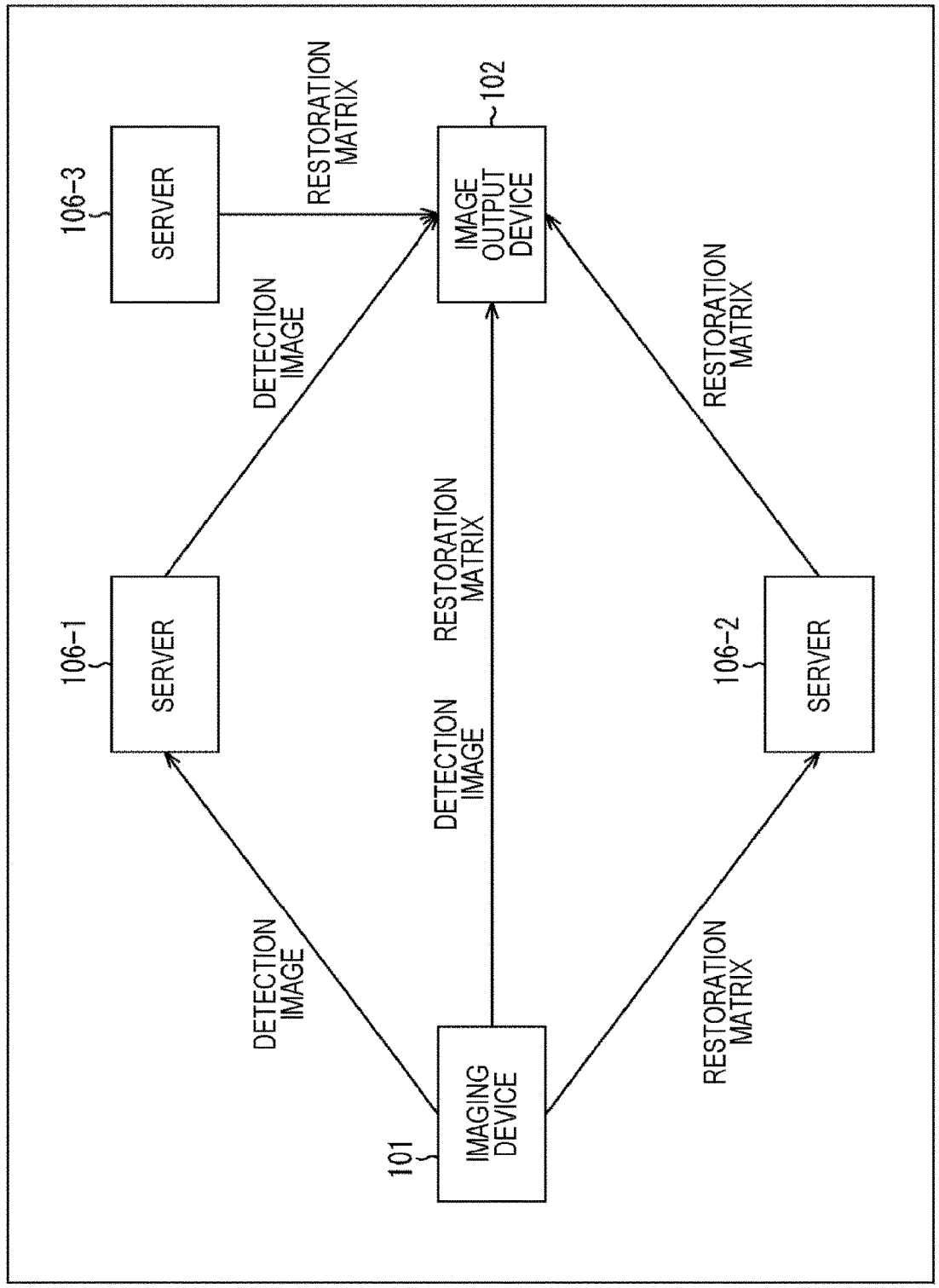
FIG. 45 is a diagram for describing an example of a state of transmission of a detection image and a restoration matrix via a server.

For example, as illustrated in FIG. 45, in a case where a detection image is transmitted from the imaging device 101 to the image output device 102, the detection image may be transmitted via a server 106-1. Further, at that time, the restoration matrix may be transmitted via a server 106-2 or may be transmitted without passing through the server.

Further, in a case where a restoration matrix is transmitted from the imaging device 101 to the image output device 102, the restoration matrix may be transmitted via the server 106-2. Further, at that time, the detection image may be transmitted via the server 106-1, or may be transmitted without passing through the server.

Note that the restoration matrix may be supplied from a server 106-3 instead of from the imaging device 101 to the image output device 102.

Note that in FIG. 45, the server 106-1 to the server 106-3 are described separately, but a part or all of these servers may be implemented as one server 106.

<Server>

Figure 46:
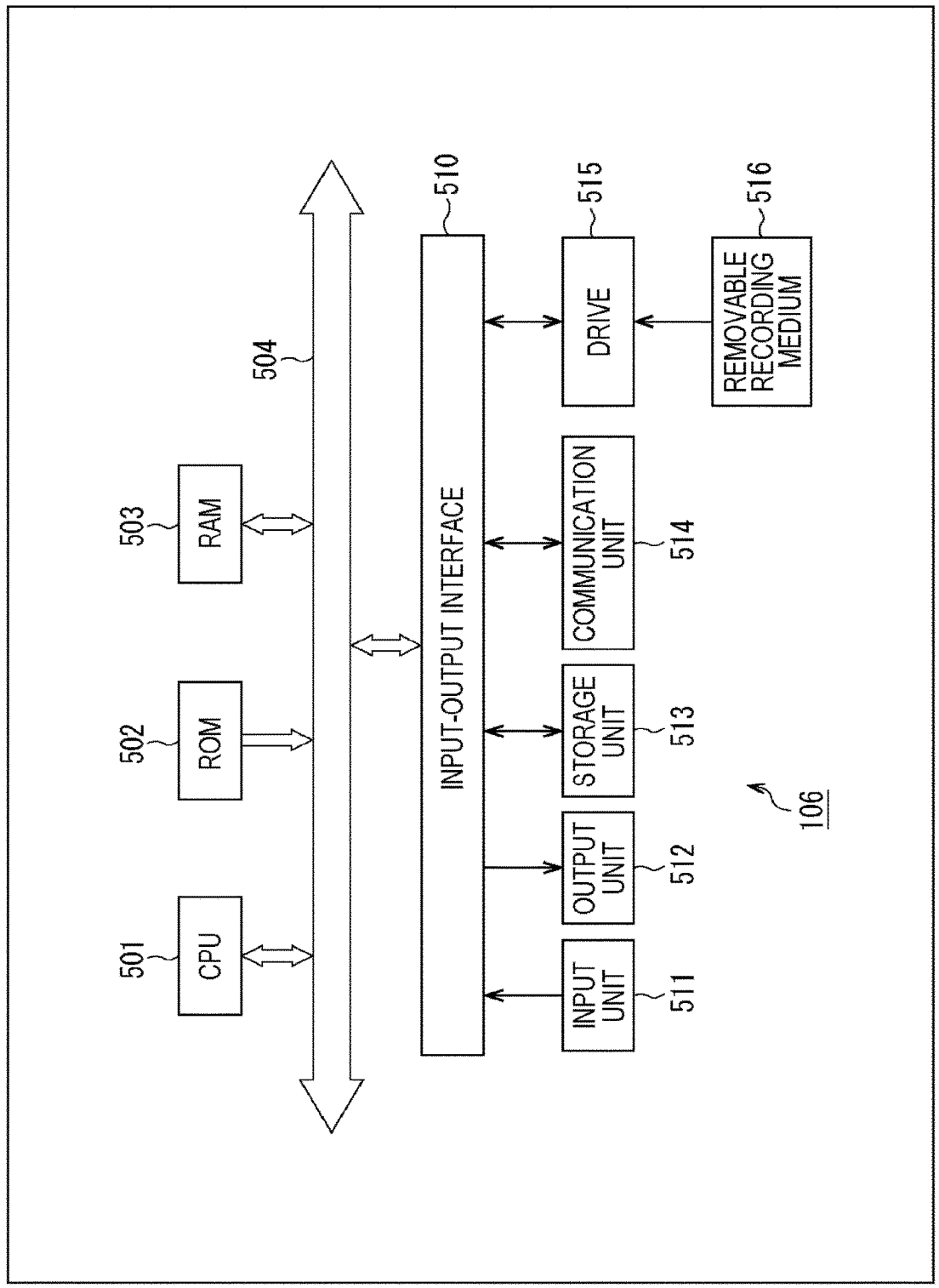
FIG. 46 is a block diagram illustrating a main configuration example of the server.

FIG. 46 is a block diagram illustrating a main configuration example of the server 106. As illustrated in FIG. 3, the server 106 includes a CPU 501, a ROM 502, a RAM 503, a bus 504, an input-output interface 510, an input unit 511, an output unit 512, a storage unit 513, a communication unit 514, and a drive 515.

The CPU 501, the ROM 502, and the RAM 503 are connected to each other via a bus 504. The input-output interface 510 is also connected to the bus 504. The input unit 511 to the drive 515 are connected to the input-output interface 510.

The input unit 511 includes arbitrary input devices such as a keyboard, a mouse, a touch panel, an image sensor, a microphone, a switch, and an input terminal, for example. The output unit 512 includes an arbitrary output device such as a display, a speaker, and an output terminal, for example. The storage unit 513 includes, for example, an arbitrary storage medium such as a hard disk, a RAM disk, and a non-volatile memory such as a solid state drive (SSD) or a Universal Serial Bus (USB) (registered trademark) memory. The communication unit 514 has, for example, a communication interface of any communication standard such as Ethernet (registered trademark), Bluetooth (registered trademark), USB, High-Definition Multimedia Interface (HDMI) (registered trademark), IrDA that is wired or wireless, or both. The drive 515 accesses (drives) a removable recording medium 516 having an arbitrary storage medium such as a magnetic disk, an optical disk, a magneto-optical disk, or a semiconductor memory.

For example, the CPU 501 loads a program stored in the ROM 502 or the storage unit 513 into the RAM 503 and executes the program. The RAM 503 also appropriately stores data necessary for the CPU 501 to execute various processes, for example.

<Flow of Detection Image Transmission Process>

Next, processing related to transmission between the imaging device 101 or the image output device 102 and the server 106 will be described. An example of flow of a detection image transmission process between the imaging device 101 and the server 106 will be described with reference to a flowchart of FIG. 47.

When the detection image transmission process is started, the imaging element 121 of the imaging device 101 images an object in step S601. In step S602, the communication unit 114 supplies a detection image obtained by the process of step S601 to the server 106.

In step S611, the communication unit 514 of the server 106 obtains the supplied detection image. In step S612, the storage unit 513 stores the detection image obtained in step S611.

By executing each process in this manner, the imaging device 101 can upload the detection image to the server 106.

<Flow of Detection Image Transmission Process>

Next, an example of flow of a detection image transmission process between the server 106 and the image output device 102 will be described with reference to a flowchart of FIG. 48.

When the detection image transmission process is started, the communication unit 314 of the image output device 102 requests the server 106 for a detection image in step S631. In step S621, the communication unit 514 of the server 106 obtains the request. In step S622, the storage unit 513 of the server 106 reads out the requested detection image. In step S623, the communication unit 514 supplies the detection image read out in step S622 to the image output device 102 that is the request source.

In step S632, the communication unit 314 of the image output device 102 obtains the detection image. In step S633, the restoration unit 321 restores the obtained detection image using the restoration matrix corresponding to the detection image.

In step S634, the output processing unit 322 outputs an obtained restored image.

By executing each process in this manner, the image output device 102 can download the detection image from the server 106.

Figure 47:
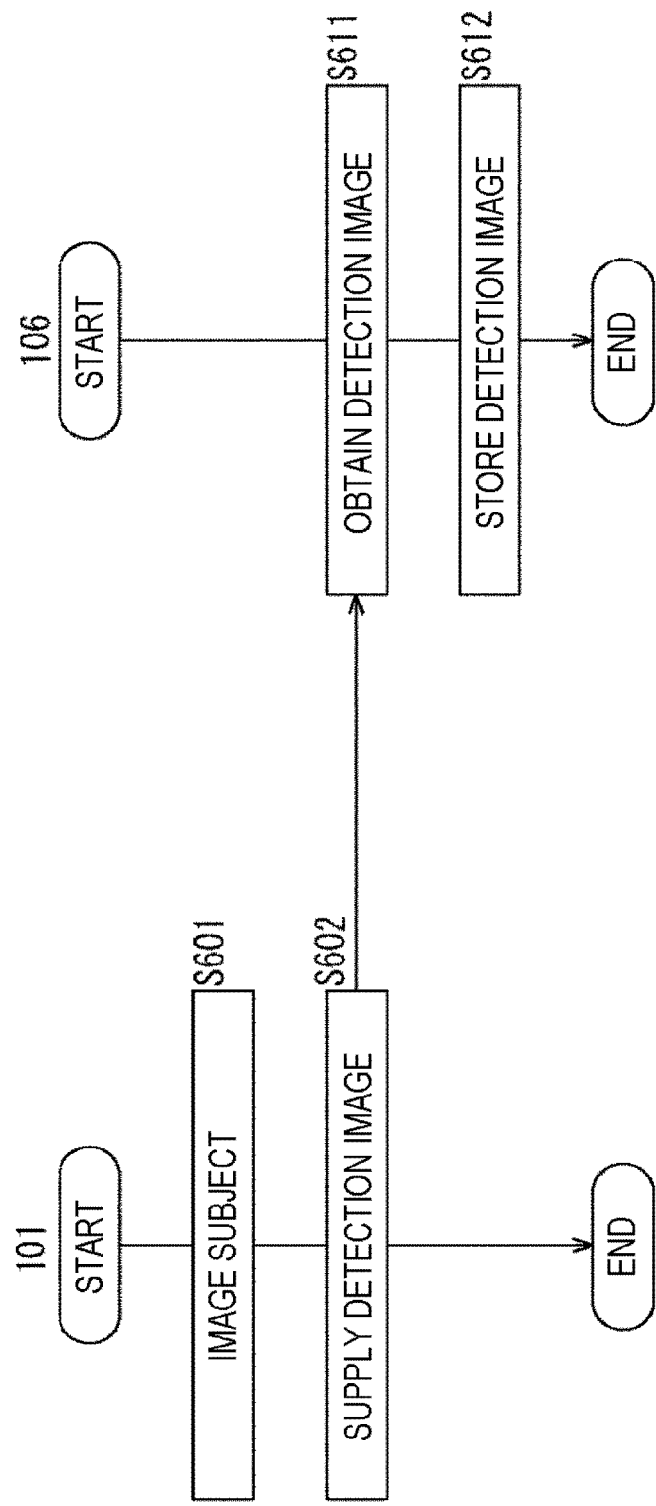
FIG. 47 is a flowchart describing an example of flow of a detection image transmission process.
Figure 48:
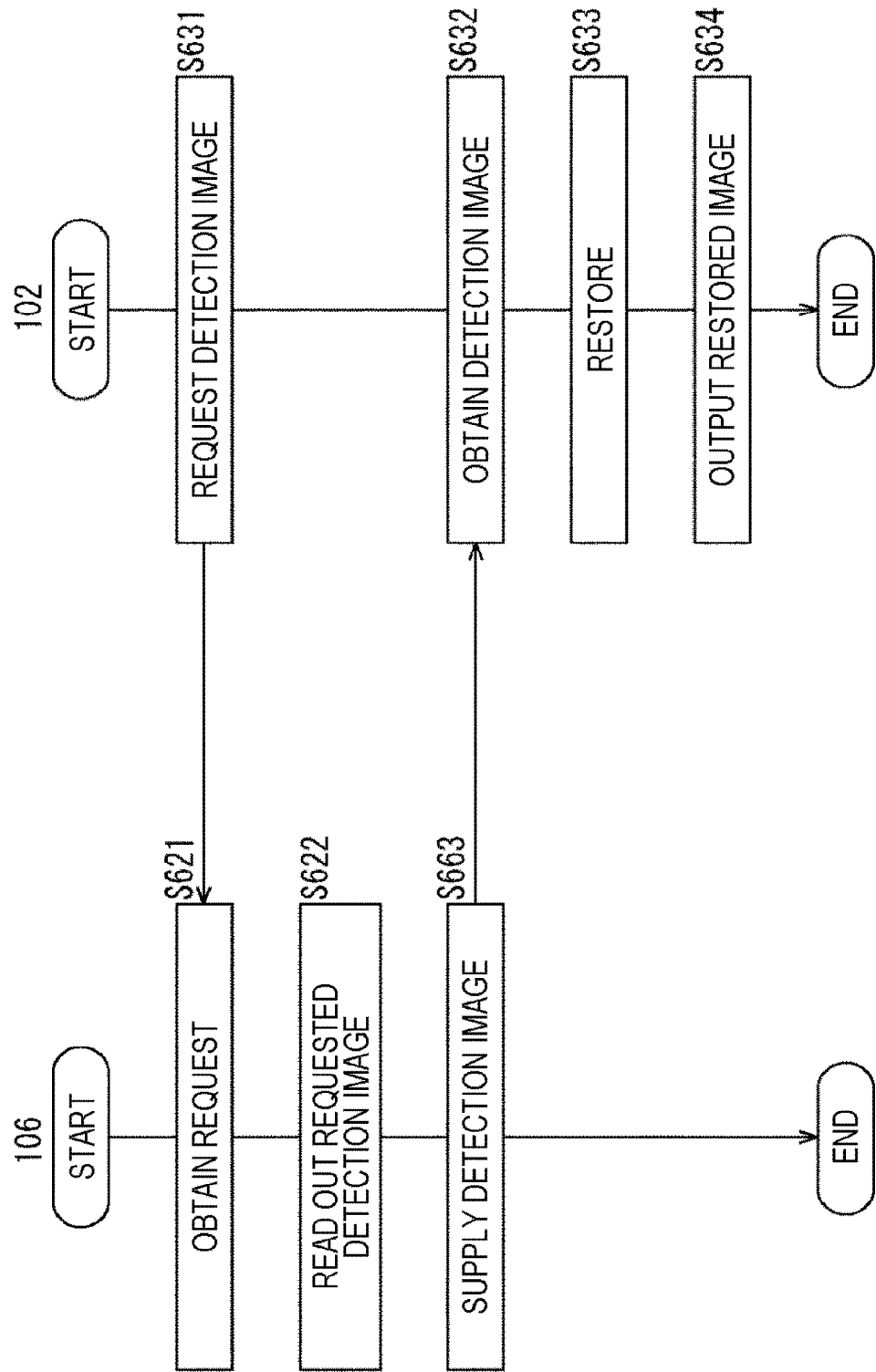
FIG. 48 is a flowchart describing an example of flow of a detection image transmission process.

Further, by executing both the process of FIG. 47 and the process of FIG. 48, the detection image can be transmitted via the server 106.

<Flow of Restoration Matrix Transmission Process>

Next, an example of flow of a restoration matrix transmission process between the imaging device 101 and the server 106 will be described with reference to a flowchart of FIG. 49.

When the restoration matrix transmission process is started, the authentication unit 371 of the imaging device 101 performs an authentication process in step S641. Correspondingly, the CPU 501 of the server 106 also performs an authentication process in step S651. That is, mutual authentication is performed.

If the authentication is successful, the communication unit 114 of the imaging device 101 supplies the restoration matrix to the server 106 in step S642. On the other hand, the communication unit 514 of the server 106 obtains the restoration matrix in step S652. In step S653, the storage unit 513 of the server 106 stores the restoration matrix obtained by the process of step S652.

By executing each process in this manner, the imaging device 101 can upload the restoration matrix to the server 106.

<Flow of Restoration Matrix Transmission Process>

Next, an example of flow of restoration matrix transmission process between the server 106 and the image output device 102 will be described with reference to a flowchart of FIG. 50.

When the restoration matrix transmission process is started, the CPU 501 of the server 106 performs an authentication process in step S661. Correspondingly, the authentication unit 381 of the image output device 102 also performs an authentication process in step S671. That is, mutual authentication is performed.

If the authentication is successful, the communication unit 314 of the image output device 102 requests the server 106 for a restoration matrix in step S672. In step S662, the communication unit 514 of the server 106 obtains the request. In step S663, the storage unit 513 of the server 106 reads out the requested restoration matrix. In step S664, the communication unit 514 supplies the restoration matrix read out in step S663 to the image output device 102 that is the request source.

In step S673, the communication unit 314 of the image output device 102 obtains the restoration matrix. In step S674, the storage unit 313 stores the obtained restoration matrix. This restoration matrix is used when a restored image is restored from the detection image.

By executing each process in this manner, the image output device 102 can download the restoration matrix from the server 106.

Figure 49:
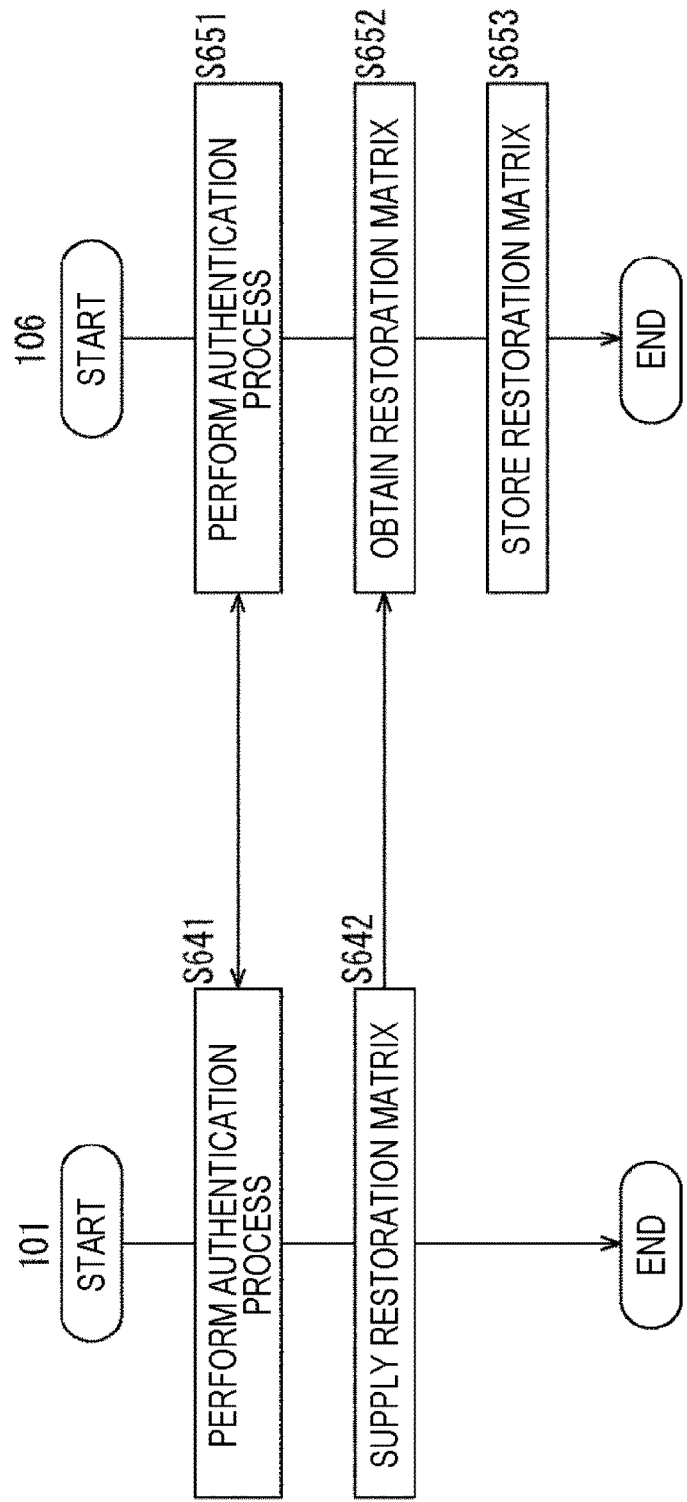
FIG. 49 is a flowchart describing an example of flow of a restoration matrix transmission process.
Figure 50:
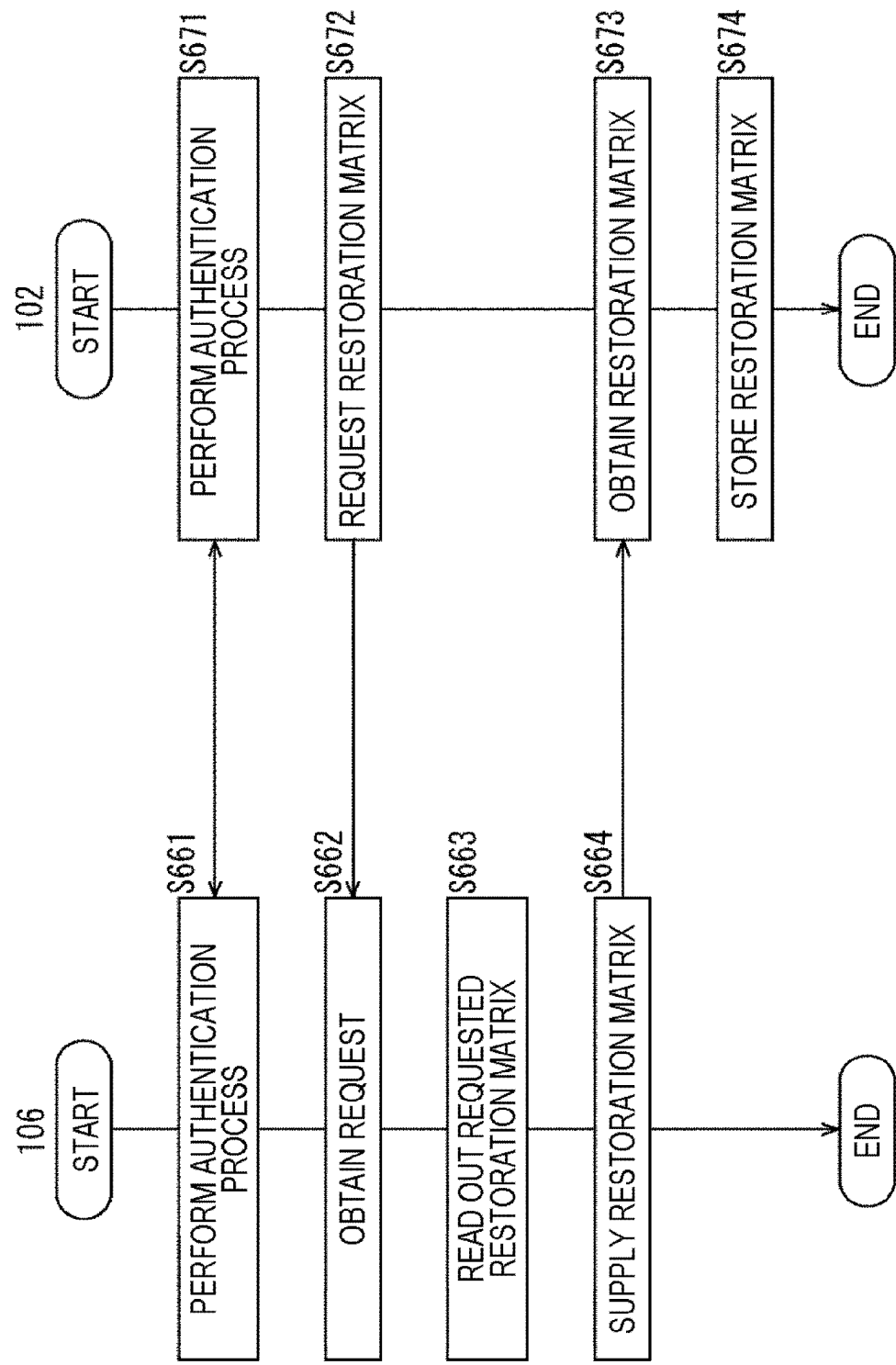
FIG. 50 is a flowchart describing an example of flow of a restoration matrix transmission process.

Further, by executing both the process of FIG. 49 and the process of FIG. 50, the restoration matrix can be transmitted via the server 106.

6. Sixth Embodiment

<Self-Restoration>

Note that in the above description, a restored image is restored and displayed in the image output device 102, but the restored image may be restored and displayed in the imaging device 101. That is, the imaging device 101 may perform all processes from imaging to display. For example, a captured image may be displayed on the imaging device 101 by performing such processes.

<Imaging Device>

Figure 51:
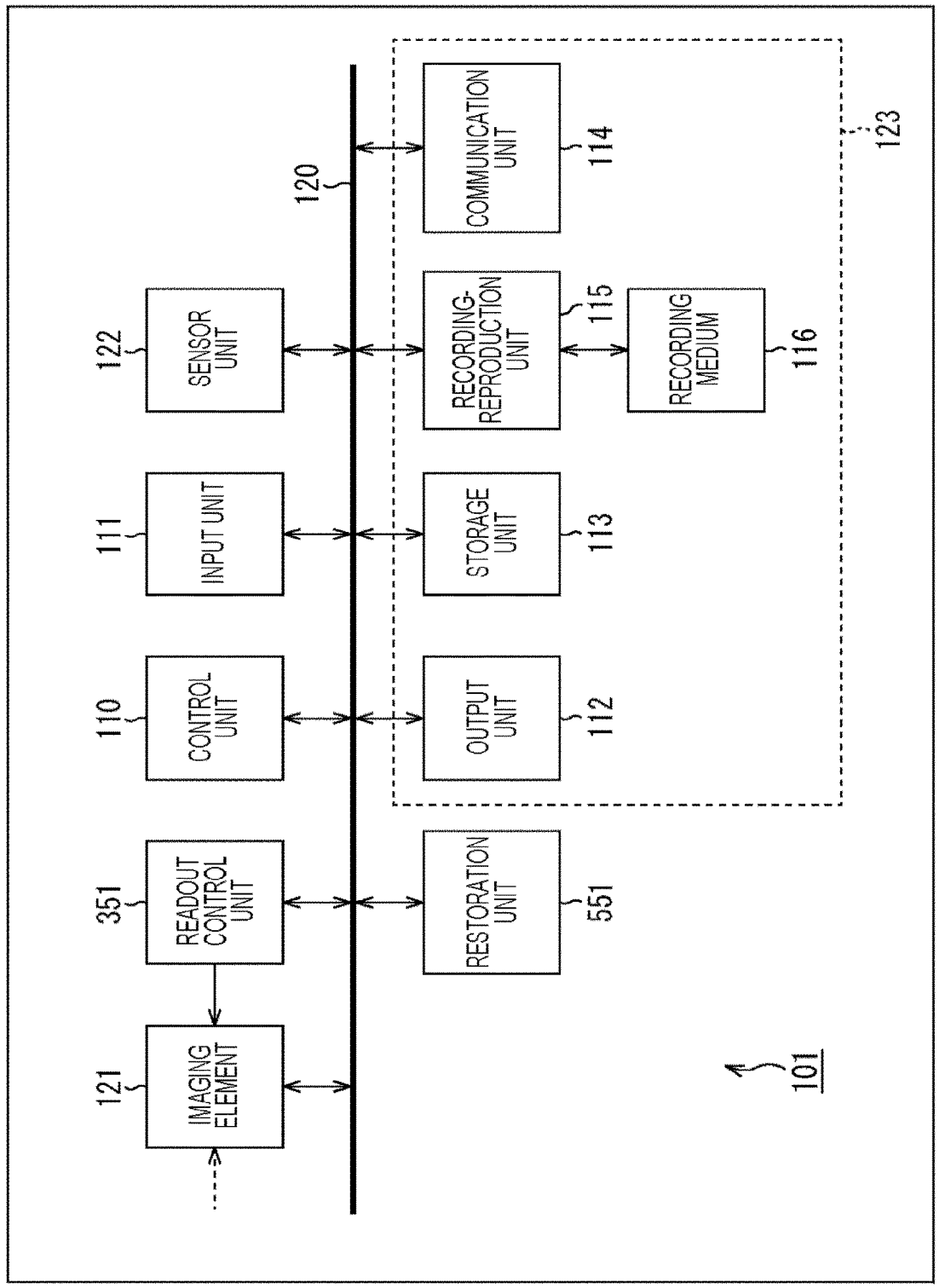
FIG. 51 is a block diagram illustrating a main configuration example of the imaging device.

FIG. 51 is a block diagram illustrating a main configuration example of the imaging device 101 in this case. As illustrated in FIG. 51, the imaging device 101 in this case further has a restoration unit 551 in addition to the configuration in the case of the second embodiment (FIG. 33).

The restoration unit 551 is configured to perform a process related to generation (restoration) of a restored image. For example, the restoration unit 551 obtains a detection image from another processing unit via the bus 120. Further, for example, the restoration unit 551 converts the detection image into a restored image using a restoration matrix. Further, for example, the restoration unit 551 supplies data (pixel values and the like) related to the generated restored image to another processing unit or the like via the bus 120.

The restoration unit 551 obtains a restoration matrix stored in the storage unit 113 or the like, and converts the detection image obtained by the imaging element 121 into a restored image using the obtained restoration matrix. The restoration unit 551 supplies the restored image that has been restored to the output unit 112 and displays the restored image on the monitor.

<Flow of Imaging Process>

Figure 52:
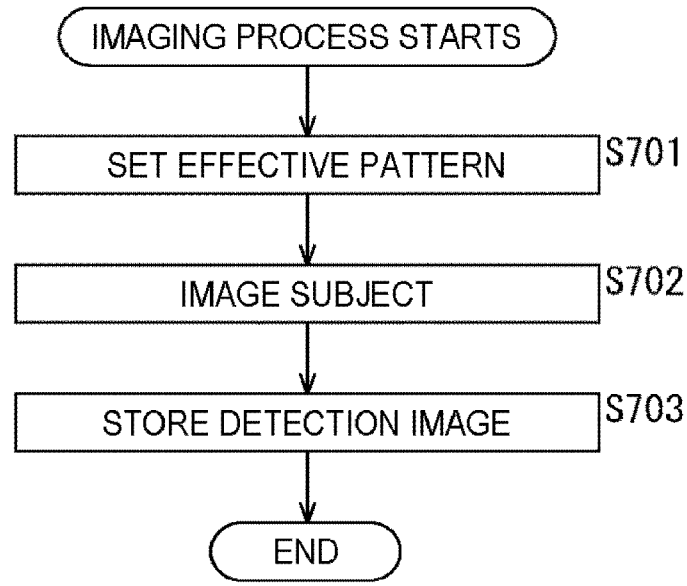
FIG. 52 is a flowchart describing an example of flow of an imaging process.

An example of flow of an imaging process executed by the imaging device 101 in this case will be described with reference to a flowchart of FIG. 52.

When the imaging process is started, the readout control unit 351 of the imaging device 101 sets (controls) the effective pattern of the imaging element 121 by controlling which pixel of the imaging element 121 the control signal is read out from in step S701.

In step S702, the imaging element 121 of the imaging device 101 images the object according to the effective pattern set in step S701 (with pixels designated when a detection signal is read out by the effective pattern), and obtains a detection image.

In step S703, the storage unit 113 stores the detection image obtained in step S702.

<Flow of Image Output Process>

Figure 53:
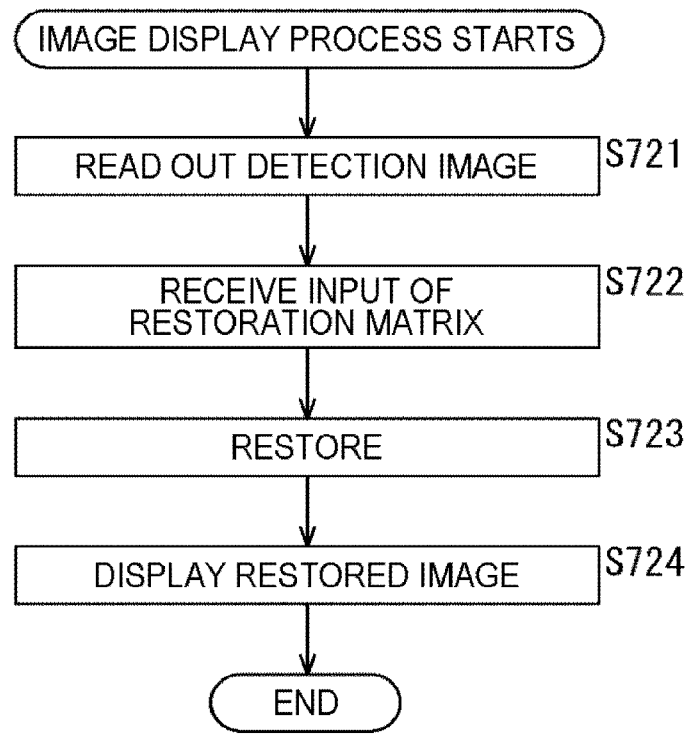
FIG. 53 is a flowchart describing an example of flow of an image display process.

Next, an example of flow of an image display process executed by the imaging device 101 will be described with reference to a flowchart of FIG. 53.

When the image display process is started, for example, the communication unit 114 (which may be the input unit 111, the recording-reproduction unit 115, or the like) of the imaging device 101 reads out a detection image stored in the storage unit 313 in step S721, and supplies it to the restoration unit 551.

In step S722, the input unit 111 receives an input of a restoration matrix input by a user or the like, for example. The input unit 111 supplies the received restoration matrix to the restoration unit 551.

In step S723, the restoration unit 551 converts (restores) the detection image read out from the storage unit 313 in step S721 into a restored image using the restoration matrix received in step S722. In a case where the used restoration matrix corresponds to the detection image as a processing target (in a case where the restoration matrix is a valid restoration matrix for the detection image), a restored image in which the object is visually recognizable is obtained by this process. The restoration unit 321 supplies (data of) the obtained restored image to the output unit 112.

In step S724, the output unit 112 displays the restored image on the monitor. When the process of step S724 ends, the image display process ends. By performing the image display process as described above, the restored image can be displayed without being transmitted to the outside. Therefore, unauthorized use and tampering of an image can be suppressed.

7. Seventh Embodiment

<Color Image>

Figure 54:
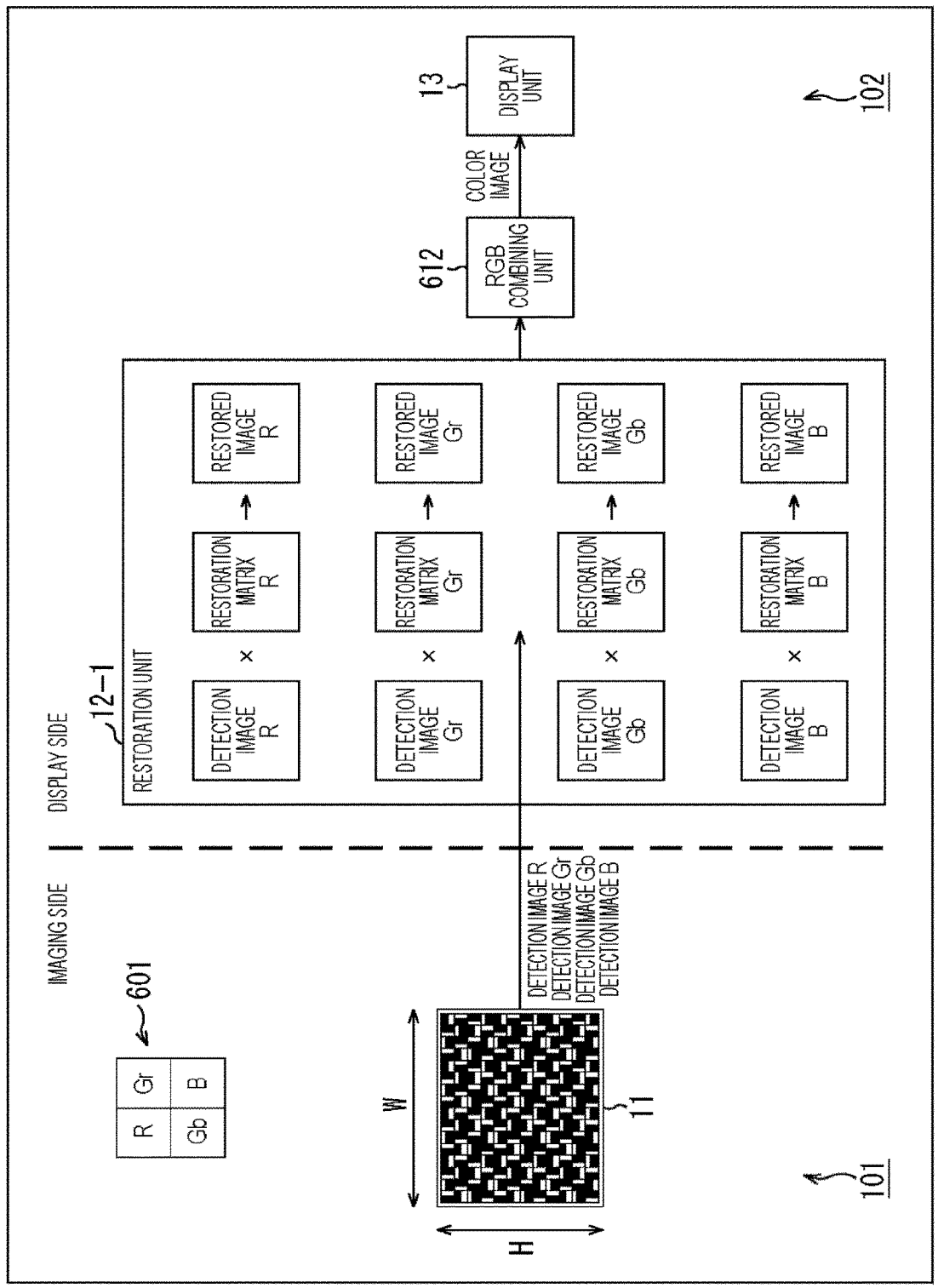
FIG. 54 is a diagram for describing an example of a state of transmission of a detection image in a case of a color image.

The present technology can also be applied to a color image. In this case, as illustrated in FIG. 54, it is sufficient to perform similar processing to the case described above for each color component. For example, it is assumed that the imaging element 11 has pixels 601 of respective colors (R, Gr, Gb, B) arranged in a Bayer array. In such an imaging element 11, a detection image is obtained for each color component (detection image R, detection image Gr, detection image Gb, detection image B).

The imaging device 101 transmits the detection image for each color component to the image output device 102. The restoration unit 12 on the display side prepares a restoration matrix for each color component for the transmitted detection image of each color component, and generates a restored image for each color component.

For example, an RGB combining unit 612 combines the restored images of respective colors to obtain a color image. This color image is displayed on the display unit 13.

In this manner, unauthorized use and tampering of an image can be suppressed even in color images.

8. Eighth Embodiment

<Use Case 1>

Figure 55:
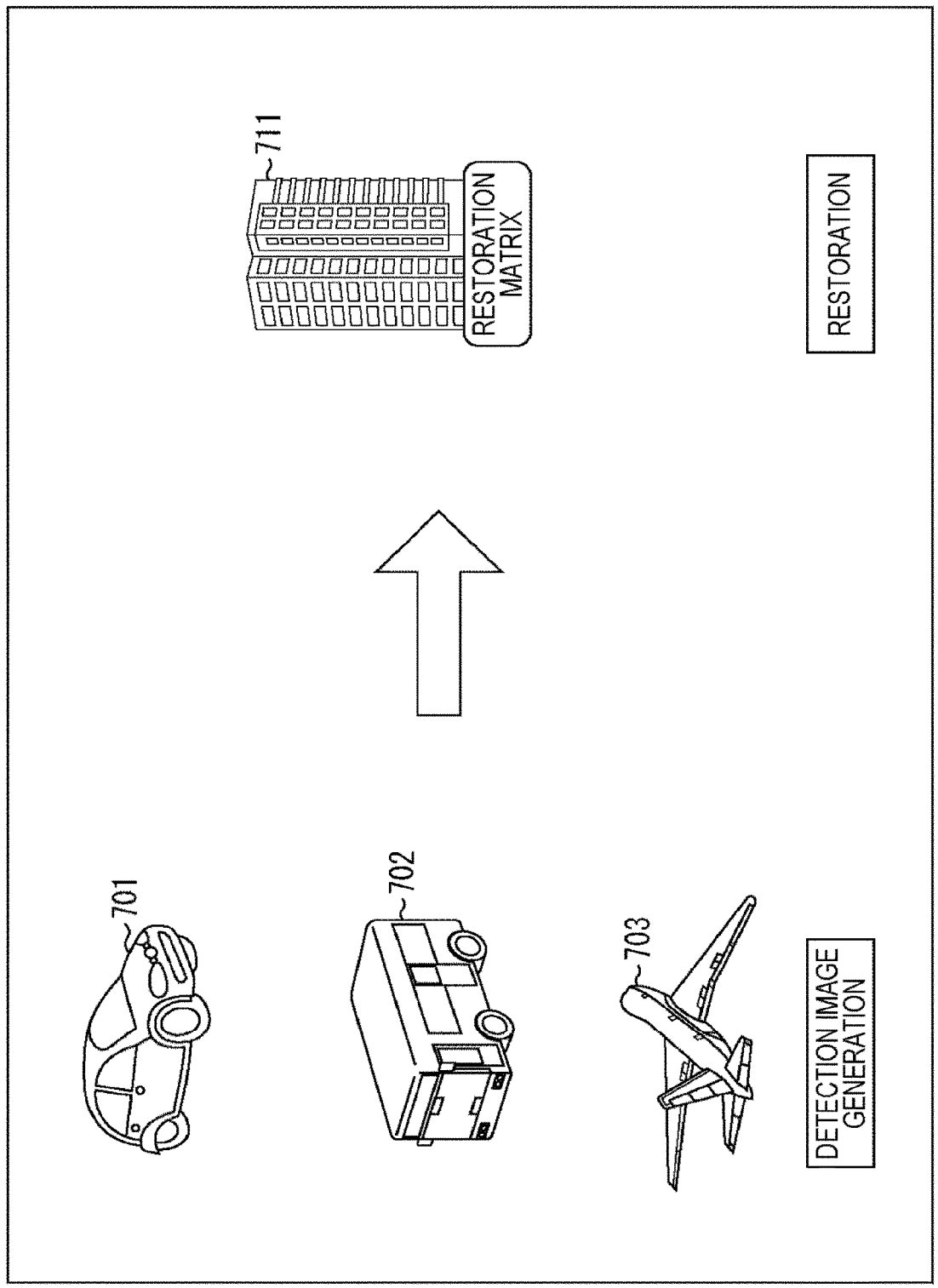
FIG. 55 is a diagram for describing a use case of a system.

Next, a specific example of a system to which the present technology is applied will be described. For example, as illustrated in FIG. 55, the present technology can be applied to a security camera or the like that is installed inside a vehicle or inside an aircraft. That is, the imaging device 101 is installed inside a vehicle such as an automobile 701 or a bus 702 or inside an aircraft 703, or the like and used for recording a state of driving or maneuvering or an in-vehicle or in-aircraft state, or the like. At that time, by recording a detection image obtained in the imaging device 101, unauthorized use and tampering of an image can be suppressed. For example, passenger privacy can be protected by suppressing unnecessary browsing.

Note that, for example, in a case where an incident or an accident occurs, or the like and an image needs to be browsed, a recorded detection image is provided to a valid user (for example, an investigation organization 711 or the like) having restoration matrices. The valid user can convert the detection image into a restored image using a valid restoration matrix, such that the valid user can browse the restored image (state of driving or maneuvering, in-vehicle or in-aircraft state, or the like).

<Use Case 2>

Figure 56:
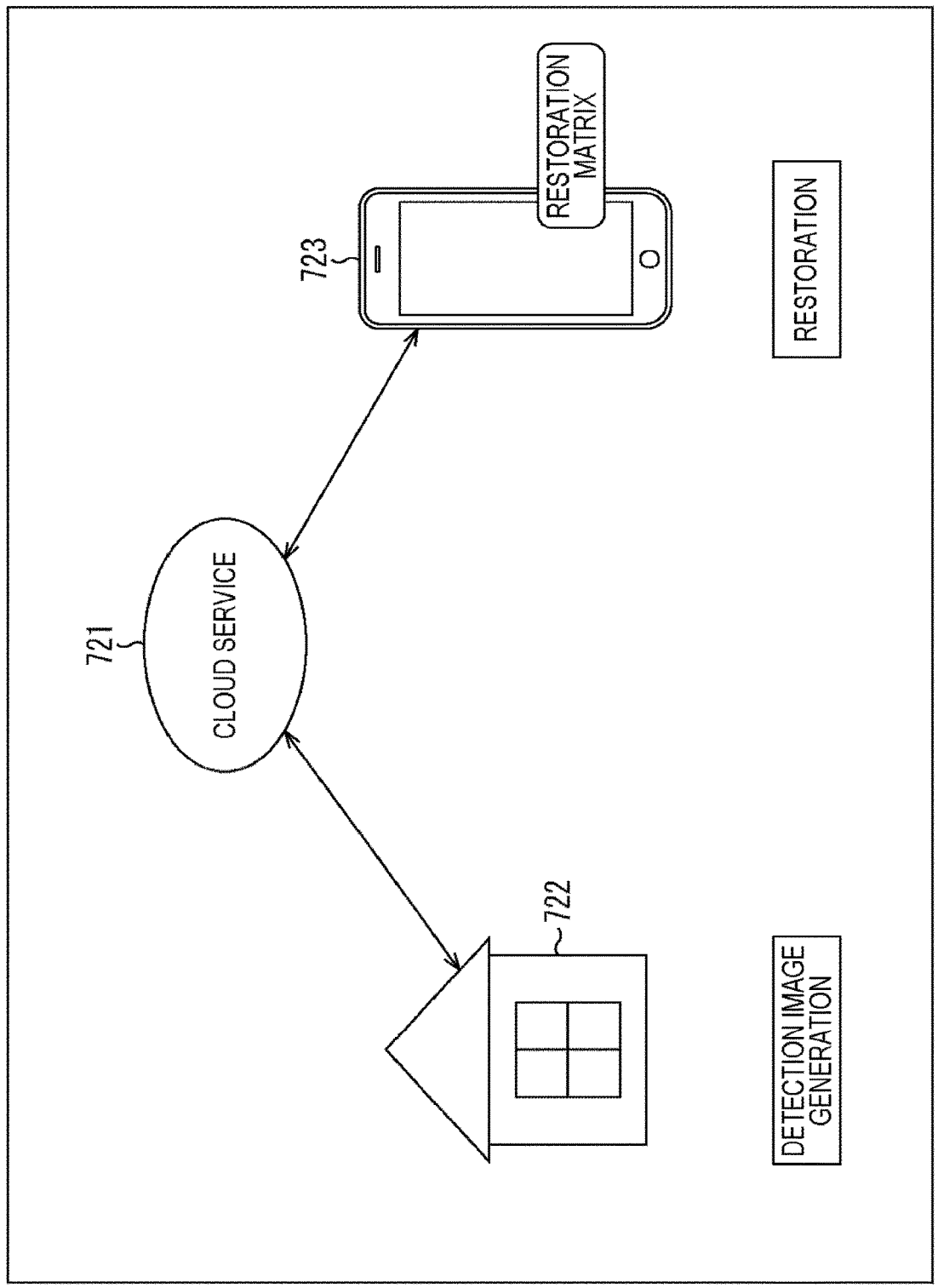
FIG. 56 is a diagram for describing a use case of the system.

Further, for example, as illustrated in FIG. 56, the present technology can be applied to a home security system or the like that monitors the state of a home. In an example of FIG. 56, the imaging device 101 is installed in a home 722, and a user away from home monitors the state of the home using a terminal device 723 such as a smartphone, in which a valid restoration matrix is registered, as the image output device 102. For example, the imaging device 101 or the terminal device 723 (image output device 102) is registered in a predetermined cloud service 721 that provides an image transfer service, and the cloud service 721 is used to transfer a detection image from the imaging device 101 at the home 722 to the terminal device 723. In this manner, unauthorized access to an image by a third party or the like during transfer or the like can be suppressed.

<Use Case 3>

Figure 57:
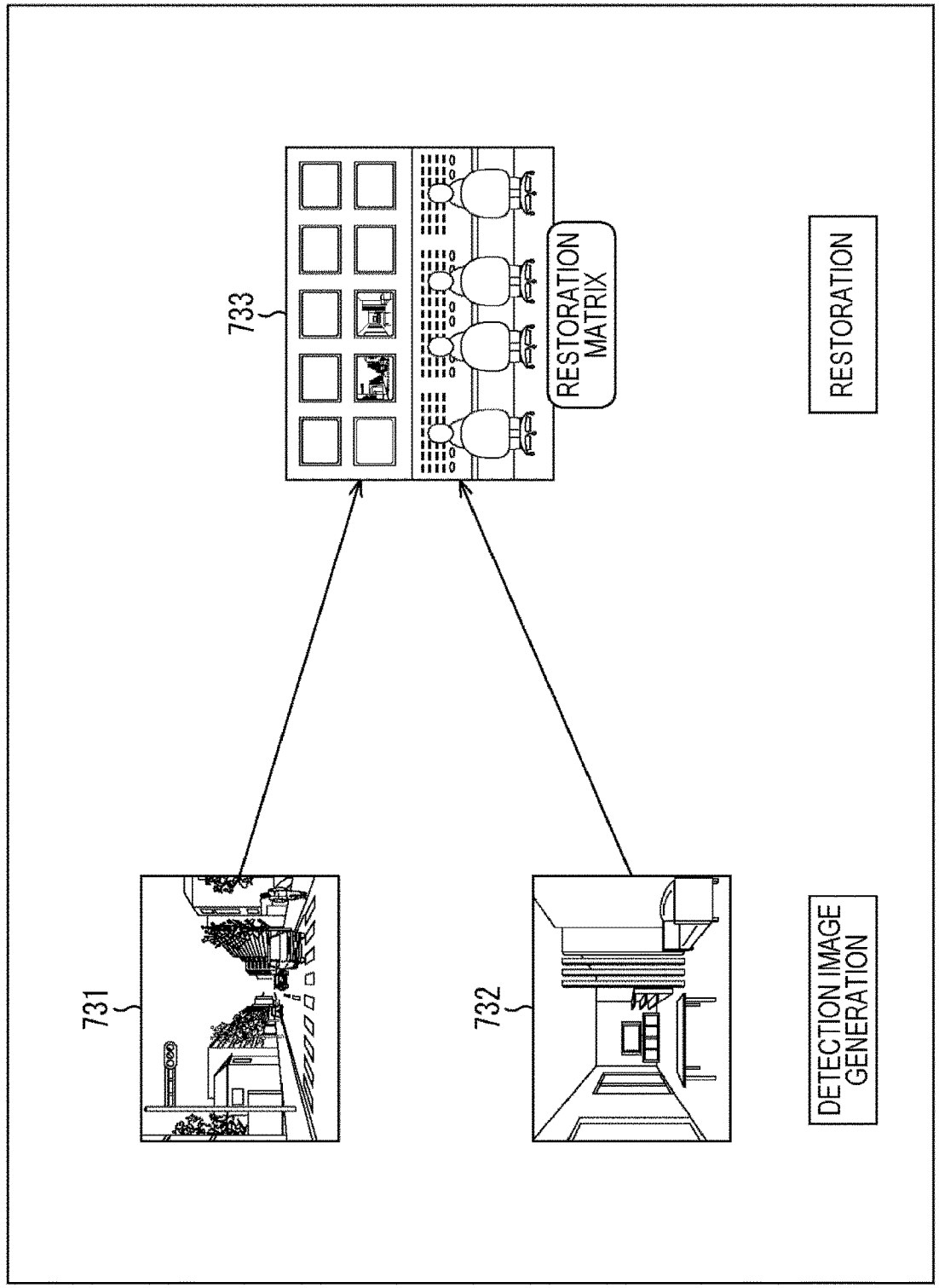
FIG. 57 is a diagram for describing a use case of the system.

Furthermore, the present technology can be applied to a security camera or the like installed outdoors or indoors as illustrated in FIG. 57, for example. In the example of FIG. 57, the imaging device 101 is installed at an outdoor place 731 or an indoor place 732, and a detection image obtained there is transferred to a monitoring center 733. The monitoring center 733 having a valid restoration matrix converts the detection image into a restored image for monitoring. In this manner, unauthorized access to an image by a third party or the like during transfer or the like can be suppressed.

<Use Case 4>

Figure 58:
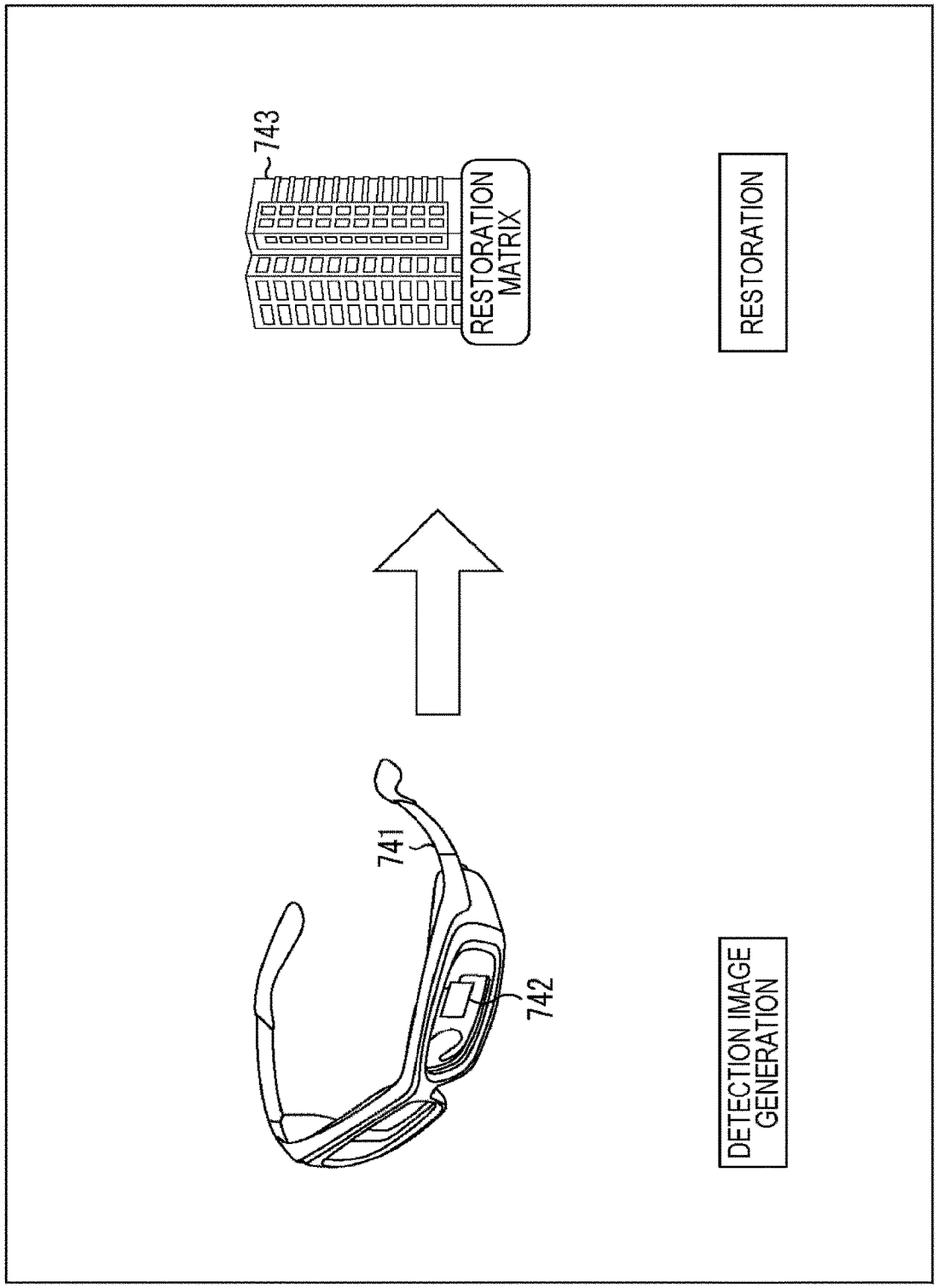
FIG. 58 is a diagram for describing a use case of the system.

Furthermore, the present technology can be applied to a wearable camera for security and the like as illustrated in FIG. 58, for example. In the example of FIG. 58, the imaging device 101 is mounted on glasses 741. Then, the imaging device 101 always images and records the situation around the user. At that time, the imaging device 101 generates and records a detection image. Therefore, for example, even if an unauthorized user operates the glasses 741, it is not possible to visually recognize an object because what is recorded is the detection image. That is, privacy of the object can be protected.

Note that, for example, in a case where an incident or an accident occurs, or the like and an image needs to be browsed, a recorded detection image is provided to a valid user (for example, an investigation organization 743 or the like) having restoration matrices. The valid user can convert the detection image into a restored image using a valid restoration matrix, such that the valid user can browse the restored image (such as the situation around the user of the glasses 741).

As described above, the present technology can be applied to systems and devices for various uses.

9. Ninth Embodiment

<Other Configuration Examples of Imaging Element>

Although the example of the imaging element 121 has been described above, the imaging element 121 suffices to have a plurality of pixel output units that receives incident light entering without passing through either an imaging lens or a pinhole, and each outputs one detection signal indicating an output pixel value modulated by the incident angle of incident light, and a configuration thereof is arbitrary.

For example, by using a random black-and-white pattern mask or an optical interference mask as a modulation element, a light incident on an imaging surface of the imaging element 121 may be modulated according to the black-and-white pattern or interference of light.

Figure 59:
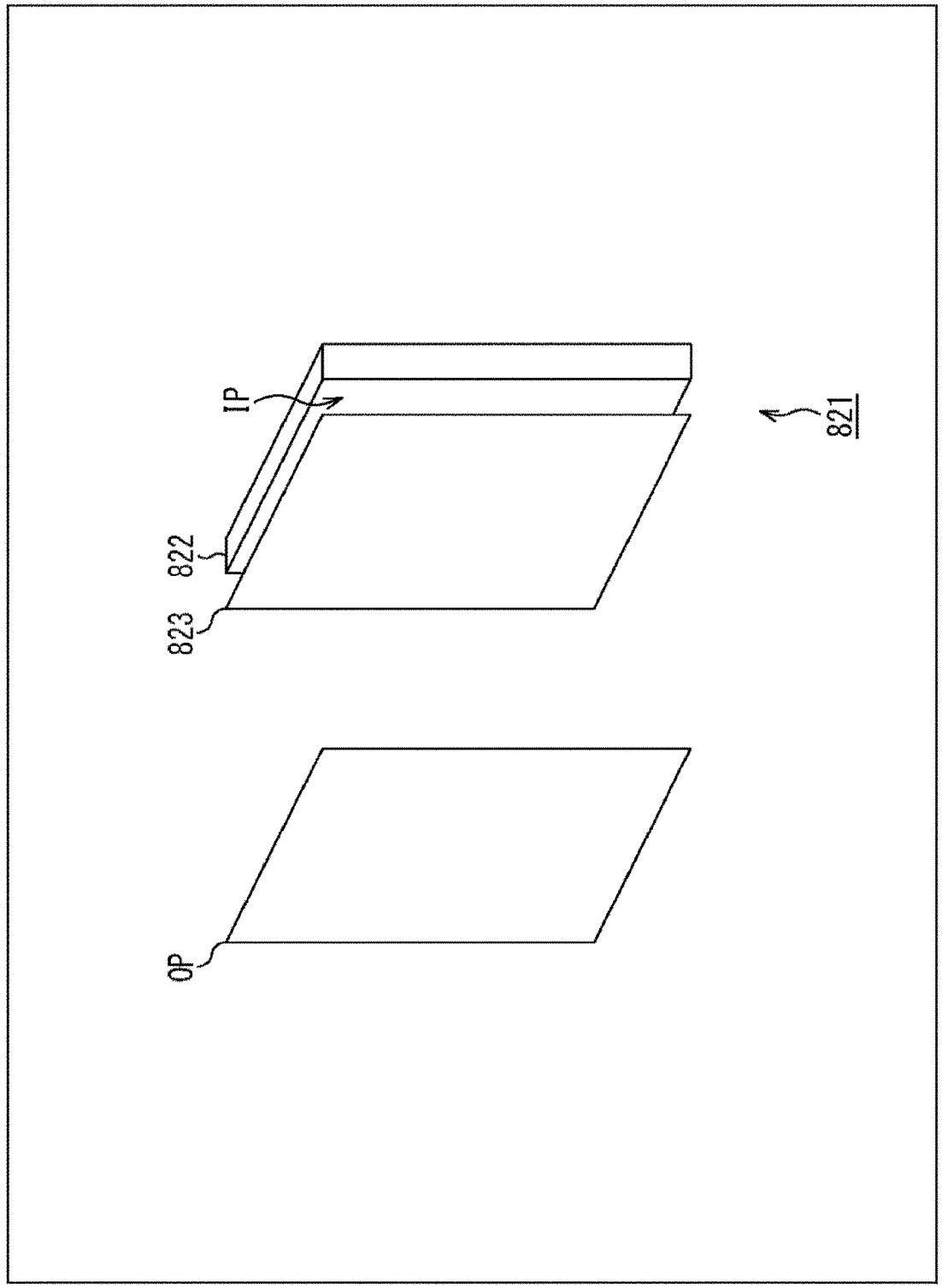
FIG. 59 is a view illustrating a main configuration example of the imaging element.

FIG. 59 illustrates another configuration of the imaging element. An imaging element 821 is configured such that a mask 823 that is a modulation element is fixed to an imaging element 822 so as to have a predetermined interval with respect to an imaging surface IP of the imaging element 822, and a light from an object plane OP is modulated by the mask 823 and thereafter incident on the imaging surface IP of the imaging element 822.

Figure 60:
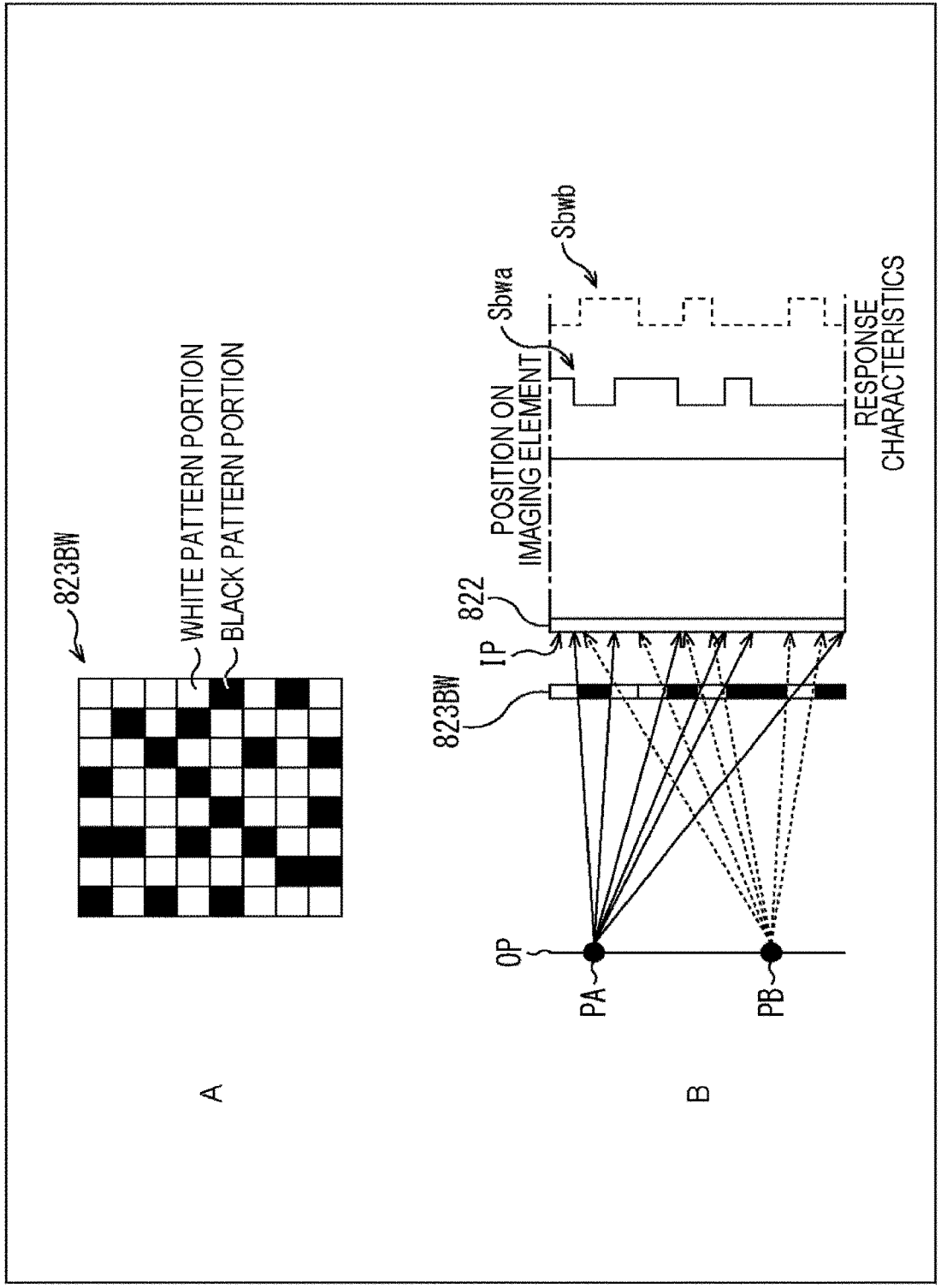
FIG. 60 is a diagram illustrating a case where a black-and-white pattern mask is used.

FIG. 60 illustrates a case where a black-and-white pattern mask is used. In A of FIG. 60, a black-and-white pattern mask is illustrated. A black-and-white pattern mask 823BW has a configuration in which white pattern portions that transmit light and black pattern portions that block light are randomly arranged, and has a pattern size that is set independently of the pixel size of the imaging element 822. In B of FIG. 60, an irradiation state of the imaging surface IP is schematically illustrated for light emitted from a point light source PA and light emitted from a point light source PB. Further, in B of FIG. 60, an example of a response of the imaging element in a case where the black-and-white pattern mask 823BW is used is also schematically illustrated for each of the light emitted from the point light source PA and the light emitted from the point light source PB. The light from the object plane OP is modulated by the black-and-white pattern mask 823BW and thereafter incident on the imaging surface IP of the imaging element 822. Therefore, a response of the imaging element corresponding to the light emitted from the point light source PA on the object plane OP is Sbwa. Further, a response of the imaging element corresponding to the light emitted from the point light source PB on the object plane OP is Sbwb. Accordingly, pixel output information output from the imaging element 822 is information of one image obtained by combining the responses of the respective point light sources for each pixel output unit. In a case of this configuration, the incident angle directivity cannot be set independently for each pixel output unit, and the pixel output units at close positions have incident angle directivities close to each other.

Figure 61:
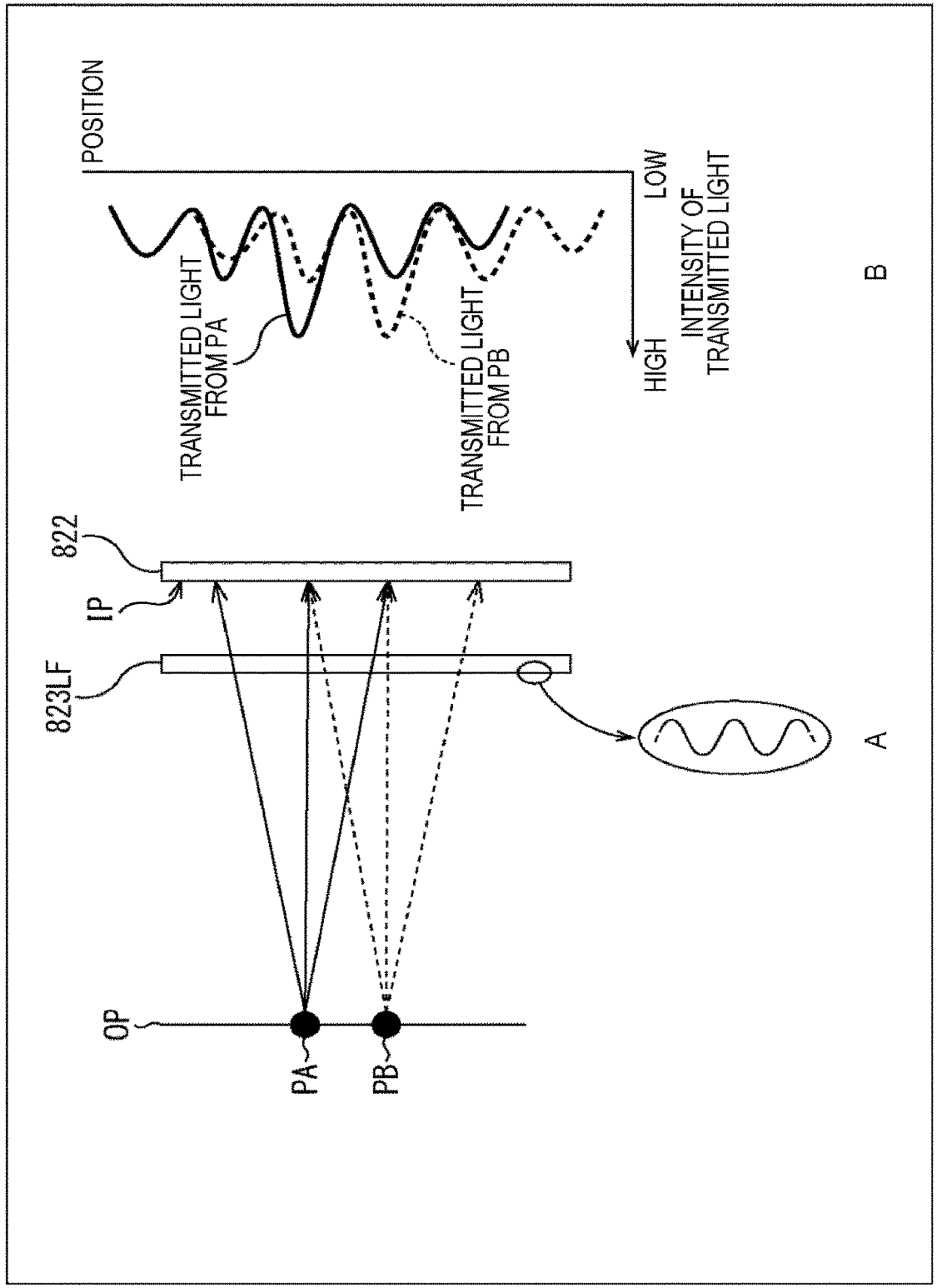
FIG. 61 is a diagram illustrating a case where an optical interference mask is used.

FIG. 61 illustrates a case where an optical interference mask is used. As illustrated in A of FIG. 61, light emitted from the point light sources PA, PB on the object plane OP is applied to the imaging surface IP of the imaging element 822 via an optical interference mask 823LF. For example, a light incident surface of the optical interference mask 823LF is provided with irregularities of about a wavelength of light as illustrated in A of FIG. 61. Further, the optical interference mask 823LF maximizes transmission of light having a specific wavelength applied from a vertical direction. When changes in incident angles (inclinations with respect to the vertical direction) of the light having specific wavelengths emitted from the point light sources PA, PB on the object plane OP with respect to the optical interference mask 823LF increase, optical path lengths change. Here, if the optical path lengths are odd multiples of half wavelengths, the light weakens each other, and if the optical path lengths are even multiples of the half wavelengths, the light strengthens each other. That is, intensities of transmitted light having specific wavelengths that are emitted from the point light sources PA, PB and transmitted through the optical interference mask 823LF are modulated according to the incident angle with respect to the optical interference mask 823LF and then incident on the imaging surface IP of the imaging element 822, as illustrated in B of FIG. 61. Therefore, pixel output information output from each output pixel unit of the imaging element 822 is information obtained by combining the light intensities after modulation of the respective point light sources that have passed through the optical interference mask 823LF. In a case of this configuration, the incident angle directivity cannot be set independently for each pixel output unit, and the pixel output units at close positions have incident angle directivities close to each other.

Note that the optical filter 823HW of FIG. 62 may be used instead of the optical filter 823BW. The optical filter 823HW includes a linear polarizing element 831A and a linear polarizing element 831B that have the same polarization directions as each other, and a half-wave plate 832, and the half-wave plate 832 is sandwiched between the linear polarizing element 831A and the linear polarizing element 831B. In the half-wave plate 832, instead of the black pattern portion of the optical filter 823BW, a polarizing portion indicated by oblique lines is provided, and the white pattern portion and the polarizing portion are randomly arranged.

The linearly polarizing element 831A transmits only a light component in a predetermined polarization direction out of substantially non-polarized light emitted from the point light source PA. Hereinafter, it is assumed that the linearly polarizing element 831A transmits only a light component whose polarization direction is parallel to the plane of the diagram. Among the polarized light that have been transmitted through the linear polarizing element 831A, the polarization direction of polarized light transmitted through the polarizing portion of the half-wave plate 832 is changed in a direction perpendicular to the plane of the diagram by rotation of a polarization plane. On the other hand, among the polarized light transmitted through the linear polarizing element 831A, the polarization direction of polarized light transmitted through a white pattern portion of the half-wave plate 832 remains unchanged in the direction of polarization parallel to the plane of the diagram. Then, the linearly polarizing element 831B transmits the polarized light transmitted through the white pattern portion and hardly transmits the polarized light transmitted through the polarizing portion. Therefore, the amount of light of the polarized light transmitted through the polarizing portion is reduced compared to the polarized light transmitted through the white pattern portion. Thus, a gradation pattern substantially similar to a case where the optical filter 823BW is used is generated on the light receiving surface (imaging surface) IP of the imaging element 822.

However, since it is necessary to add another configuration such as a mask to the imaging element in cases of these configurations, the imaging element 121 of the configuration example described in the first to eighth embodiments can be made smaller.

As described above, in the present technology, the imaging element 121 may have the configuration as described with reference to FIG. 7, may have the configuration as described with reference to FIG. 8, may have the configuration as described with reference to FIGS. 59 and 60, or may have the configuration as described with reference to FIG. 61. That is, the imaging element 121 suffices to have a plurality of pixel output units that receives incident light entering without passing through either an imaging lens or a pinhole, and that each outputs one detection signal indicating an output pixel value modulated by the incident angle of the incident light.

Further, the present technology may be applicable to the imaging element 121 having the configuration as described with reference to FIG. 7 or the configuration as described with reference to FIG. 8. That is, the plurality of pixel output units of the imaging element 121 may have a configuration in which an incident angle directivity indicating a directivity of the output pixel value thereof with respect to the incident angle of incident light from an object is independently settable in each of the pixel output units.

Further, the present technology may be applicable to an imaging element having a configuration as described with reference to FIG. 7. That is, the plurality of pixel output units of the imaging element 121 may have a configuration in which an incident angle directivity indicating a directivity with respect to the incident angle of incident light from an object is independently settable in each of the pixel output units.

Further, the present technology may be applicable to an imaging element having the configuration as described with reference to FIG. 8. That is, in the plurality of pixel output units of the imaging element 121, by having different photodiodes (PD) from each other that contribute to output, an incident angle directivity indicating a directivity of the output pixel value with respect to the incident angle of incident light from an object may be independently settable in each of the pixel output units.

<Other Configuration Examples of Imaging Device and Image Output Device>

The imaging device 101 has the imaging element 121 in the above description, but the number of the imaging elements 121 included in the imaging device 101 is arbitrary. The imaging device 101 may have a single imaging element 121 or a plurality of imaging elements 121. Further, in a case where the imaging device 101 has a plurality of imaging elements 121, performance (for example, the number of pixels, shape, pixel structure, imaging characteristics, imaging method, and the like) of the plurality of imaging elements 121 may all be unified, or different ones may include. Further, the imaging device 101 may include a plurality of other processing units such as the restoration unit 551, for example.

Further, the image output device 102 has the restoration unit 321 in the above description, but the number of restoration units 321 that the image output device 102 has is arbitrary, and may be single or plural. Further, in a case where the image output device 102 includes a plurality of restoration units 321, the capacities of the plurality of restoration units 321 may be unified or different ones may be included. Further, the image output device 102 may have a plurality of processing units other than the restoration unit 321.

10. Others

Application Example

The present technology can be applied to any device as long as a device has an imaging function. Further, the present technology can be applied to any device or system as long as a device or system processes an image obtained by an imaging function. Furthermore, the present technology is applicable to, for example, a device or system used in any field, such as traffic, medical care, crime prevention, agriculture, livestock industry, mining, beauty, factory, household appliance, weather, and nature monitoring.

For example, the present technology can be applied to a device or system that handles an image provided for viewing, such as a digital camera or a portable device with a camera function. Further, the present technology can also be applied to, for example, a device or system that handles images used for applications such as security, surveillance, or observation, such as a surveillance camera. Moreover, the present technology can be applied to, for example, a device or system that handles images used for applications such as person authentication, image analysis, and distance measurement. Furthermore, the present technology can be applied to, for example, a device or system that handles images used for control of a machine or the like, such as autonomous driving of an automobile or a robot.

<Software>

The series of processes described above can be executed by hardware or can be executed by software. Further, some processes can be executed by hardware, and other processes can be executed by software. In a case where a series of processes is executed by software, a program constituting the software is installed.

This program can be, for example, installed from a recording medium. For example, in the cases of the imaging device 101 of FIGS. 4, 33, 37, 41, 51, and the like, this recording medium is formed by the recording medium 116 in which the program is recorded and which is distributed to deliver the program to a user separately from the device main body. In this case, for example, by mounting the recording medium 116 in the recording-reproduction unit 115, the program stored in the recording medium 116 can be read out and installed in the storage unit 113. Further, for example, in the cases of the image output device 102 of FIGS. 29, 35, 39, 43, and the like, this recording medium is formed by the recording medium 316 in which the program is recorded and which is distributed to distribute the program to users separately from the device main body. In this case, for example, by mounting the recording medium 316 in the recording-reproduction unit 315, the program stored in the recording medium 316 can be read out and installed in the storage unit 313.

Further, this program can also be provided via a wired or wireless transmission medium such as a local area network, the Internet, or digital satellite broadcasting. For example, in the cases of the imaging device 101 of FIGS. 4, 33, 37, 41, 51, and the like, the program can be received by the communication unit 114 and installed in the storage unit 113. Further, for example, in the cases of the image output device 102 of FIGS. 29, 35, 39, 43, and the like, the program can be received by the communication unit 314 and installed in the storage unit 313.

In addition, this program can be installed in advance in a storage unit, a ROM, or the like. For example, in the cases of the imaging device 101 illustrated of FIGS. 4, 33, 37, 41, 51, and the like, the program can be installed in advance in the storage unit 113 or in a ROM (not illustrated) and the like in the control unit 110. Further, for example, in the case of the image output device 102 of FIGS. 29, 35, 39, 43, and the like, the program can be installed in advance in the storage unit 313 or the ROM (not illustrated) in the control unit 301, or the like.

<Supplement>

Note that embodiments of the present technology are not limited to the above-described embodiments, and various modifications are possible without departing from the scope of the present technology.

For example, the present technology can also be implemented as any component that constitutes a device or system, for example, a processor as a system large scale integration (LSI) or the like, a module that uses a plurality of processors or the like, a unit that uses a plurality of modules or the like, a set to which other functions are further added to a unit (that is, a part of components of the device), or the like.

Further, each processing unit described above can be implemented by any configuration. For example, it may include a circuit, an LSI, a system LSI, a processor, a module, a unit, a set, a device, an apparatus, or a system, or the like. Further, a plurality of them may be combined. At this time, for example, the same types of configurations such as a plurality of circuits or a plurality of processors may be combined, or different types of configurations such as a circuit and an LSI may be combined.

Note that in the present description, a system means a set of a plurality of components (devices, modules (parts), and the like), and it does not matter whether or not all the components are in the same housing. Therefore, both of a plurality of devices housed in separate housings and connected via a network and a single device having a plurality of modules housed in one housing are systems.

Further, for example, a configuration described as one device (or processing unit) may be divided and configured as a plurality of devices (or processing units). Conversely, configurations described above as a plurality of devices (or processing units) may be combined into a single device (or processing unit). Further, a configuration other than those described above may be of course added to the configuration of each device (or each processing unit). Moreover, if the configuration and operation of the entire system are substantially the same, a part of the configuration of a certain device (or processing unit) may be included in the configuration of another device (or another processing unit).

Further, for example, the present technology can take a cloud computing configuration in which one function is shared and processed in cooperation by a plurality of devices via a network.

Further, for example, the above-described program can be executed in any device. In this case, the device suffices to have necessary functions (functional blocks and the like) so that necessary information can be obtained.

Further, for example, each step described in the above-described flowchart can be executed in cooperation by a plurality of devices in addition to being executed by one device. Furthermore, in a case where a plurality of processes is included in one step, the plurality of processes included in the one step can be executed in cooperation by a plurality of devices in addition to being executed by one device. In other words, a plurality of processes included in one step can be executed as a process of a plurality of steps. Conversely, processes described as a plurality of steps can be collectively executed as one step.

The program executed by a computer may be such that processing of steps describing the program is executed in time series in the order described in the present description, or may be executed in parallel or individually at a required timing such as when a call is made. That is, as long as no contradiction occurs, the processes of respective steps may be executed in an order different from the order described above. Moreover, the processes of steps describing this program may be executed in parallel with the processes of other programs, or may be executed in combination with the processes of other programs.

As long as no contradiction occurs, the plurality of present technologies described in the present description can each be implemented independently as a single technology. Of course, any of a plurality of present technologies can be used in combination. For example, part or all of the present technologies described in any of the embodiments can be combined with part or all of the present technologies described in other embodiments. Moreover, part or all of any parts of the present technologies described above can be implemented in combination with other technologies not described above.

The present technology can also have the following configurations.

(1) An imaging device including:
an imaging element that includes a plurality of pixel output units that receives incident light entering without passing through either an imaging lens or a pinhole, and that each outputs one detection signal indicating an output pixel value modulated by an incident angle of the incident light; and
an output processing unit that outputs a detection image formed by a detection signal obtained in the pixel output units of the imaging element, without associating with a restoration matrix including coefficients used when a restored image is restored from the detection image.

(2) The imaging device according to (1), in which
the plurality of pixel output units has a configuration in which an incident angle directivity indicating a directivity of the output pixel value with respect to an incident angle of incident light from an object is independently settable in each of the pixel output units.

(3) The imaging device according to (1) or (2), in which
the plurality of pixel output units has a configuration in which an incident angle directivity indicating a directivity with respect to an incident angle of incident light from an object is independently settable in each of the pixel output units.

(4) The imaging device according to any one of (1) to (3), in which
the plurality of pixel output units has a configuration in which, by having different photodiodes (PD) from each other that contribute to output, an incident angle directivity indicating a directivity of the output pixel value with respect to an incident angle of incident light from an object is independently settable in each of the pixel output units.

(5) The imaging device according to any one of (1) to (4), further including
a readout control unit that controls reading out of the detection signal from each of the pixel output units of the imaging element and regularly or irregularly switches the pixel output unit from which the detection signal is read out.

(6) The imaging device according to any one of (1) to (5), further including
a restoration matrix setting unit that sets the restoration matrix in a case where a predetermined condition is satisfied, in which
the output processing unit is configured to output the restoration matrix set by the restoration matrix setting unit.

(7) The imaging device according to (6), further including
an encryption unit that encrypts the restoration matrix set by the restoration matrix setting unit, in which
the output processing unit is configured to output the restoration matrix encrypted by the encryption unit.

(8) The imaging device according to any one of (1) to (7), in which
the detection image is an image in which an object is visually unrecognizable, and
the restored image is an image in which the object is visually recognizable.

(9) The imaging device according to any one of (1) to (8), further including
a restoration unit that restores the restored image from the detection image using the restoration matrix, in which
the output processing unit is configured to display the restored image restored by the restoration unit.

(10) An imaging method including:
imaging an object by an imaging element including a plurality of pixel output units that receives incident light entering without passing through either an imaging lens or a pinhole, and that each outputs one detection signal indicating an output pixel value modulated by an incident angle of the incident light; and
outputting a detection image obtained by the imaging and formed by a detection signal obtained in the pixel output units of the imaging element, without associating with a restoration matrix including coefficients used when a restored image is restored from the detection image.

(11) An image processing device including
a restoration unit that restores a restored image from a detection image obtained by an external device using a restoration matrix including coefficients used when a restored image is restored from the detection image that is obtained by imaging an object by an imaging element including a plurality of pixel output units and is formed by a detection signal obtained in the pixel output units, the plurality of pixel output units receiving incident light entering without passing through either an imaging lens or a pinhole, and each outputting one detection signal indicating an output pixel value modulated by an incident angle of the incident light.

(12) The image processing device according to (11), further including
a restoration matrix setting unit that sets a restoration matrix used to restore the restored image by the restoration unit, in which
the restoration unit is configured to restore the restored image from the detection image using the restoration matrix set by the restoration matrix setting unit.

(13) The image processing device according to (12), in which
the restoration matrix setting unit regularly or irregularly switches the restoration matrix used to restore the restored image.

(14) The image processing device according to (12) or (13), in which
the restoration matrix setting unit generates the restoration matrix used to restore the restored image.

(15) The image processing device according to any one of (12) to (14), further including
a restoration matrix storage unit that stores candidate restoration matrices, in which
the restoration matrix setting unit is configured to set the restoration matrix used to restore the restored image from the restoration matrices stored in the restoration matrix storage unit.

(16) The image processing device according to (15), further including
a restoration matrix communication unit that obtains a restoration matrix from the external device by communication, in which the restoration matrix storage unit is configured to store the restoration matrix obtained by the restoration matrix communication unit.

(17) The image processing device according to (16), further including a decryption unit that decrypts an encrypted restoration matrix obtained by the restoration matrix communication unit, in which the restoration matrix storage unit is configured to store the restoration matrix decrypted by the decryption unit.

(18) The image processing device according to (17), in which the restoration matrix communication unit obtains an encrypted restoration matrix associated with the detection image.

(19) The image processing device according to any one of (16) to (18), further including an authentication unit that performs an authentication process of itself for the external device, in which the restoration matrix communication unit is configured to obtain a restoration matrix from the external device in a case where authentication by the authentication unit is successful.

(20) An image processing method including restoring a restored image from a detection image obtained by an external device using a restoration matrix including coefficients used when a restored image is restored from the detection image that is obtained by imaging an object by an imaging element including a plurality of pixel output units and is formed by a detection signal obtained in the pixel output units, the plurality of pixel output units receiving incident light entering without passing through either an imaging lens or a pinhole, and each outputting one detection signal indicating an output pixel value modulated by an incident angle of the incident light.

REFERENCE SIGNS LIST

101 Imaging device
102 Image output device
106 Server
110 Control unit
111 Input unit
112 Output unit
113 Storage unit
114 Communication unit
115 Recording-reproduction unit
121 Imaging element
122 Sensor unit
123 Output processing unit
301 Control unit
311 Input unit
312 Output unit
313 Storage unit
314 Communication unit
315 Recording-reproduction unit
321 Restoration unit
351 Readout control unit
361 Restoration matrix setting unit
371 Authentication unit
372 Restoration matrix setting unit
373 Encryption unit
381 Authentication unit
382 Decryption unit
391 Association unit
551 Restoration unit

The invention claimed is:

1. An imaging device, comprising:

an imaging element that includes a plurality of pixels, each pixel having a photodetector and a light-receiving surface, and receiving incident light entering without passing through either a single imaging lens that directs light to two or more of the plurality of pixels or a pinhole, and outputting a detection signal indicating an output pixel value optically modulated according to an incident angle of the incident light, wherein each pixel of the plurality of pixels has an independently configurable light shielding layer formed on the light-receiving surface of the pixel to block the incident light such that an incident angle directivity, indicating a directivity of the output pixel value with respect to an incident angle of incident light from an object, is independently settable for the pixel; and output processing circuitry configured to output a detection image formed by detection signals obtained from the plurality of pixels of the imaging element, without using a restoration matrix including coefficients used when the detection image is restored to form a restored image.

2. The imaging device according to claim 1, wherein each pixel of the plurality of pixels has a configuration in which, by having different photodiodes (PD) from each other that contribute to an output of the pixel, the incident angle directivity indicating the directivity of the output pixel value respect to the incident angle of incident light from the object is independently settable in each of the plurality of pixels.

3. The imaging device according to claim 1, further comprising readout control circuitry configured to control reading out of the detection signal from each pixel of the plurality of pixels of the imaging element, and regularly or irregularly switch the pixel from which the detection signal is read out.

4. The imaging device according to claim 1, further comprising a restoration matrix selling circuit configured to set the restoration matrix when a predetermined condition is satisfied, wherein the output processing circuitry is further configured to output the restoration matrix set by the restoration matrix setting circuit.

5. The imaging device according to claim 4, further comprising an encryption circuit that encrypts the restoration matrix set by the restoration matrix setting circuit, wherein the output processing circuitry is further configured to output the restoration matrix encrypted by the encryption circuit.

6. The imaging device according to claim 1, wherein the detection image output by the output processing circuitry is an image in which an object is visually unrecognizable, and the restored image is an image in which the object is visually recognizable.

7. The imaging device according to claim 1, further comprising a restoration circuit configured to generate the restored image from the detection image using the restoration matrix, wherein the output processing circuitry is further configured to display the restored image generated by the restoration circuit.

8. An imaging method, comprising:
imaging an object by an imaging element including a plurality of pixels, each pixel having a photodetector and a light-receiving surface, and receiving incident light entering without passing through either a single imaging lens that directs light to two or more of the plurality of pixels or a pinhole, and outputting a detection signal indicating an output pixel value optically modulated according to an incident angle of the incident light, wherein each pixel of the plurality of pixels has an independently configurable light shielding layer formed on the light-receiving surface of the pixel to block the incident light such that an incident angle directivity, indicating a directivity of the output pixel value with respect to an incident angle of incident light from an object, is independently settable for the pixel; and
outputting a detection image obtained by the imaging and formed by detection signals obtained from the plurality of pixels of the imaging element, without using a restoration matrix including coefficients used when the detection image is restored to form a restored image.

9. An image processing device, comprising:
restoration circuitry configured to generate a restored image from a detection image obtained by an external device using a restoration matrix that includes coefficients used when the restored image is generated from the detection image, which is obtained by imaging an object with an imaging element, the imaging element including a plurality of pixels, and is formed by detection signals obtained from the plurality of pixels,
each of the plurality of pixels having a photodetector and a light-receiving surface, and receiving incident light entering without passing through either a single imaging lens that directs light to two or more of the plurality of pixels or a pinhole, and outputting a detection signal indicating an output pixel value optically modulated according to an incident angle of the incident light,
wherein each pixel of the plurality of pixels has an independently configurable light shielding layer formed on the light-receiving surface of the pixel to block the incident light such that an incident angle directivity, indicating a directivity of the output pixel value with respect to an incident angle of incident light from an object, is independently settable for the pixel.

10. The image processing device according to claim 9, further comprising
a restoration matrix setting circuit configured to set a restoration matrix used to generate the restored image by the restoration circuitry, wherein
the restoration circuitry is further configured to generate the restored image from the detection image using the restoration matrix set by the restoration matrix setting circuit.

11. The image processing device according to claim 10, wherein the restoration matrix setting circuit is further configured to regularly or irregularly switch the restoration matrix used to generate the restored image.

12. The image processing device according to claim 10, wherein the restoration matrix setting circuit is further configured to generate the restoration matrix used to generate the restored image.

13. The image processing device according to claim 10, further comprising a restoration matrix memory that stores candidate restoration matrices, wherein
the restoration matrix setting circuit is further configured to set the restoration matrix used to generate the restored image from the restoration matrices stored in the restoration matrix memory.

14. The image processing device according to claim 13, further comprising a restoration matrix communication circuit configured to obtain a restoration matrix from the external device by communication, wherein
the restoration matrix memory stores the restoration matrix obtained by the restoration matrix communication circuit.

15. The image processing device according to claim 14, further comprising a decryption circuit configured to decrypt an encrypted restoration matrix obtained by the restoration matrix communication circuit, wherein
the restoration matrix memory stores the restoration matrix decrypted by the decryption circuit.

16. The image processing device according to claim 15, wherein the restoration matrix communication circuit is further configured to obtain an encrypted restoration matrix associated with the detection image.

17. The image processing device according to claim 14, further comprising an authentication circuit configured to perform an authentication process of itself for the external device, wherein
the restoration matrix communication circuit is further configured to obtain a restoration matrix from the external device when authentication by the authentication circuit is successful.

18. An image processing method, comprising:
generating a restored image from a detection image obtained by an external device using a restoration matrix that includes coefficients used when the restored image is generated from the detection image, which is obtained by imaging an object with an imaging element, the imaging element including a plurality of pixels, and is formed by detection signals obtained from the plurality of pixels,
each of the plurality of pixels having a photodetector and a light-receiving surface, and receiving incident light entering without passing through either a single imaging lens that directs light to two or more of the plurality of pixels or a pinhole, and outputting a detection signal indicating an output pixel value optically modulated according to an incident angle of the incident light,
wherein each pixel of the plurality of pixels has an independently configurable light shielding layer formed on the light-receiving surface of the pixel to block the incident light such that an incident angle directivity, indicating a directivity of the output pixel value with respect to an incident angle of incident light from an object, is independently settable for the pixel.

* * * * *